US012683733B2

(12) United States Patent
Hasegawa et al.

(10) Patent No.: US 12,683,733 B2
(45) Date of Patent: Jul. 14, 2026

(54) DEMODULATION REFERENCE SIGNALS TRANSMISSION IN WIRELESS SYSTEMS

(71) Applicant: InterDigital Patent Holdings, Inc., Wilmington, DE (US)

(72) Inventors: Fumihiro Hasegawa, Westmount (CA); Paul Marinier, Brossard (CA); Virgil Comsa, Montreal (CA); Moon-il Lee, Melville, NY (US); Faris Alfarhan, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 405 days.

(21) Appl. No.: 18/019,866

(22) PCT Filed: Aug. 5, 2021

(86) PCT No.: PCT/US2021/044657
§ 371 (c)(1),
(2) Date: Feb. 6, 2023

(87) PCT Pub. No.: WO2022/031919
PCT Pub. Date: Feb. 10, 2022

(65) Prior Publication Data
US 2023/0291523 A1 Sep. 14, 2023
US 2025/0015947 A9 Jan. 9, 2025

Related U.S. Application Data

(60) Provisional application No. 63/185,760, filed on May 7, 2021, provisional application No. 63/167,893, filed
(Continued)

(51) Int. Cl.
*H04L 5/00* (2006.01)

(52) U.S. Cl.
CPC .......... *H04L 5/0048* (2013.01); *H04L 5/0044* (2013.01); *H04L 5/0096* (2013.01)

(58) Field of Classification Search
None
See application file for complete search history.

(56) References Cited

U.S. PATENT DOCUMENTS

2014/0056278 A1* 2/2014 Marinier ............. H04W 52/367
370/330
2019/0230656 A1* 7/2019 Soriaga ................. H04W 72/23
(Continued)

FOREIGN PATENT DOCUMENTS

WO 2020/031357 A1 2/2020
WO 2021/007239 A1 1/2021

OTHER PUBLICATIONS

R1-1712083, "sPUSCH design", 3GPP TSG RAN WG1 Meeting #90, Huawei, HiSilicon, Prague, Czech Republic, Aug. 21-25, 2017, 3 pages.
(Continued)

*Primary Examiner* — Derrick W Ferris
(74) *Attorney, Agent, or Firm* — Condo Roccia Koptiw LLP

(57) ABSTRACT

Systems, methods, and instrumentalities are disclosed herein associated with transmission of demodulation reference signals (DMRS) in wireless systems. DMRS symbols may be placed in a slot for channel estimation operations. For example, channel estimation performance may be enhanced based on using an increased number of DMRS symbols. Channel estimation enhancements may be performed by transmitting DMRS symbols in an extended slot, for example, to avoid data degradation (e.g., which may result from replacing data transmission symbols with DMRS symbols). An extended slot may be a slot that includes symbols
(Continued)

spanning across multiple slots (e.g., two slots, consecutive slots), for example, such as a slot n and a slot n+1.

20 Claims, 20 Drawing Sheets

Related U.S. Application Data on Mar. 30, 2021, provisional application No. 63/136,313, filed on Jan. 12, 2021, provisional application No. 63/091,454, filed on Oct. 14, 2020, provisional application No. 63/061,397, filed on Aug. 5, 2020.

(56)                    References Cited

U.S. PATENT DOCUMENTS

| | | | |
|---|---|---|---|
| 2019/0254020 A1 | 8/2019 | Nam et al. | |
| 2019/0313436 A1 | 10/2019 | Lee et al. | |
| 2019/0363824 A1* | 11/2019 | Sun | H04L 1/1887 |
| 2021/0014095 A1* | 1/2021 | Ly | H04W 72/23 |
| 2021/0344440 A1 | 11/2021 | Yoshioka et al. | |
| 2021/0392648 A1* | 12/2021 | Andersson | H04L 5/0044 |
| 2022/0086873 A1* | 3/2022 | Wong | H04W 72/0446 |
| 2022/0174722 A1* | 6/2022 | Talarico | H04W 74/002 |
| 2022/0200759 A1* | 6/2022 | Yoshioka | H04L 5/0007 |
| 2024/0205931 A1* | 6/2024 | Fakoorian | H04L 5/003 |

OTHER PUBLICATIONS

3rd Generation Partnership Project, R1-1900372, "L1 enhancements on PUSCH for URLLC", 3GPP TSG RAN WG1 Ad-Hoc Meeting 1901, Sony, Taipei, Taiwan, Jan. 21-25, 2019, 5 pages.

3rd Generation Partnership Project, R1-2009583, "PUSCH coverage enhancements", 3GPP TSG RAN WG1 #103-e, InterDigital Inc., e-Meeting, Oct. 26-Nov. 13, 2020, 19 pages.

3rd Generation Partnership Project, RP-193240, "New SIDS on NR Coverage Enhancement", 3rd Generation Partnership Project (3GPP), China Telecom 3GPP TSG RAN Meeting #86, Sitges, Spain, Dec. 9-12, 2019, 4 pages.

3rd Generation Partnership Project, TS 38.211 V16.2.0, "Technical Specification Group Radio Access Network, NR, Physical channels and modulation (Release 16)", Jun. 2020, pp. 1-131.

3rd Generation Partnership Project, TS 38.214 V16.2.0, "Technical Specification Group Radio Access Network, NR, Physical layer procedures for data (Release 16)", Jun. 2020, pp. 1-163.

3rd Generation Partnership Project (3GPP), R1-2004499, "Potential Techniques for Coverage Enhancements", Qualcomm Incorporated, 3GPP TSG-RAN WG1 Meeting #101 e-Meeting, May 25-Jun. 5, 2020, 15 pages.

* cited by examiner

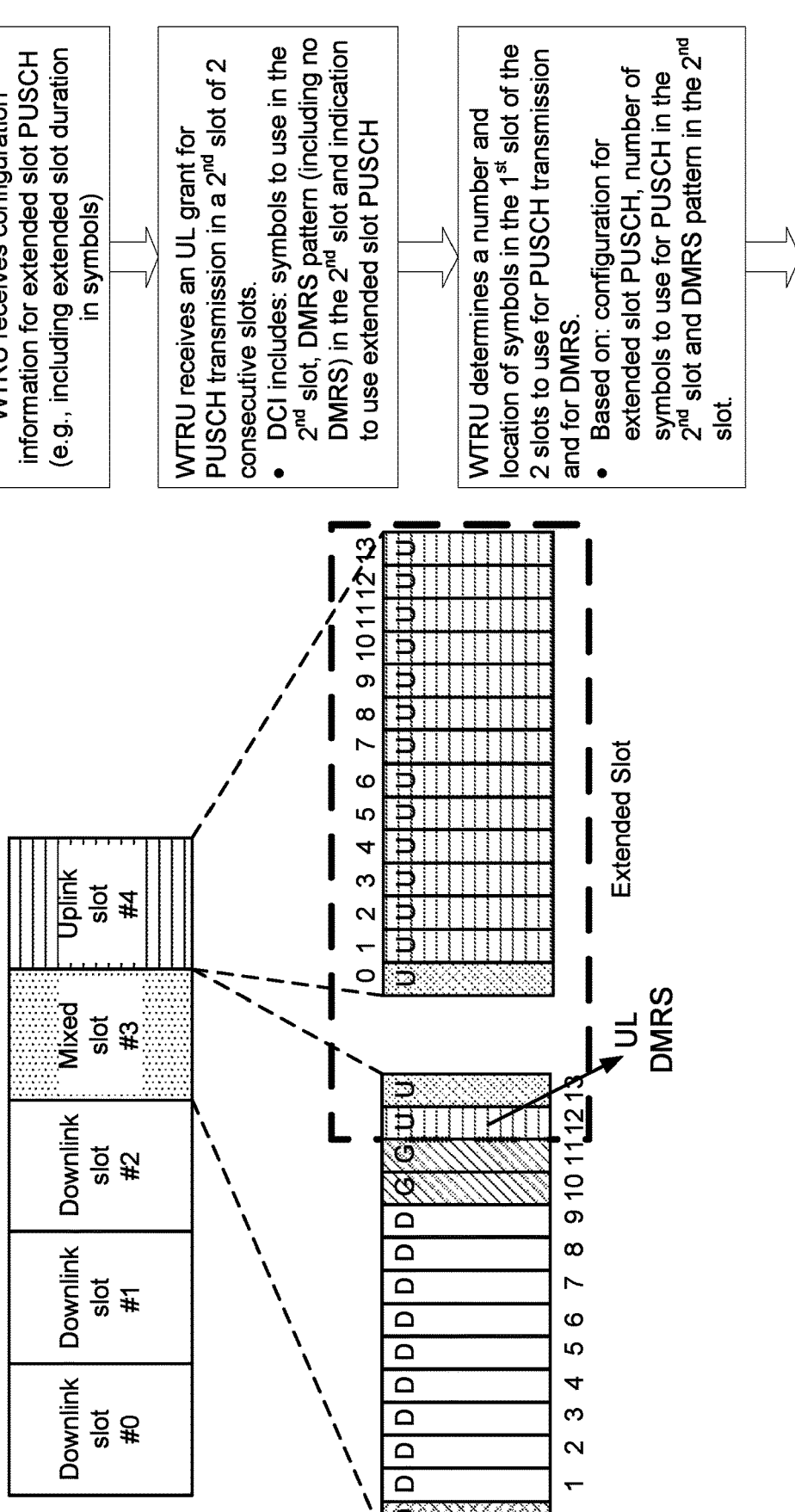

WTRU receives configuration information for extended slot PUSCH (e.g., including extended slot duration in symbols)

WTRU receives an UL grant for PUSCH transmission in a 2nd slot of 2 consecutive slots.
- DCI includes: symbols to use in the 2nd slot, DMRS pattern (including no DMRS) in the 2nd slot and indication to use extended slot PUSCH WTRU determines a number and location of symbols in the 1st slot of the 2 slots to use for PUSCH transmission and for DMRS.
- Based on: configuration for extended slot PUSCH, number of symbols to use for PUSCH in the 2nd slot and DMRS pattern in the 2nd slot.

WTRU transmits PUSCH transmission and DMRS in the 1st slot based on the determined symbol locations and in the 2nd slot based on the DCI contents (WTRU maintains power and phase continuity of the DMRS & PUSCH transmissions over the extended slot duration)

FIG. 7

(a) 1st repetition in the bundle has the reference PTRS (b) 2nd (and beyond) repetition(s) in the bundle

DEMODULATION REFERENCE SIGNALS TRANSMISSION IN WIRELESS SYSTEMS

CROSS-REFERENCE TO RELATED APPLICATIONS

This application is the National Stage Entry under 35 U.S.C. § 371 of Patent Cooperation Treaty Application No. PCT/US2021/044657, filed Aug. 5, 2021, which claims the benefit of Provisional U.S. Patent Application No. 63/061, 397, filed Aug. 5, 2020, Provisional U.S. Patent Application No. 63/091,454, filed Oct. 14, 2020, Provisional U.S. Patent Application No. 63/136,313, filed Jan. 12, 2021, Provisional U.S. Patent Application No. 63/167,893, filed Mar. 30, 2021, and Provisional U.S. Patent Application No. 63/185,760, filed May 7, 2021, the disclosure of which is incorporated herein by reference in its entirety.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are disclosed herein associated with transmission of demodulation reference signals (DMRS) in wireless systems. DMRS symbols may be placed in a slot for channel estimation operations. For example, channel estimation performance may be enhanced based on using an increased number of DMRS symbols. Channel estimation enhancements may be performed by transmitting DMRS symbols in an extended slot, for example, to avoid data degradation (e.g., which may result from replacing data transmission symbols with DMRS symbols). An extended slot may be a slot that includes symbols spanning across multiple slots (e.g., two slots, consecutive slots), for example, such as a slot n and a slot n+1.

A wireless transmit/receive unit (WTRU) may be used in transmission of DMRS. The WTRU may receive downlink control information, for example, that may indicate an uplink grant for a physical uplink shared channel (PUSCH) transmission (e.g., associated with an uplink slot), a number of symbols to use in the uplink slot, a pattern of reference signals (e.g., DMRS) in the uplink slot, and an indication to use an extended slot associated with the PUSCH transmission. The extended slot associated with the PUSCH transmission may include symbols of the uplink slot and symbols of a previous slot (e.g., slot preceding the uplink slot). The previous slot and the uplink slot may be consecutive slots. The pattern of reference signals in the uplink slot may indicate that zero reference signal symbols or more than zero reference signal symbols are in the uplink slot.

The WTRU may determine a number of symbols to use in a portion of the extended slot (e.g., portion of the extended slot associated with the previous slot), for example, based on a duration of the extended slot (e.g., number of symbols in the extended slot), the number of symbols associated with the uplink slot, and/or the pattern of reference signals in the uplink slot. The number of symbols associated with the portion of the extended slot may include at least one of a reference signal symbol (e.g., DMRS symbol) or a data transmission symbol (e.g., PUSCH transmission symbol). The number of symbols associated with the portion of the extended slot may include a number of reference signal symbols (e.g., DMRS symbols) and a number of data transmission symbols (e.g., PUSCH transmission symbols). For example, the number of symbols associated with the extended slot may include zero reference signal symbols or more than zero reference signal symbols.

The WTRU may determine a first part of a transmission and a second part of the transmission. For example, the first part of the transmission may be determined based on the number of symbols associated with the portion of the extended slot. For example, the second part of the transmission may be determined based on the number of symbols associated with the uplink slot and the pattern of reference signals (e.g., DMRS) in the uplink slot. The WTRU may transmit the first part of the transmission in the portion of the extended slot associated with the previous slot. The WTRU may transmit the second part of the transmission in the uplink slot. The WTRU may maintain power and phase continuity over the the first part of the transmission and the second part of the transmission.

The WTRU may determine respective locations (e.g., in the portion of the extended slot associated with the previous slot) of respective symbols of the number of symbols associated with the portion of the extended slot associated with the previous slot. The respective locations of the respective symbols of the number of symbols in the portion of the extended slot associated with the previous slot may be determined, for example, based on the duration of the extended slot, the number of symbols associated with the uplink slot, and/or the pattern fo reference signals (e.g., DMRS) in the uplink slot. The WTRU may determine the first part of the transmission based on the number of symbols associated with the portion of the extended slot and the respective locations of the respective symbols of the number of symbols in the portion of the extended slot associated with the previous slot.

BRIEF DESCRIPTION OF THE DRAWINGS

FIG. 7 illustrates an example of an extended transmission.

DETAILED DESCRIPTION

Figure 1A:
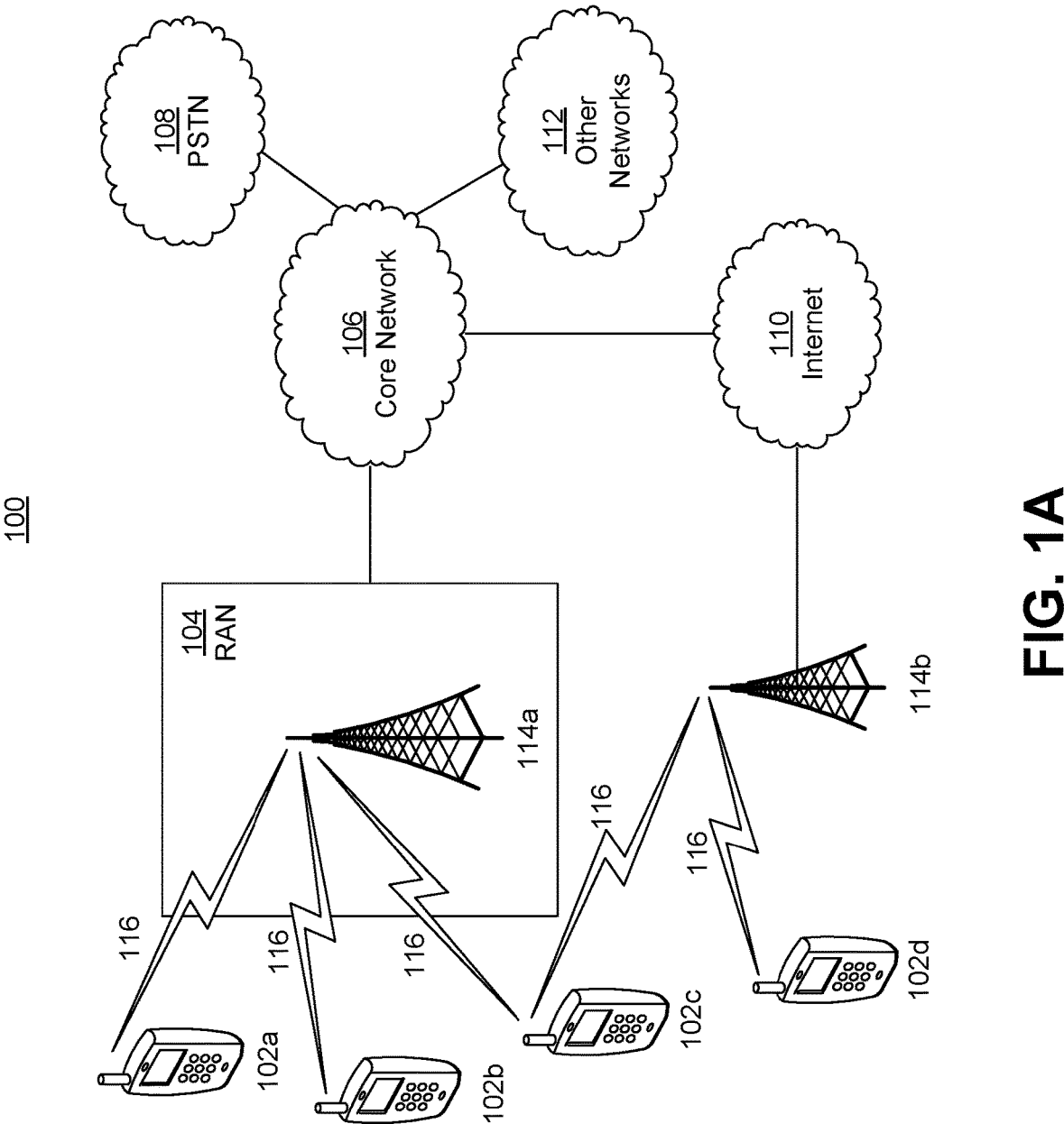
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
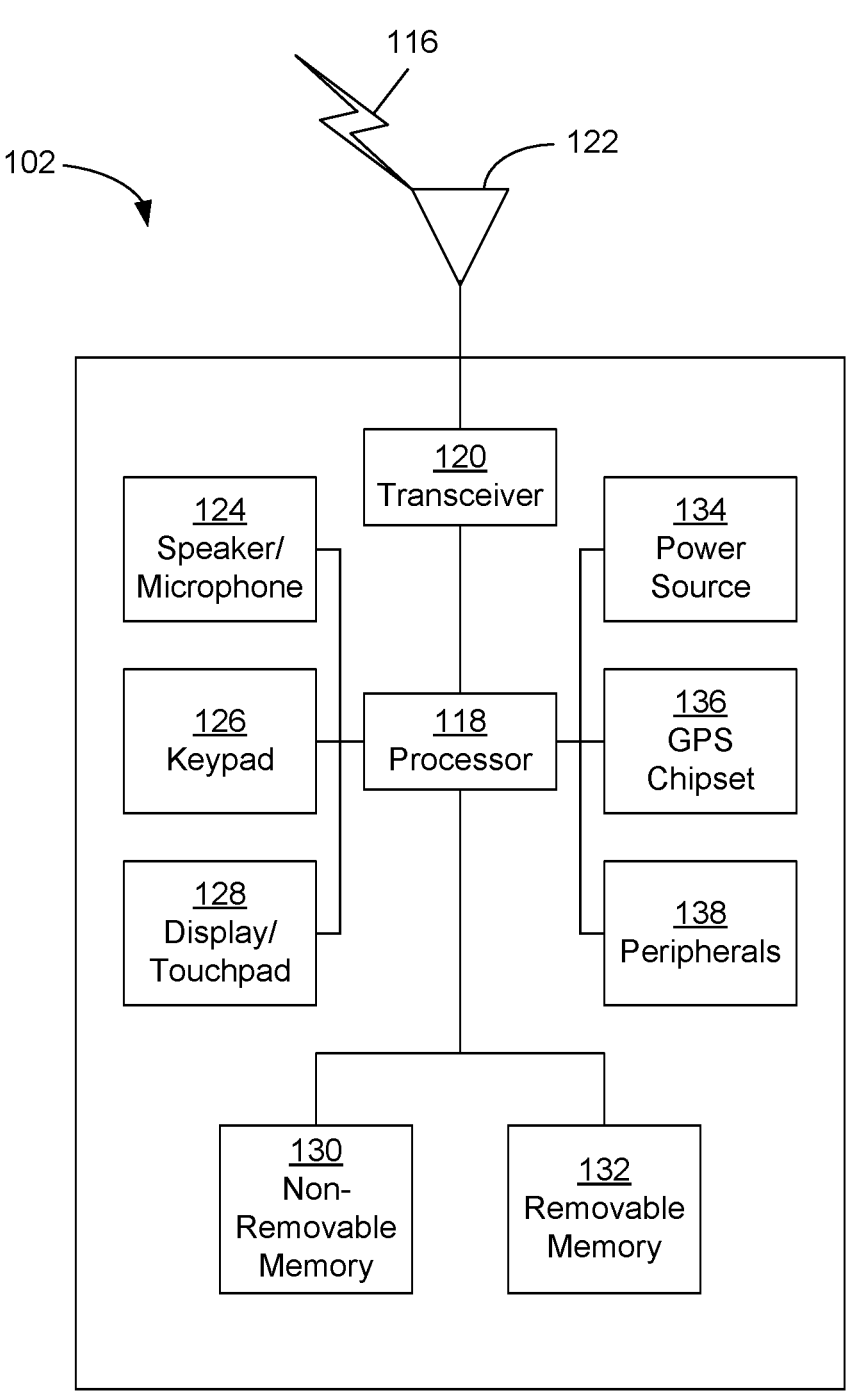
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
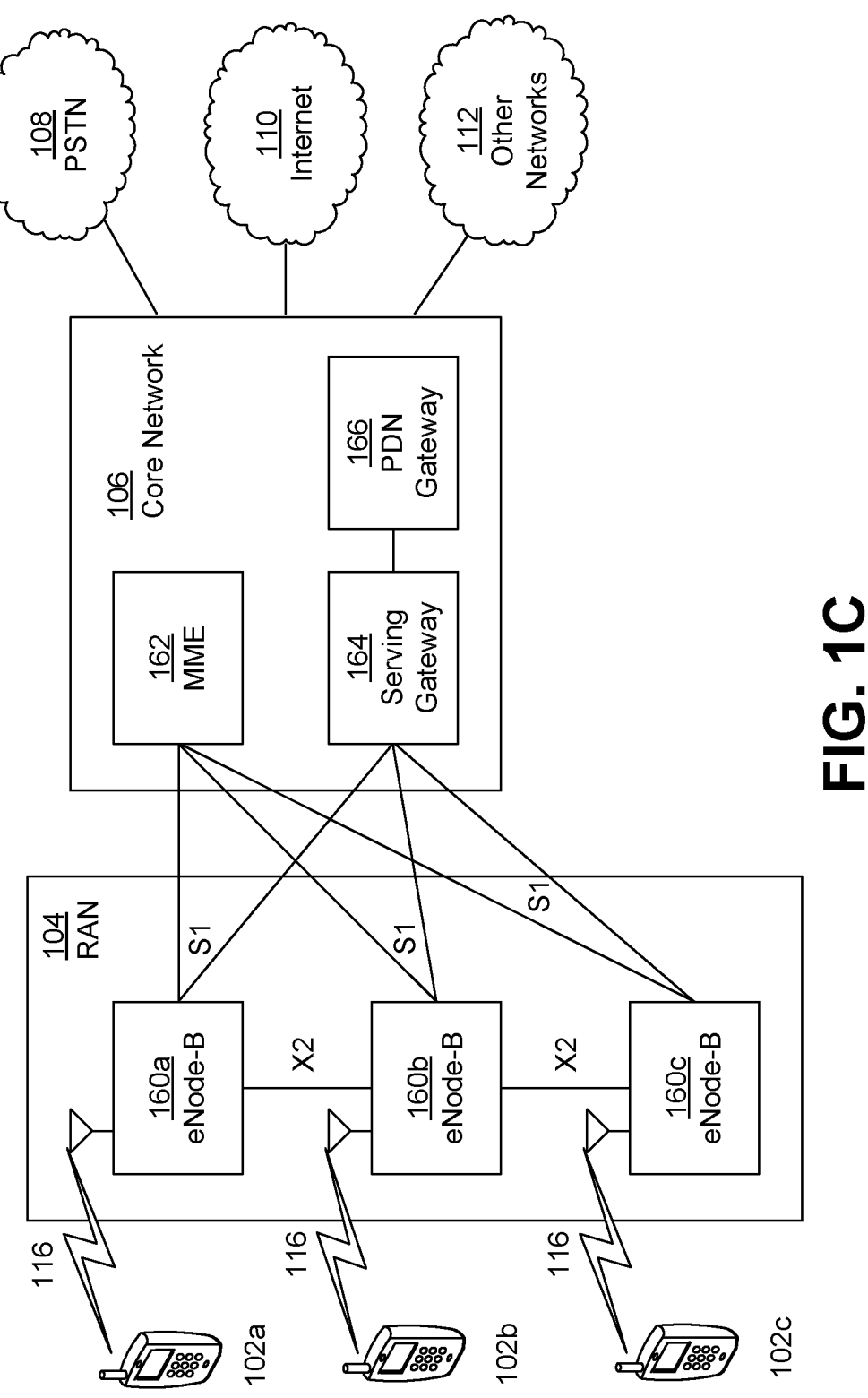
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
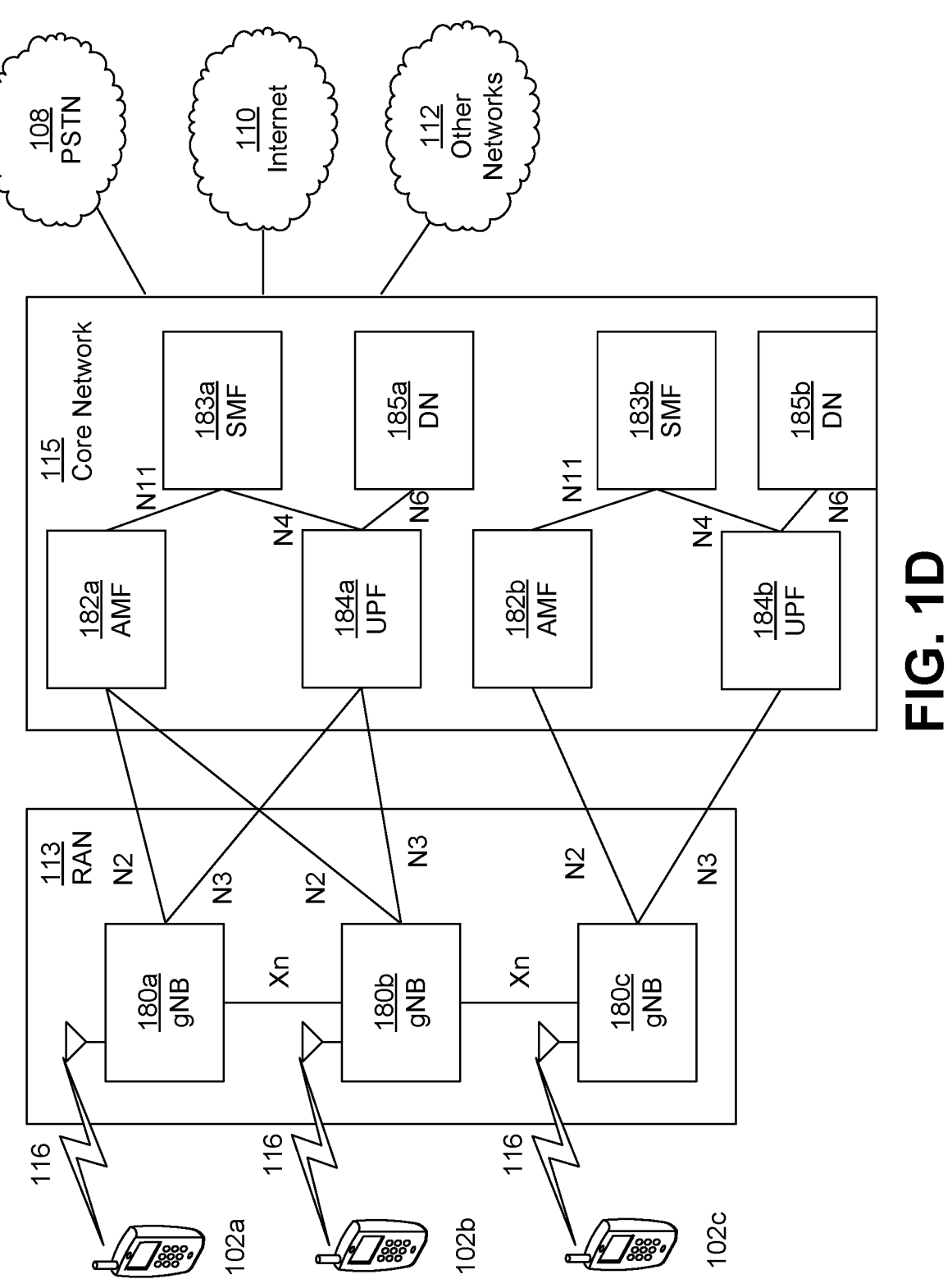
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are disclosed herein associated with transmission of demodulation reference signals (DMRS) in wireless systems. DMRS symbols may be placed in a slot for channel estimation operations. For example, channel estimation performance may be enhanced based on using an increased number of DMRS symbols. Channel estimation enhancements may be performed by transmitting DMRS symbols in an extended slot, for example, to avoid data degradation (e.g., which may result from replacing data transmission symbols with DMRS symbols). An extended slot may be a slot that includes symbols spanning across multiple slots (e.g., two slots, consecutive slots), for example, such as a slot n and a slot n+1.

A wireless transmit/receive unit (WTRU) may be used in transmission of DMRS. The WTRU may receive downlink control information, for example, that may indicate an uplink grant for a physical uplink shared channel (PUSCH) transmission (e.g., associated with an uplink slot), a number of symbols to use in the uplink slot, a pattern of reference signals (e.g., DMRS) in the uplink slot, and an indication to use an extended slot associated with the PUSCH transmission. The extended slot associated with the PUSCH transmission may include symbols of the uplink slot and symbols of a previous slot (e.g., slot preceding the uplink slot). The previous slot and the uplink slot may be consecutive slots. The pattern of reference signals in the uplink slot may indicate that zero reference signal symbols or more than zero reference signal symbols are in the uplink slot.

The WTRU may determine a number of symbols to use in a portion of the extended slot (e.g., portion of the extended slot associated with the previous slot), for example, based on a duration of the extended slot (e.g., number of symbols in the extended slot), the number of symbols associated with the uplink slot, and/or the pattern of reference signals in the uplink slot. The number of symbols associated with the portion of the extended slot may include at least one of a reference signal symbol (e.g., DMRS symbol) or a data transmission symbol (e.g., PUSCH transmission symbol). The number of symbols associated with the portion of the extended slot may include a number of reference signal symbols (e.g., DMRS symbols) and a number of data transmission symbols (e.g., PUSCH transmission symbols). For example, the number of symbols associated with the extended slot may include zero reference signal symbols or more than zero reference signal symbols.

The WTRU may determine a first part of a transmission and a second part of the transmission. For example, the first part of the transmission may be determined based on the number of symbols associated with the portion of the extended slot. For example, the second part of the transmission may be determined based on the number of symbols associated with the uplink slot and the pattern of reference signals (e.g., DMRS) in the uplink slot. The WTRU may transmit the first part of the transmission in the portion of the extended slot associated with the previous slot. The WTRU may transmit the second part of the transmission in the uplink slot. The WTRU may maintain power and phase continuity over the the first part of the transmission and the second part of the transmission.

The WTRU may determine respective locations (e.g., in the portion of the extended slot associated with the previous slot) of respective symbols of the number of symbols associated with the portion of the extended slot associated with the previous slot. The respective locations of the respective symbols of the number of symbols in the portion of the extended slot associated with the previous slot may be determined, for example, based on the duration of the extended slot, the number of symbols associated with the uplink slot, and/or the pattern fo reference signals (e.g., DMRS) in the uplink slot. The WTRU may determine the first part of the transmission based on the number of symbols associated with the portion of the extended slot and the respective locations of the respective symbols of the number of symbols in the portion of the extended slot associated with the previous slot.

A WTRU may apply DMRS bundling, for example, by applying phase and/or power control and/or use the same spatial filter and/or same precoding scheme for DM RS symbols in the DMRS-bundle, if one or more preconfigured conditions are satisfied.

A WTRU may receive bundling indices to determine a group of PUSCH transmissions or PUCCH transmissions within which power or phase continuity is to be maintained.

The WTRU may determine condition(s) to terminate DMRS bundling, for example, based on continuity of slots and/or frequencies over which PUSCH transmissions are scheduled. Once the DMRS bundling termination condition is satisfied, the WTRU may stop maintaining phase and/or power continuity over PUSCH transmissions.

Systems, methods, and instrumentalities are described herein associated with demodulation reference signals (DMRS) transmission in wireless systems. DMRS, DM-RS, DMRS symbol, DMRS tone, DMRS pattern, DMRS instance, DMRS resource, and DMRS time/frequency positions may be used interchangeably. DMRS (e.g., as used herein) may be one or more DMRSs. DMRS(s) may be placed in a physical uplink shared channel (PUSCH) transmission in an uplink slot and/or in the symbols (e.g., uplink symbols) of a previous slot (e.g., preceding slot), for example, depending on conditions, such as the slot format (e.g., extended slot) and/or the number of symbols available for uplink transmission. For example, a slot n may include 10 downlink symbols followed by four (4) uplink symbols while a following slot n+1 may include uplink symbols (e.g., only uplink symbols). A wireless transmit/receive unit (WTRU) may be scheduled to transmit a PUSCH transmission in slot n+1. The WTRU may (e.g., as described herein and shown by example in FIG. 3A) transmit DMRS(s) (e.g., and a portion of the PUSCH transmission) in one or more of the four (4) uplink symbols of slot n (e.g., the previous slot), for example, based on conditions (e.g., slot format of n). The WTRU may transmit fewer DMRS symbols in slot n+1, for example, by transmitting DMRS(s) in slot n.

As will be described herein, a WTRU may receive configuration information for DMRS location across multiple slots and may transmit DMRS according to the configured locations where a number of DMRS may depend on the configured number of slots. A WTRU may determine a location of DMRS across multiple slots where locations are configured according to the parameters related to modulation A WTRU may receive configuration information for DMRS for one unit in a repetition, and may apply the configuration to multiple units and transmit DMRS. A WTRU may receive DMRS configuration information for multiple slots or repetitions and may determine locations of DMRS in specified slots or repetitions in a bundle. A WTRU may receive and determine DMRS configuration information that may include DMRS and/or interference monitoring RS. A WTRU may receive configuration information for DMRS for slot n and slot n+1, and may determine to apply a transmit power control (TPC) command for slot n+1 if DMRS in slot n is used for PUSCH transmission in slot n+1.

As will be described herein, a WTRU may determine frequency hopping patterns for assisting DMRS and may determine to use an extended slot from an indication from the network that the assisting DMRS or extended slot is included in the same hop. A WTRU may determine to perform assisting or extended DMRS transmission, for example, based on implicit indication. A WTRU may determine that no DMRS is configured as an assisting or extended DMRS transmission, for example, via an indication from the network. A WTRU may determine the DMRS configuration of a preceding/previous slot, for example, based on the DMRS configuration of the current slot. A WTRU may determine that extended or assisting DMRS is canceled, for example, based on indication from the network that higher priority channels or reference signals are scheduled.

DMRS placement techniques may reduce DMRS density (e.g., in uplink-only slots), which may increase the number of symbols utilized for PUSCH transmissions, and may improve performance. DMRS placement techniques may support faster processing of PUSCH transmissions by a network, for example, with DMRS being transmitted earlier (e.g., in a previous slot as described herein). DMRS placement techniques may be applicable to other uplink channels (e.g., physical uplink control channel (PUCCH)) and/or downlink transmissions (e.g., physical downlink shared channel (PDSCH) transmissions).

An assisting transmission may be a transmission that includes a subset of symbols of a reference transmission, which may include a DMRS applicable to a reference transmission. DMRS bundling may be applied, for example, if assisting and reference transmissions are in different slots. A WTRU scheduled for a reference transmission may determine to perform an assisting transmission (e.g., under certain conditions). An extended transmission (e.g., a transmission using an extended slot as described herein) may be a transmission with resources that span across at least one slot boundary, which may allow a gNode B (gNB) to start processing from an earlier slot. In an extended transmission, PUSCH transmission may span over multiple slots, for example. A WTRU scheduled for a reference transmission may determine to perform an extended transmission (e.g., under certain conditions).

A WTRU may receive configuration information for DMRS locations across multiple slots. A WTRU may transmit DMRS according to the configured locations. The number of DMRS may depend on the configured number of slots. A WTRU may determine a location of a DMRS across multiple slots. Locations of DMRS may be configured, for example, based on parameters related to modulation. A WTRU may receive configuration information for DMRS, for example, for one unit in a repetition. The WTRU may apply the configuration information to multiple units and transmit DMRS. A WTRU may receive DMRS configuration information for multiple slots or repetitions. A WTRU may determine locations of DMRS in specified slots or repetitions in a bundle. A WTRU may receive and may determine DMRS configuration information that includes a DMRS and/or interference monitoring RS. A WTRU may receive configuration information for DMRS for slot n and slot n+1. A WTRU may apply (e.g., decide to apply) a transmit power control (TPC) command for slot n+1, for example, if DMRS in slot n is used for PUSCH transmission in slot n+1.

Channel estimation may be performed, for example, based on DMRS received by a WTRU or a gNB. DMRS (e.g., as a singular and plural reference to demodulation reference signal(s)) may be transmitted along with data or control channels for uplink and downlink channels. Frequency domain duplexing (FDD) and time domain duplexing (TDD) may be supported for one or more RATs (e.g., 4G LTE, 5G NR). Downlink and uplink transmission (e.g., of DMRS) may be multiplexed, for example, in the frequency domain for FDD. Uplink and downlink transmission (e.g., of DMRS) in TDD may occur at designated slots in the time domain. A slot in TDD may include downlink symbols, uplink symbols, and/or flexible symbols. Downlink and uplink transmission may occur in downlink and uplink symbols, respectively. A WTRU may not make an assumption about usage of flexible symbols. Flexible symbols may be used, for example, as a guard time to switch from downlink to uplink transmission. Frequency domain multiplexing of uplink and downlink transmission may not be permitted in TDD.

Multiple DMRS transmissions for a PUSCH transmission in the same slot may be supported (e.g., by one or more RATs). DMRS configuration across slots may not be supported (e.g., by any RAT). While DMRS may be useful for channel estimation, resources occupied by DMRS may not be available for symbols carrying data or control information. DMRS overhead may increase the number of physical resource blocks (PRBs) to achieve a target data rate, may increase power to achieve a reliability target, and/or may degrade coverage performance, which may be significant in the TDD spectrum and/or for power-limited scenarios. Repetition may be used to maximize coverage. In examples, downlink-only slots and mixed uplink/downlink slots may not be used for repetitions, which may leave a small number of uplink-only slots available.

The number of PRBs used to achieve a target data rate may increase with the number of DMRS symbols in a PUSCH transmission. As an example of the effect that the number of DMRS symbols have on the number of PRBs, consider an example of a modulation and coding scheme (MCS) (e.g., MCS index 9) for a PUSCH transmission with transform precoding, 64 quadrature amplitude modulation (QAM), quadrature phase shift keying (QPSK), spectral efficiency=1.3262, and target data rate=5 Mbps, Table 1 demonstrates that the number of PRBs may rise as the number of DMRS symbols rise.

TABLE 1

Example of relationship between the number of DMRS symbols and PRBs

| 1 symbol DMRS | $1000/156/1.3262 = 4.83$ | 5 PRBs |
| 2 symbol DMRS | $1000/144/1.3263 = 5.23$ | 6 PRBs |
| 3 symbol DMRS | $1000/132/1.3263 = 5.71$ | 6 PRBs |
| 4 symbol DMRS | $1000/120/1.3263 = 6.28$ | 7 PRBs |

As an example of the effect that the number of DMRS symbols have on the number of PRBs, consider an example of an MOS (e.g., MCS index 1) for PUSCH with transform precoding, 64 QAM, pi/2 binary phase shift keying (BPSK), spectral efficiency=0.3066, and target data rate=5 Mbps. Table 2 demonstrates that the number of PRBs rise as the number of DMRS symbols rise.

TABLE 2

Example of relationship between the number of DMRS symbols and PRBs

| 1 symbol DMRS | $1000/156/0.3066 = 20.9$ | 21 PRBs |
| 2 symbol DMRS | $1000/144/0.3066 = 22.64$ | 23 PRBs |
| 3 symbol DMRS | $1000/132/0.3066 = 24.70$ | 25 PRBs |
| 4 symbol DMRS | $1000/120/0.3066 = 27.17$ | 28 PRBs |

Figure 2A:
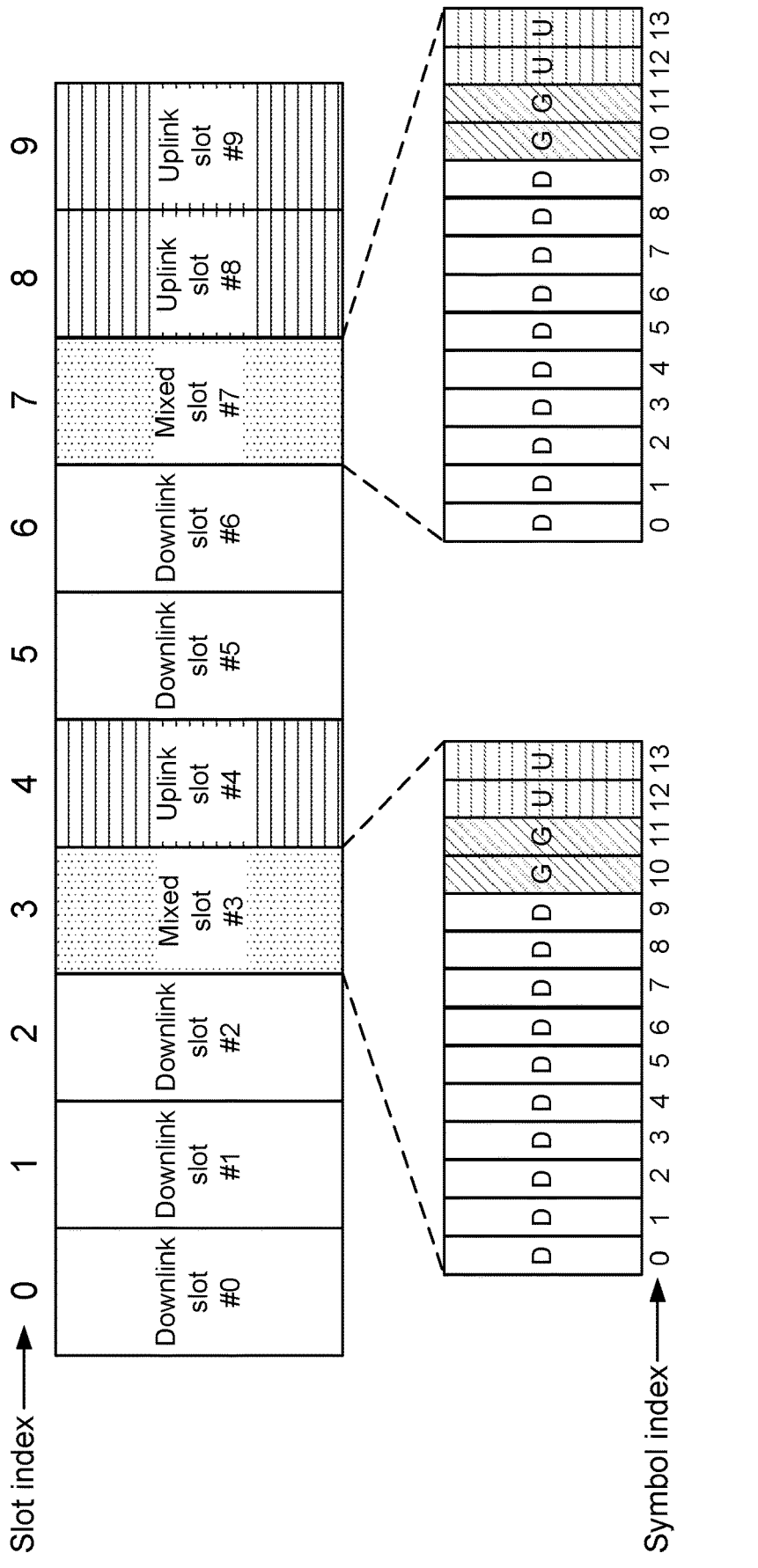
FIG. 2A illustrates an example of a TDD configuration.

FIG. 2A illustrates an example of a TDD configuration. As shown by example in FIG. 2A, efficient DMRS placement (e.g., in TDD mode) may be used (e.g., given a limited number of uplink slots). Downlink slots, uplink slots, and special slots (e.g., mixed slots) are shown in FIG. 2A. A special slot (e.g., a mixed slot) may contain downlink symbols, unscheduled downlink/uplink symbols, flexible symbols, and/or guard symbols. Downlink and uplink slots may include downlink symbols "D" (e.g., only downlink symbols "D") and uplink symbols "U" (e.g., only uplink symbols "U"), respectively. Mixed slots (e.g., as shown by example in FIG. 2A) may have 10 downlink symbols "D", 2 flexible symbols "G" and 2 uplink symbols "U".

A property of a grant or assignment may include, for example, one or more of the following: a frequency allocation; an aspect of time allocation (e.g., a duration); a priority; an MCS; a transport block (TB) size; a number of spatial layers; a number of TBs; a transmission configuration index (TCI) state, channel state information-reference signal (CSI-RS) resource indicator (CRI), or sounding reference signal (SRS) resource index (SRI); a number of repetitions; a repetition scheme type (e.g., Type A or Type B); a type of grant (e.g., a configured grant (CG) type 1, type 2 or a dynamic grant (DG)); a type of assignment (e.g., whether the assignment is a dynamic assignment or a configured assignment, such as a semi-persistent scheduling (SPS) assignment); a type of index (e.g., a CG index or a semi-persistent assignment index); a periodicity of a configured grant or assignment; a channel access priority class (CAPC); any parameter provided in downlink control information (DCI), by medium access control (MAC) signaling, or by radio resource control (RRC) signaling for scheduling a grant or assignment; and/or the like. A property of data included in a TB may refer to any parameter that may configure a logical channel (LCH) or radio bearer (RB) for which data may be included in the TB (e.g., at least one of an LCH priority, prioritized bit rate, LCH group, radio link control (RLC) mode, or the like). A property of a grant or assignment may refer to a property of the data included in the corresponding TB.

An indication by DCI may include, for example, one or more of the following. An indication by DCI may include, for example, an indication (e.g., explicit indication) by a DCI field or by a radio network temporary identifier (RNTI) that may be used to mask a cyclic redundancy check (CRC) of a PDCCH. An indication by DCI may include, for example, an indication (e.g., implicit indication) by a property, such as a DCI format, a DCI size, a control resource set (CORESET) or search space, an aggregation level (AL), or a first resource element (RE) of a received DCI (e.g., an index of a first control channel element (CCE)), where the mapping between the property and the value may be signaled (e.g., by RRC signaling or MAC signaling).

Slots, e.g., in TDD, may include downlink, uplink, and/or flexible symbols. A downlink slot (e.g., or downlink-only slot) may include downlink symbols (e.g., only downlink symbols). An uplink slot (e.g., or uplink-only slot) may include uplink symbols (e.g., only uplink symbols). A slot that is not a downlink-only slot or an uplink-only slot may be referred to as a mixed slot. A mixed slot may include, for example, one or more downlink symbols, (e.g., followed by) zero or more flexible symbols, and (e.g., followed by) one or more uplink symbols. A WTRU may not make an assumption (e.g., any assumptions) about usage of flexible symbols. Flexible symbols may be used, for example, as a guard time to switch from downlink to uplink transmission. A mixed slot may be a flexible slot, where direction (e.g., DL or UL) may be dynamically determined (e.g., via DCI and/or MAC-CE). A mixed slot may be a slot where at least one symbol may be configured as a flexible symbol. The direction of a flexible symbol may be dynamically determined (e.g., via DCI and/or MAC-CE).

DMRS bundling may be implemented. In examples, one or more aspects of DMRS bundling may be described by the following. DMRS bundling may apply to a set of DMRS over multiple time symbols (e.g., in a same slot or different slots), wherein such set may be referred to as a DMRS bundle. DMRS bundling may apply to a set of DMRS positions in the time and/or frequency domain. The set of DMRS positions in the time and/or frequency domain may be referred to as a DMRS bundle. The positions may be time symbols in the same or different slots. The positions may be resource blocks in same or different bandwidth parts. DMRS bundling may be applied to multiple sets of DMRS. For example, DMRS bundling may apply to DMRS(s) in multiple PUSCH transmissions (e.g., PUSCH transmissions from the same transport block or PUSCH transmissions may be generated from different transport blocks) or repetitions of PUSCH transmission. A WTRU may transmit DMRS using one or more of the same phase, amplitude, power, spatial filter, and/or precoding over a DMRS bundle. A WTRU may receive DMRS assuming that one or more of a same phase, amplitude, power, spatial filter, QCL relationship and/or precoding (e.g., precoding matrix or precoding scheme) is applied over a DMRS bundle. In such case, the WTRU may coherently combine reception of different DMRS positions of the bundle, e.g., to obtain a more accurate channel estimate. For example, the WTRU may assume that a same precoding matrix or precoding scheme may be applied to DMRS in the DMRS bundle. The WTRU may assume that data symbols associated with the DMRS bundle may use the same precoding matrix or precoding scheme. A WTRU may receive DMRS assuming that DMRS (e.g., all DMRS) of a bundle have a quasi co-location (QCL) relationship with each other, for example, for at least one type (e.g., A, B, C or D).

DMRS bundling may be applicable to (e.g., performed in associated with) one or more of the following: DMRS in PUSCH transmission repetitions or PUCCH transmission repetitions; DMRS in PUSCH transmission(s) not configured for repetitions or PUCCH transmission(s) not configured for repetitions; DMRS in PUSCH transmissions scheduled for dynamic or configured grants; DMRS in PUSCH transmissions scheduled in contiguous or non-contiguous slots; DMRS in PUSCH transmission(s) corresponding to one transport block; and/or DMRS in PUSCH/PUCCH transmissions configured for inter-slot frequency hopping or intra-slot frequency hopping.

A WTRU may receive configuration information which may indicate the size of a DMRS bundle. For example, the DMRS bundle may contain DMRS from multiple contiguous or non-contiguous slots. The configuration information may contain one or more of the following: the number of slots or symbols in a DMRS bundle, the starting slot or symbol number at which the DMRS bundle starts, or a duration of the DMRS bundle.

A WTRU may receive configuration information for a distance between slots (e.g., the maximum distance between two slots) over which DMRS may be bundled. The WTRU may determine whether DMRS in a PUSCH/PUCCH transmission in the slots are to be bundled or not, for example, depending on a distance between the slots in the time domain. The distance may be used as threshold(s), and the threshold(s) may be obtained via one or more of the following: signaled by MAC signaling, configured by RRC signaling, or indicated in the DCI associated with a PUSCH transmission. The distance may be based on (e.g., expressed in terms of) the number of slots or symbols. The WTRU may include the distance between the slots over which DMRS may be bundled in its capability information and/or transmit information about the distance to the network. The capability information may indicate how long the WTRU may keep the same phase. The capability information may indicate how long the WTRU may keep the same amplitude or power. The capability information may indicate how long the WTRU may keep the same spatial filter.

A WTRU may receive an indication (e.g., from the network) to perform DMRS bundling. The indication from the network may be included in one or more of: a DCI, a MAC-CE or RRC signaling. The WTRU, for example, based on the reception of the indication, may apply one or more of power control, phase control, or filtering to DMRS or a PUSCH/PUCCH transmission that includes DMRS, such that one or more of the following are applied to DMRS symbols in the DMRS-bundle: the same phase, the same amplitude or power, the same spatial filter, and/or the same precoding scheme. The WTRU, based on the reception of the indication, may apply one or more of power control, phase control, or filtering to DMRS or a PUSCH/PUCCH transmission that includes DMRS, for example, such that power or phase coherence is maintained between PUSCH transmission(s) or PUCCH transmission(s), e.g., in contiguous or non-contiguous slots which contain the DMRS to be bundled.

A reference signal (RS) configuration may be bundling-dependent.

The WTRU may receive at least one RS configuration applicable to a set of transmissions over which bundling may be applied. An RS configuration may be defined by a set of reference signals of possibly different types (e.g., DMRS (s) or phase-tracking reference signal(s) (PTRS(s)), for example, in specific resource elements associated with the set of transmissions. The reference signals and resource elements on which the reference signals are mapped may depend on a certain transmission (e.g., a transmission from the set of transmissions of a bundle).

The WTRU may determine a first RS configuration where bundling is not applied for a set of transmissions, and the WTRU may determine a second RS configuration where bundling is applied. The WTRU may determine the second RS configuration based on a property of the bundle, such as at least one of the following: the number of transmissions within the bundle; the duration of the bundle (e.g., in slots or time symbols); and/or whether transmissions within the bundle are contiguous or not. Examples of bundling-dependent RS configurations and associated conditions may be described herein.

Phase/power correction may be applied, for example, based on one or more conditions.

A WTRU, based on an indication received from the network to perform DMRS bundling, may apply one or more of power control, phase control, or filtering to DMRS or a PUSCH/PUCCH transmission that includes DMRS if one or more of the following conditions are met.

The WTRU may apply one or more of power control, phase control, or filtering to DMRS or a PUSCH/PUCCH transmission that includes DMRS, for example, if the WTRU receives an indication (e.g., explicit indication) from the network to apply one or more of power control, phase control, the same spatial filter, and/or the same precoding scheme over PUSCH transmission(s) and/or PUCCH transmission(s) that contain bundled DMRS. For example, the WTRU may receive an explicit indication for DMRS bundling prior to the PUSCH transmission(s) with the DMRS. In this case, the WTRU may apply power/phase control, for example, so that power or phase continuity is preserved between PUSCH transmission(s (e.g., two PUSCH transmissions) which contain bundled DMRS.

The WTRU may apply one or more of power control, phase control, or filtering to DMRS or a PUSCH/PUCCH transmission that includes DMRS, for example, if the WTRU is scheduled with PUCCH or PUSCH transmission repetitions with SRS repetitions in the same slot. For example, a slot of multiple slots (e.g., each slot of multiple slots) that contain PUSCH or PUCCH transmission repetitions may contain SRS. The SRS may be repeated in the aforementioned slots.

The WTRU may apply one or more of power control, phase control, or filtering to DMRS or a PUSCH/PUCCH transmission that includes DMRS, for example, if the WTRU receives configuration information for DMRS bundling for DMRS in a PUSCH or PUCCH transmission in contiguous or non-contiguous slots (e.g., multiple contiguous or non-contiguous slots). For example, in the slot of the multiple contiguous or non-contiguous slots (e.g., each slot of the multiple contiguous or non-contiguous slots), there may be zero symbols after a PUSCH or PUCCH transmission (e.g., the last symbol of the slot is the last symbol in the PUSCH or PUCCH transmission).

The WTRU may apply one or more of power control, phase control, or filtering to DMRS or a PUSCH/PUCCH transmission that includes DMRS, for example, if the WTRU receives configuration information for DMRS bundling for DMRS in PUSCH transmission(s) or PUCCH transmission(s) in multiple contiguous or non-contiguous slots, and the slot associated with the DMRS bundle (e.g., each slot associated with the DMRS bundle) may be occupied by a PUSCH transmission or PUCCH transmission (e.g., occupied entirely by a PUSCH transmission or PUCCH transmission such that there are no other channels or reference signals scheduled in each slot).

The WTRU may apply one or more of power control, phase control, or filtering to DMRS or a PUSCH/PUCCH transmission that includes DMRS, for example, if the WTRU receives configuration information for DMRS bundling for DMRS in PUSCH transmission repetitions (e.g., actual PUSCH transmission repetitions within a slot or in different slots).

The WTRU may apply one or more of power control, phase control, or filtering to DMRS or a PUSCH/PUCCH transmission that includes DMRS, for example, if the WTRU is scheduled to transmit back-to-back PUCCH transmissions (e.g., PUCCH transmissions may be scheduled in contiguous slots).

The WTRU may apply one or more of power control, phase control, or filtering to DMRS or a PUSCH/PUCCH transmission that includes DMRS, for example, if multi-user multiplexing is not enabled for PUSCH transmissions or PUCCH transmissions.

The WTRU may apply one or more of power control, phase control, or filtering to DMRS or a PUSCH/PUCCH transmission that includes DMRS, for example, if DMRS are in multiple slots, where the slot (e.g., each slot) of the multiple slots contains PUSCH transmissions or PUCCH transmissions with the same DMRS pattern (e.g., in terms of a density in the time and/or frequency domain, and/or in terms of the number of DMRS symbols in a slot).

The WTRU may apply one or more of power control, phase control, or filtering to DMRS or a PUSCH/PUCCH transmission that includes DMRS, for example, if a set of DMRS are included over multiple slots, for example, when PUSCH or PUCCH transmission repetitions are enabled over the multiple slots. In this case, a DMRS bundle may include DMRS symbols from multiple PUSCH or PUCCH transmission repetitions.

The WTRU may apply one or more of power control, phase control, or filtering to DMRS or a PUSCH/PUCCH transmission that includes DMRS, for example, based on a preconfigured priority (e.g., based on usage of uplink reference signal transmission). For example, if an SRS is configured for antenna switching, the WTRU may determine to apply power or phase control over DMRS in the DMRS bundle.

The WTRU may apply one or more of power control, phase control, or filtering to DMRS or a PUSCH/PUCCH transmission that includes DMRS, for example, if the WTRU receives multiple TPC commands in DCI (e.g., where each TPC command may be associated with different PUSCH). The WTRU may accumulate the TPC commands and apply TPC to the associated PUSCH transmission, for example, such that the power is conserved over the bundled DMRS.

Phase/power correction may not be applied (e.g., may be skipped) based on one or more conditions.

A WTRU may apply DMRS bundling by using a different phase, a different amplitude or power, a different spatial filter, and/or a different precoding scheme for DMRS symbols in the DMRS-bundle, for example, if one or more of the following conditions are met. In examples, the WTRU may apply DMRS bundling by not using the same phase, same amplitude or power, same spatial filter, and/or same precoding scheme for DMRS symbols in the DMRS-bundle, for example, if one or more of the following conditions are met.

The WTRU may skip applying phase/power correction, for example, if the WTRU receives an indication to apply DMRS bundling (e.g., from the network) but does not receive at least one of the following indications: TPC command(s); command(s) related to phase control; command(s) to use the same spatial filter or precoding scheme to PUSCH transmission(s) or PUCCH transmission(s) that contain DMRS to be bundled.

The WTRU may skip applying phase/power correction, for example, based on channel variation measured by one or more of absolute or relative WTRU mobility, doppler shift/spread, or delay spread.

The WTRU may skip applying phase/power correction, for example, if changes in the number of paths are observed.

The WTRU may skip applying phase/power correction, for example, based on a preconfigured priority (e.g., based on usage of uplink reference signal transmission). For example, if an SRS is configured for antenna switching, the WTRU may determine to skip applying power or phase control over DMRS in the DMRS bundle.

The WTRU behavior or conditions herein may be applicable to DMRS bundling applied to PUSCH transmissions or PUCCH transmissions.

A WTRU may determine a priority of DMRS bundling compared to other transmissions, for example, based on at least one of the following conditions: if the WTRU supports SRS for antenna switching, while performing DMRS bundling for PUSCH transmissions or PUCCH transmissions, the WTRU may not switch the antenna pair (e.g., the DMRS bundling operation may have priority over SRS with antenna switching); in examples, SRS with antenna switching may have priority over DMRS bundling (e.g., if the WTRU transmits SRS, it may implicitly mean that the current ongoing DMRS bundle is not a valid estimation, so the base station receiver may switch to the normal DMRS usage).

DMRS bundling may be performed for dynamic grants.

A WTRU may be configured to transmit a first PUSCH transmission and a second PUSCH transmission. The WTRU may determine to apply bundling for the DMRS of the first and second PUSCH transmission based on one or more of the following.

In examples, the WTRU may receive an indication from the DCI associated with a second PUSCH transmission, where the second PUSCH transmission may differ from (e.g., be later in time than) a first PUSCH transmission. The indication may be signaled (e.g., as a field of the DCI). For example, the indication may be associated with a TPC field where one of the values of the TPC field (e.g., a first value, for example zero (0)) may indicate that bundling may be applied, and other values (e.g., a second value, for example a value other than zero (0)) may indicate that bundling may not be applied.

In examples, the WTRU may determine a bundling group index for a first PUSCH transmission and a second PUSCH transmission (e.g., each of the first PUSCH transmission and the second PUSCH transmission). The WTRU may apply bundling if the bundling group index associated with the first PUSCH transmission and the bundling group index associated with the second PUSCH transmission are the same. The WTRU may skip applying bundling (e.g., not apply bundling) if the bundling group index associated with the first PUSCH transmission and the bundling group index associated with the second PUSCH transmission are not the same. In examples, based on a value of a bundling group index, the WTRU may skip applying (e.g., not apply bundling) bundling with other PUSCH transmissions (e.g., any other PUSCH transmissions).

The WTRU may determine a bundling group index for a PUSCH transmission using one or more the following.

The WTRU may determine a bundling group index for the PUSCH transmission using an indication by DCI associated with the PUSCH transmission.

The WTRU may determine a bundling group index for the PUSCH transmission using signaling by MAC CE or configuration information (e.g., by RRC signaling) for a configured grant configuration corresponding to the PUSCH transmission.

The WTRU may determine a bundling group index for the PUSCH transmission using a time pattern associated with the bundling group index. The WTRU may determine the bundling group index based on the time pattern which overlaps with the PUSCH transmission. For example, a time pattern may include a set of time periods of a certain duration that recur with a certain periodicity. One or more of the periodicity of the time pattern, the duration of the time pattern, and/or the associated bundling group index may be configured (e.g., by RRC signaling).

The WTRU may determine a bundling group index for the PUSCH transmission using frequency resources associated with a bundling group index. The WTRU may determine that the PUSCH transmission is associated with a bundling group index, for example, if its frequency allocation is contained in (e.g., overlaps with) the frequency resources associated to this bundling group index. The frequency allocation corresponding to a bundling group index may be configured (e.g., by RRC signaling).

In examples, the WTRU may determine to apply bundling for the DMRS of a first PUSCH transmission and a second PUSCH transmission based on one or more of: whether the time difference between the end of the first PUSCH transmission and the beginning of the second PUSCH transmission is within a threshold; and/or whether a combined frequency span (e.g., the total frequency span) of the first PUSCH transmission and second PUSCH transmission is within a threshold.

The threshold(s) used in one or more examples herein may be obtained based on at least one of the following: a MAC signaling, an RRC signaling, or an indication by the DCI associated with the first PUSCH transmission or the second PUSCH transmission.

In examples, if grants for PUSCH transmissions are configured dynamically, a WTRU may perform one or more of the following to bundle DMRS symbols in different PUSCH transmissions.

The WTRU may receive DCI for an uplink grant with an explicit or implicit bundling indication, which may indicate the beginning of DMRS bundling (e.g., the WTRU may apply power or phase control to maintain power or phase continuity between PUSCH transmission(s)). The WTRU may send the PUSCH transmission corresponding to the given grant. The WTRU may perform (e.g., or skip) the above, for example, based on whether the WTRU is to store the power/phase status, spatial filter, or precoding scheme at the end of the latest PUSCH transmission transmitted to the network.

The WTRU may receive DCI with an uplink grant and an explicit or implicit bundle indication. The WTRU may apply power/phase correction to the DMRS, for example, so that phase/power continuity is maintained between the DMRS in the next PUSCH transmission and the DMRS in the current PUSCH transmission. For example, the next PUSCH transmission and the current PUSCH transmission may be consecutive. Phase/power continuity may be maintained between consecutive PUSCH transmissions.

If the WTRU continues to receive DCI with the bundle indication, the WTRU may continue to perform power/phase control on the PUSCH transmission containing DMRS.

The WTRU may pause to maintain phase/power continuity if one or more of the following conditions are satisfied: the WTRU receives the DCI without the bundle indication; the WTRU receives an indication in the DCI (e.g., to terminate DMRS bundling); the WTRU does not receive the DCI with the bundle indication over a preconfigured time (e.g., 20 ms, which may be the maximum possible duration the WTRU may maintain power within the relative accuracy tolerance requirement); if (e.g., once) the WTRU receives an explicit indication from the network (e.g., to stop the DMRS bundling process); and/or the WTRU observes channel variation (e.g., measured by one or more of an absolute or relative WTRU mobility, Doppler shift/spread, or delay spread, and/or changes in the number of paths). The WTRU may include the aforementioned change in the environment (e.g., channel variation) in an indication to the network indicating termination of the DMRS bundling process. The WTRU may transmit an indicator informing the network about a termination of the DMRS bundling process.

One or more bundling group indices may associated with a grant.

A WTRU may receive bundling group indices by one or more of an RRC signaling, or a dynamic indication or signaling (e.g., DCI or MAC-CE). The WTRU may determine to bundle DMRS in PUSCH transmission(s) in configured/dynamic grants, for example, if the grants are associated with the same bundling group index.

Bundling group indices may be associated with a type of grant(s) in which a PUSCH transmission is sent. For example, bundling group indexing may be associated with a grant as follows: a bundling group index may be associated with different configured grant indices; a bundling group index may be associated with a type of grant (e.g., configured or dynamic), for example, different bundling indices may be associated with a dynamic grant and a configured grant; association of bundling group index with a grant may be determined dynamically. A dynamic and a configured grant may be associated with a bundling index, for example, if the association of bundling group index with a grant is determined dynamically.

Cross-channel DMRS bundling/cross-repetition bundling may be performed.

A WTRU may apply DMRS bundling if one or more of the following conditions are satisfied: the bundling group index associated with a first PUSCH transmission and the bundling group index associated with a second PUCCH transmission are the same; the bundling group index associated with a first PUSCH transmission which is part of PUSCH transmission repetition and the bundling group index associated with a second PUSCH transmission which is not part of the PUSCH transmission repetition are the same; and/or the bundling group index associated with a first PUSCH/PUCCH transmission which is part of a PUSCH/PUCCH transmission repetition and the bundling group index associated with a second PUSCH/PUCCH transmission which is part of a different PUSCH/PUCCH transmission repetition are the same. DMRS bundling of cross-repetition may be performed. For example, for two different repetitions (e.g., PUSCH transmission repetitions and PUCCH transmission repetitions), DMRS from PUSCH transmissions (e.g., part of a PUSCH transmission repetition) may be bundled from DMRS from PUCCH transmission (e.g., part of a PUCCH transmission repetition).

DMRS bundling for a CG may be dynamically indicated.

A WTRU may be indicated to bundle multiple PUSCH transmissions which are not part of repetitions in configured grants. The PUSCH transmission may be bundled using the following example implementation. In the example implementation, the WTRU may receive a DCI prior to the PUSCH transmission (e.g., each PUSCH transmission) in a CG. The DCI may contain a bundling indication (e.g., explicit/implicit bundling indication). The WTRU may apply power or phase correction to the DMRS in the indicated PUSCH transmission, for example, so that phase or power continuity is maintained between PUSCH transmissions. In the example implementation, the WTRU may be preconfigured with a formula (e.g., that may depend on the CG parameters) that may be used to determine DMRS whether PUSCH transmissions are to be bundled or not. To bundle DMRS symbols in different PUSCH transmissions, the WTRU may receive semi-static configuration information which indicates bundling pattern(s).

DMRS bundling may be terminated based on one or more conditions (e.g., termination conditions).

A WTRU may determine one or more conditions to terminate DMRS bundling, for example, based on a continuity of slots and/or frequencies over which PUSCH transmissions are scheduled. If a DMRS bundling termination condition is satisfied, the WTRU may stop maintaining phase and/or power continuity over PUSCH transmissions, Resource(s) may be used (e.g., wasted) to maintain power and/or phase continuity between PUSCH transmissions, for example, without a condition to terminate DMRS bundling, PUSCH transmissions may include multiple transmission occasions in repetition type A/B or PUSCH transmissions from different TBs, for example, During DMRS bundling, the WTRU may maintain phase and/or power continuity, for example, such that the base station (e.g., the gNB) may use DMRS symbols from multiple slots/repetitions jointly to perform a joint channel estimation. The WTRU may enable DMRS bundling by starting to maintain phase and/or power continuity across PUSCH transmissions. The WTRU may disable DMRS bundling by stopping a maintenance of phase and/or power continuity across PUSCH transmissions, for example, if the DMRS bundling termination condition is satisfied.

A WTRU may perform one of more of the following to determine the condition to terminate DMRS bundling.

The WTRU may receive an indication to enable DMRS bundling from the network (e.g., the gNB), for example, via DCI, signaling via MAC-CE, or via RRC signaling. The WTRU may receive the indication, for example, via DCI associated to the PUSCH, signaling via MAC CE, or configuration information (e.g., via RRC signaling) for a configured grant configuration corresponding to the PUSCH transmission.

The WTRU may determine the termination condition(s) for DMRS bundling based on a continuity of slots in time and frequency over which N PUSCH transmissions (e.g., N type A repetitions, N type B nominal repetitions, PUSCH transmissions from different TBs) are scheduled. In examples, the WTRU may keep DMRS bundling enabled (e.g., maintain phase and power continuity across PUSCH transmissions, uplink data symbols and uplink DMRS symbols) until a specified or configured resource (e.g., a last slot of N consecutive slots) is used, until a preconfigured time expires, until the end of the preconfigured time window where the length of the time window may be expressed in terms of symbols, slots, or repetitions (e.g., number of repetitions for Type A repetitions or actual/nominal repetitions for Type Be repetitions) and the time window may be configured over continuous/non-continuous uplink slots, until the WTRU receives an indication (e.g., via DCI, MAC-CE signaling, or RRC signaling) from the network (e.g., gNB) to disable DMRS bundling, until the last symbol that contains PTRS which is associated with the DMRS symbols in the DMRS bundle, or until a completion of a certain number of transmissions. The WTRU may disable DMRS bundling (e.g., use different spatial filters for DMRS symbols and/or different precoding schemes for DMRS symbols) if the specified or configured resource is used, if the preconfigured time expires, if the end of the preconfigured time window expires where the length of the time window may be expressed in terms of symbols, slots, or repetitions (e.g., number of repetitions for Type A repetitions or actual/nominal repetitions for Type B repetitions) and the time window may be configured over continuous/non-continuous uplink slots, if the WTRU receives an indication (e.g., via DCI, MAC-CE signaling, or RRC signaling) from the network (e.g., gNB) to disable DMRS bundling, after the last symbol that contains PTRS which is associated with the DMRS symbols in the DMRS bundle, or if a completion of the certain number of transmissions.

Figure 2B:
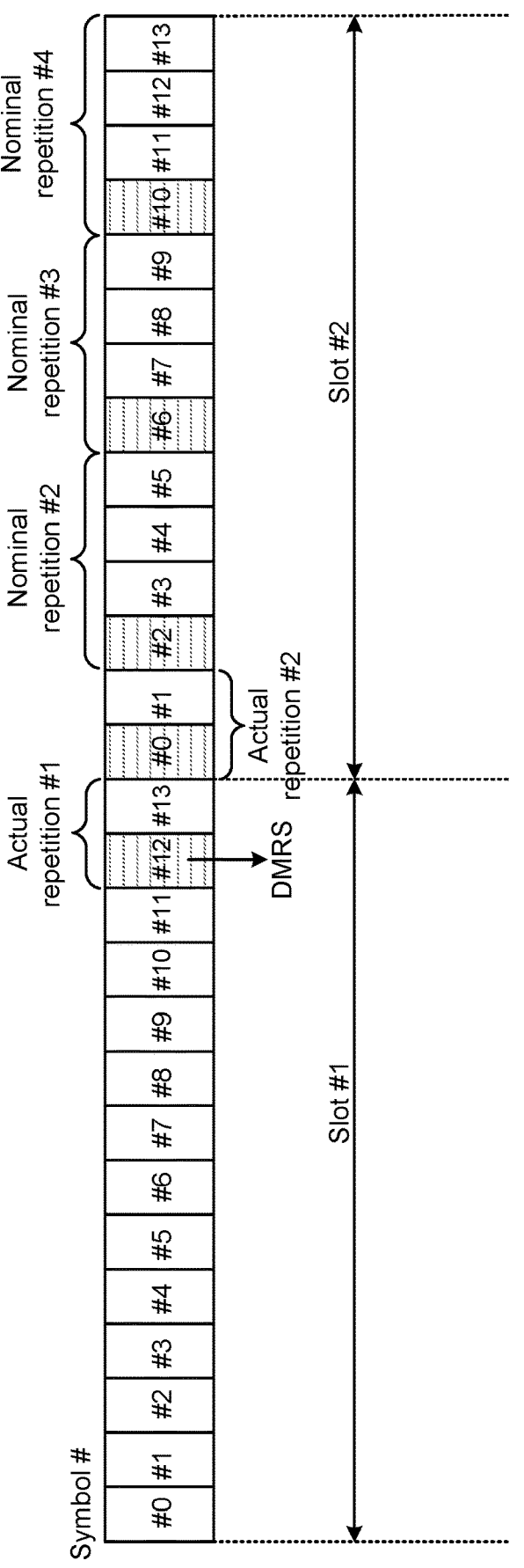
FIG. 2B illustrates an example of DMRS bundling over 2 consecutive slots for type B repetitions.

If frequency hopping is disabled and N PUSCH transmissions are scheduled over consecutive slots, the WTRU may disable DMRS bundling, for example, after the last slot in the consecutive slots (e.g., regardless of whether all N transmissions are completed or not). For example, the WTRU may be configured with N repetition type A repetitions in N consecutive slots. The WTRU may start, in the first slot, to maintain phase and power continuity across the type A repetitions (e.g., the first type A repetition may be transmitted in the first uplink slot, the second type A repetition may be transmitted in the second uplink slot and the last type A repetition may be transmitted in the Nth uplink slot) and stop maintenance of phase and power continuity in the last slot. In examples, the WTRU may stop maintenance of phase and power continuity in the last slot if not all N type A repetitions are transmitted (e.g., due to cancellation of some uplink transmission occasions) because of, for example, dynamic configuration of uplink slot(s) to downlink slot(s) (e.g., transmission of the second type A repetition in the second uplink slot may be canceled since the second uplink slot is configured dynamically by the network as a downlink slot and the WTRU may stop maintenance of phase and power continuity in the Nth slot). FIG. 2B illustrates an example of DMRS bundling over 2 consecutive slots for type B repetitions. The example in FIG. 2B illustrates that DMRS symbols in 2 actual repetitions and 3 nominal repetitions are bundled over 2 consecutive slots. The WTRU may start to maintain phase and power continuity starting in symbol #12 in slot #1 and stop maintaining power and phase continuity at symbol #13 in slot #2. Symbols including symbol #0 through symbol #11 in slot #1 may be configured to receive downlink signals or used as flexible symbols or gap symbols where no downlink reception or uplink transmission take place.

If frequency hopping is disabled and repetitions are scheduled over non-consecutive slots, the WTRU may start tracking a time (e.g., via a timer) and the DMRS bundling termination condition may be one of the following. The DMRS bundling termination condition may be the time exceeding a value (e.g., a threshold time). If the time exceeds the value, the WTRU may send an indication to the network that bundling is disabled. The value may be configured by the network (e.g., the gNB), for example, via DCI, MAC-CE signaling, or RRC signaling. The DCI, MAC-CE or RRC message(s) may be associated with a dynamic or a configured grant configuration over which the N PUSCH transmissions are scheduled. The WTRU may be configured with the value, for example, so that the WTRU may avoid maintaining power and phase continuity over a long period of time. The DMRS bundling termination condition may be that the WTRU completes N transmissions (e.g., N repetitions for type A repetitions or N actual/nominal repetitions for type B repetitions) within the threshold time (e.g., a preconfigured time limit expressed in terms of symbols, slots, frames, seconds where the time limit may be configured by the network (e.g., the gNB)).

Figure 2C:
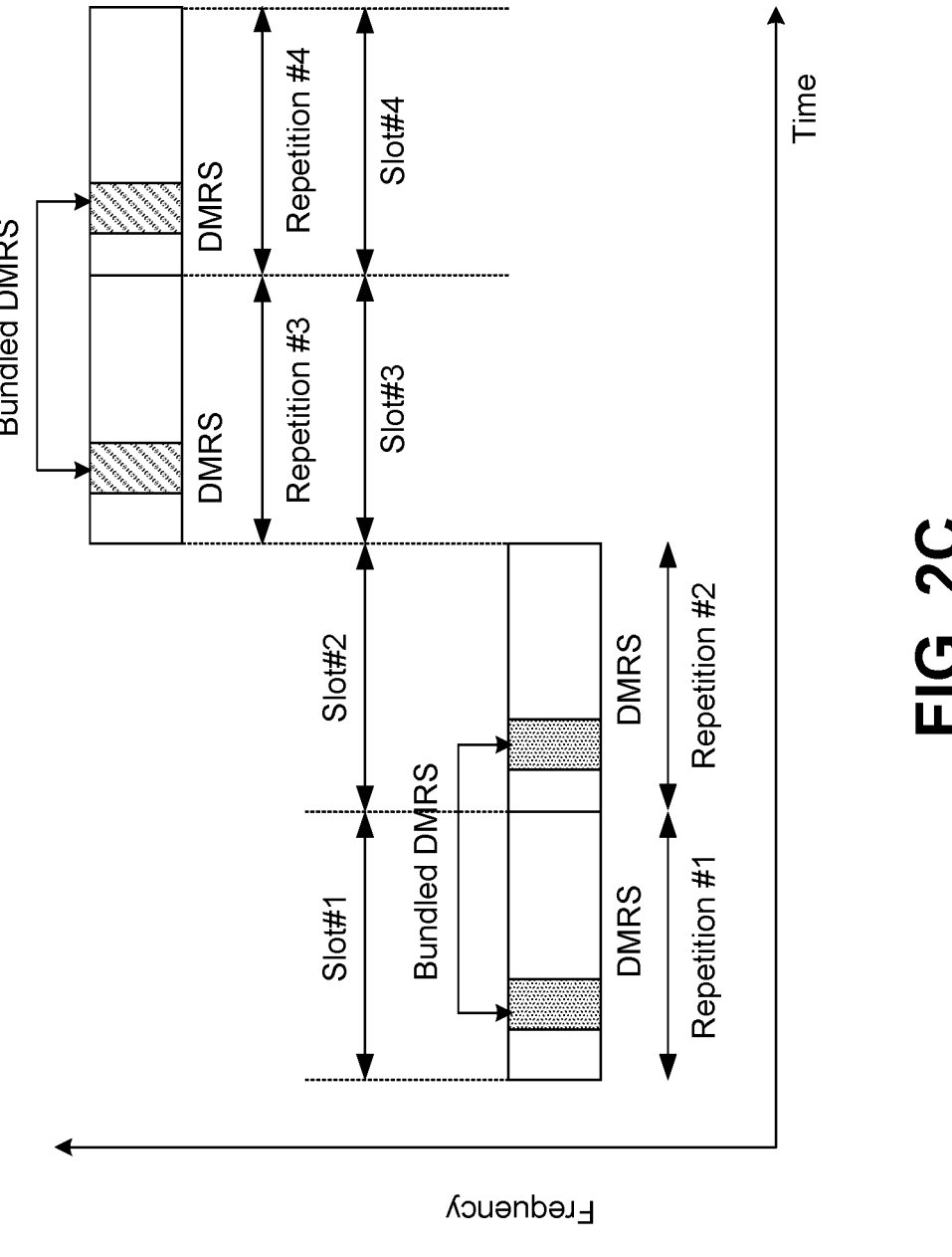
FIG. 2C illustrates an example of inter-slot frequency hopping and DMRS bundling.

If frequency hopping is enabled and M hops are scheduled over N PUSCH transmissions scheduled over N consecutive slots, the WTRU may enable DMRS bundling at the beginning of a period (e.g., each period) where the period consists of N/M transmissions. The WTRU may disable DMRS bundling after the last slot at the end of the period (e.g., each period), for example, if frequency hopping is enabled and M hops are scheduled over N PUSCH transmissions scheduled over N consecutive slots. FIG. 2C illustrates an example of inter-slot frequency hopping and DMRS bundling. As shown in FIG. 2C, N=4 PUSCH repetitions are scheduled over 4 consecutive slots and M=2 hops are scheduled in inter-slot frequency hopping and each hop duration is 2 slots (e.g., N/M=2). The WTRU may start maintaining phase and power continuity across PUSCH transmissions (e.g., maintain phase and power continuity between Repetition #1 and Repetition #2) starting at the beginning of Slot #1 and stop maintenance of phase and power continuity at the end of Slot #2. The WTRU may start to maintain phase and power continuity across PUSCH transmissions at the beginning of Slot #3 and stop maintenance of phase and power continuity at the end of Slot #4.

A WTRU (e.g., a WTRU configured for a reference transmission) may determine an assisting transmission (e.g., an assisting DMRS transmission), for example, under certain conditions. A WTRU may receive configuration information for reference signals that may be distributed across different (e.g., consecutive) slots, e.g., the WTRU may transmit reference signals in different slots, for example in accordance with the received configuration information, where the transmission in one slot may provide assistance, (e.g., channel estimation (e.g., using the reference signal) may be assisted compared to reference signal transmission without the assisting transmission). For example, reference signals may be distributed over an n slot (e.g., a first slot or a preceding/previous slot) and an n+1 slot (e.g., a second slot or a current slot). The slots (e.g., consecutive slots) may include, for example, uplink slot(s) and mixed slot(s). A transmission (e.g., an assisting transmission) may include a subset of symbols of a reference transmission, which may include a DMRS applicable to a reference transmission. DMRS bundling may be applicable between the DMRS of a reference transmission and the DMRS of an assisting DMRS transmission. An assisting transmission and a reference transmission may be in different slots. DMRS bundling may be applied, for example, if an assisting transmission and a reference transmission are in different slots.

A WTRU may determine an additional DMRS, for example, with respect to another slot (e.g., a following or subsequent slot and/or a previous or preceding slot). In examples, a WTRU may receive and/or determine configuration information to transmit DMRS(s) in a first slot (e.g., a preceding/previous slot, a slot preceding a subsequent slot), for example, as a DMRS associated with the transmission of the slots (e.g., a DMRS that is in addition to a DMRS in the subsequent slot, an additional DMRS to assist channel estimation, for example if there are no DMRSs in the subsequent slot, etc.). Location or placement of an additional DMRS may be indicated, for example, with respect to a first DMRS in slot n+1. Location of an additional DMRS (e.g., in an assistance transmission) may be configured, for example, dynamically (e.g., by DCI and/or via MAC-CE signaling) or by higher layer signaling. The number of additional DMRS may be configured, for example, dynamically (e.g., by DCI and/or via MAC-CE signaling) or by higher layer signaling. Channel estimation performance may be improved, for example, by having an additional DMRS in a different slot, e.g., due to temporal diversity in channel estimates.

Figure 3A:
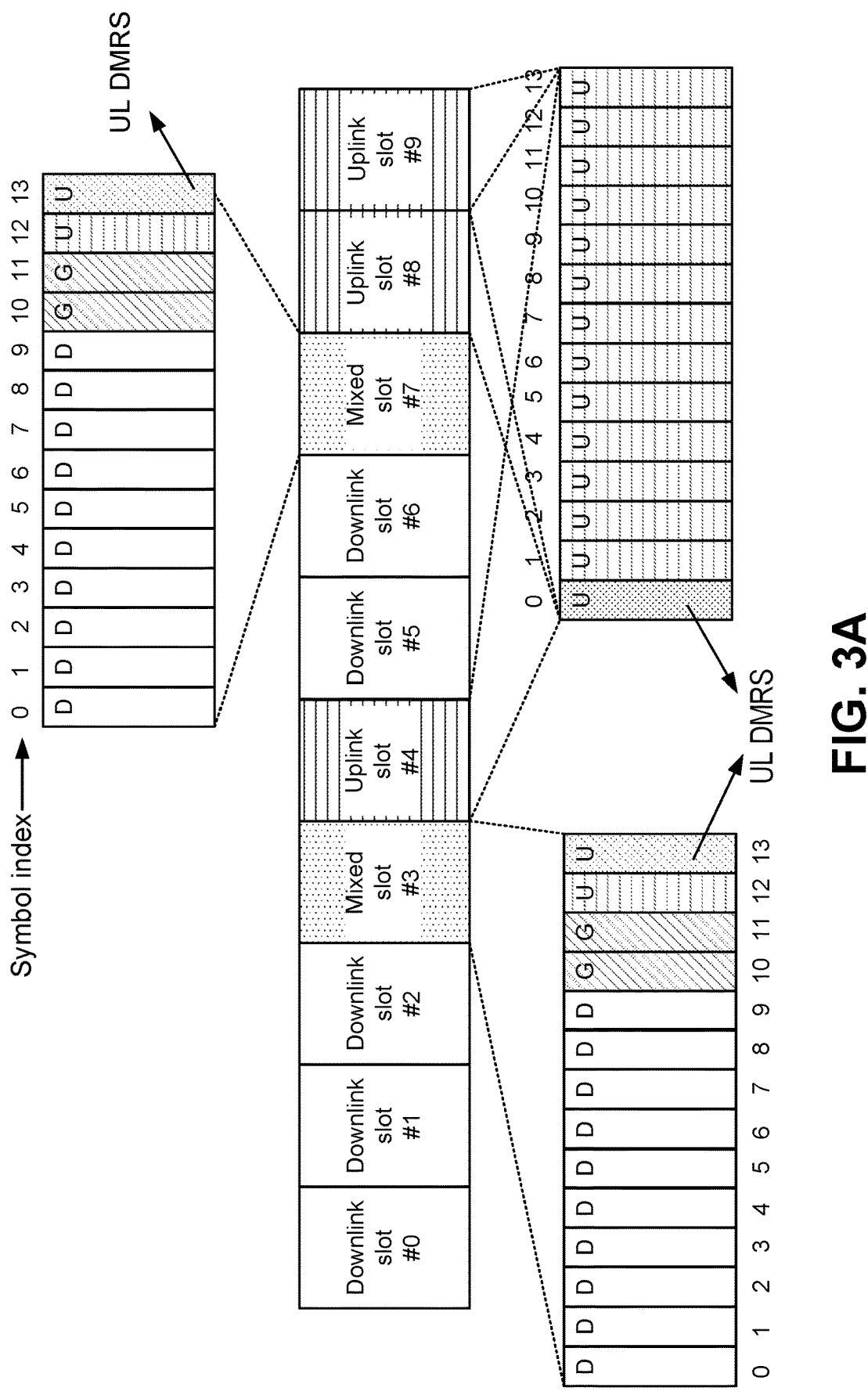
FIG. 3A illustrates an example of DMRS placement in an assisting transmission.
Figure 3B:
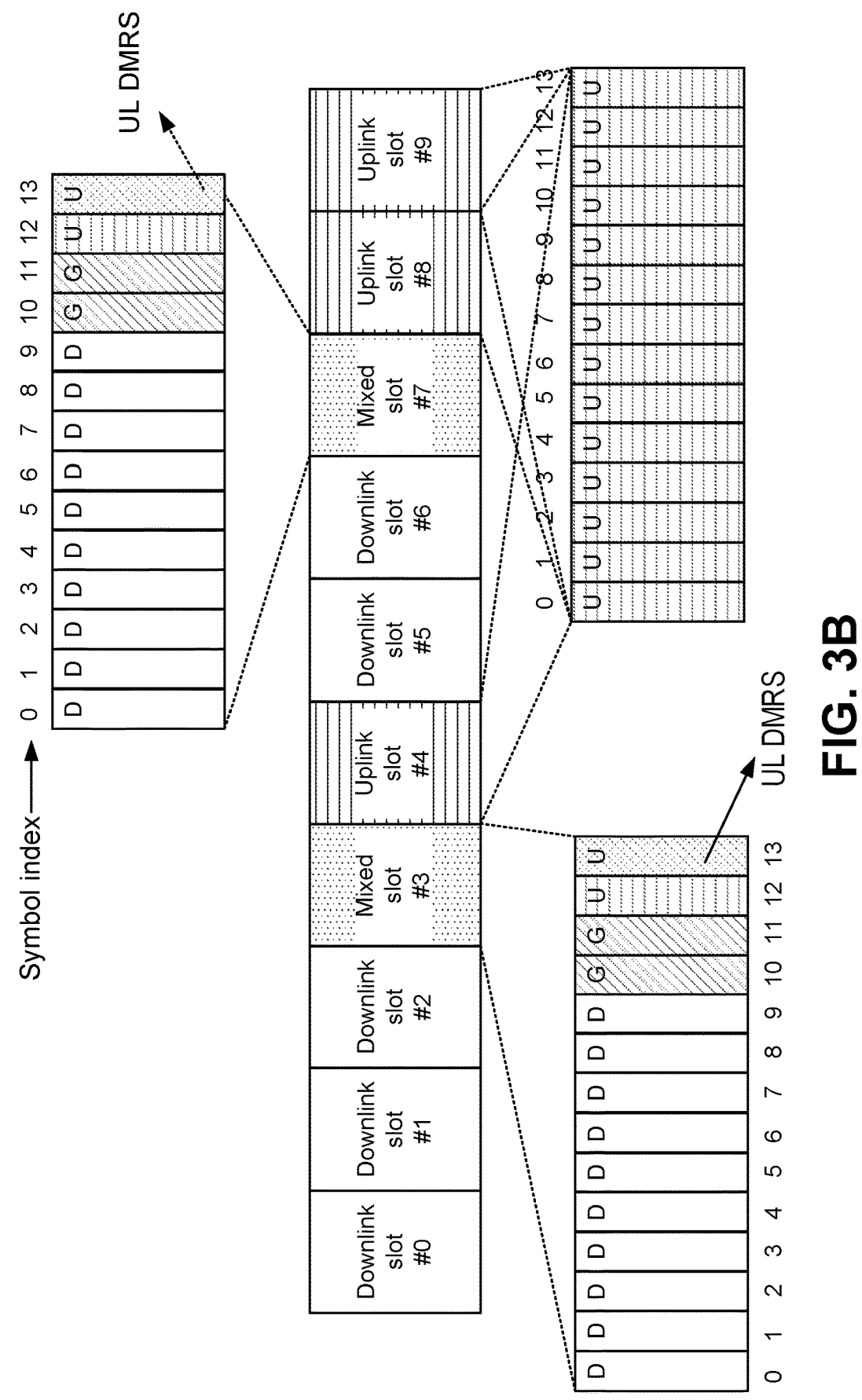
FIG. 3B illustrates an example of DMRS placement.

FIG. 3A illustrates an example of DMRS placement in an assisting transmission. In examples (e.g., as shown in FIG. 3A), the location of DMRS in symbol #13 in preceding/previous slot #3, may be indicated as "−1" with respect to the DMRS in symbol #0 in subsequent slot #4. FIG. 3B illustrates another example of DMRS placement:

An extension may not contain DMRS. If no DMRS is configured in the mixed slot, a WTRU may determine that that there is no assisting DMRS in the preceding/previous slot (e.g., by an indication via DCI, MAC-CE signaling, or RRC signaling).

An assumption of the preceding/previous slot configuration may be based on the configuration of the current configuration (e.g., the configuration of the subsequent slot, such as the next slot, the second slot of two consecutive slots, or the n+1 slot). A WTRU may determine the DMRS configuration of the preceding/previous slot based on the DMRS configuration of the current slot (e.g., the subsequent slot, such as the next slot, the second slot of two consecutive slots, or the n+1 slot). For example, the WTRU may be configured with the DMRS pattern for the current slot (e.g., which may not contain the location of the frontloaded DMRS). The WTRU may determine that the frontloaded DMRS may be contained in the preceding/previous slot (e.g., the first slot of two consecutive slots, or the n slot), and used as an assisting DMRS. The WTRU may determine the location of the DMRS in the preceding/previous slot by the number of DMRS symbols in the current slot. The location of the DMRS in the preceding/previous slot may be determined by a specified lookup table based on the number of DMRS symbols configured in the current slot. For example, the table may have an entry that indicates that if 2 DMRS symbols are configured in the current slot, there is one DMRS configured in the preceding/previous slot, e.g., as an assisting DMRS. The WTRU may determine the location of the DMRS based on the association with the current slot and preceding slot. The WTRU may determine the location of the DMRS based on whether the assisting DMRS is configured or whether the assisting DMRS is not configured.

A WTRU may implement fallback behavior. For example, the WTRU may determine that the uplink symbols in the preceding/previous slot are not associated with the uplink symbols in the current slot, such as when channels or reference signals other than PUSCH transmissions are allo-cated in the uplink symbols that contain at least the last symbol in the preceding slot. Referring to FIG. 3A, if an SRS is scheduled, for example, in symbol #13 in the mixed slot #3, the WTRU may determine that the mixed slot #3 does not contain a PUSCH transmission (e.g., any PUSCH transmission) that is associated with the PUSCH transmission in the uplink slot #4. The WTRU may (e.g., as a result of such determination) determine that the assisting DMRS is not configured and may use DMRS in slot #4 to perform channel estimation for PUSCH in uplink slot #4 as the fallback behavior.

The WTRU may determine that the assisting DMRS is not configured if a PUCCH transmission, an SRS, a PRACH transmission, channels, or reference signals with higher priority than the PUSCH transmission, are configured in uplink symbols (e.g., that contain at least the last symbol in the preceding/previous slot). The WTRU may determine that the assisting DMRS is not configured by an explicit indica-tion (e.g., such as from DCI, MAC-CE, or RRC signaling).

A WTRU may determine that transmission of assisting DMRS is canceled, for example due to a dynamically allocated SRS or PUCCH transmission in the preceding/previous slot, which may be indicated by an explicit indi-cation (e.g., via DCI, a MAC-CE, or RRC signaling). If the assisting DMRS is already configured and the WTRU receives an indication from the network (e.g., that reference signals or channels other than PUSCH are configured in the preceding/previous slot), the WTRU may determine that the assisting DMRS is canceled and may send a PUSCH trans-mission in the current slot following the default DMRS. The DMRS may be preconfigured. The WTRU may determine the preconfigured DMRS pattern by an explicit indication, e.g., via RRC signaling, MAC-CE signaling, or DCI. The WTRU may determine the preconfigured DMRS pattern implicitly. For example, the WTRU may determine the preconfigured DMRS pattern, for example, based on the configured number of PRBs and/or the order of modulation used in the PUSCH transmission.

A WTRU may determine that the assisting DMRS is configured by explicit indication (e.g., via DCI, MAC-CE, or RRC signaling). The WTRU may determine that the configuration of the assisting DMRS is canceled if the WTRU receives an indication from the network (e.g., via DCI, MAC-CE, or RRC signaling) that a PUCCH transmis-sion, an SRS, or a PRACH transmission is configured in the preceding/previous slot.

A WTRU may receive DCI scheduling for a PUSCH transmission that overlaps in time with the assisting DMRS transmission. The WTRU may determine that the assisting DMRS transmission is canceled and the WTRU may trans-mit the default DMRS configuration. A WTRU may cancel the PUSCH transmission associated with the assisting DMRS. For example, the WTRU may cancel the PUSCH transmission which may include uplink symbols in the mixed slot and uplink symbols in the following uplink slot.

A WTRU may determine a bundled DMRS, for example, with respect to a following slot (e.g., the current slot and/or slots subsequent to the current slot). In examples, a WTRU may (e.g., for a bundled DMRS) receive configuration information to transmit DMRS bundled with DMRS in a following slot. The term bundle may mean a group that includes multiple slots, non-slots, actual repetitions, and/or nominal repetitions. Definitions of nominal and actual rep-etitions may, for example, unless otherwise indicated herein, follow a definition, such as a standardized definition.

DMRSs in consecutive slots (e.g., multiple consecutive slots, such as the preceding/previous slot and the current slot) may be combined together (e.g., allowing a gNB to perform channel estimation), for example, if DMRS is defined as a bundled DMRS in assistance information. An indication whether DMRS in multiple slots are bundled or not may be provided, for example, in or by DCI, via MAC-CE signaling, or signaling via a higher layer. Bun-dling may provide one or more advantages. DMRS located across multiple slots (e.g., based on bundling) may allow a network (e.g., a gNB) to perform channel estimation over a long(er)/extended time period, which may improve channel estimation quality, save a number of DMRS symbols, and/or reduce control overhead.

There may be condition(s) for bundling DMRS in differ-ent slots or transmissions. A condition for bundling DMRS (e.g., in the same bundle) may include, for example, DMRS (e.g., DMRS in the same bundle) having the same quasi-colocation (QCL) relationship. A QCL relationship may include (e.g., be categorized as), for example, QCL Type A, B, C, or D. Multiple QCL types may be assigned to DMRS. A network may bundle DMRS with or without conditions/restrictions.

A WTRU may receive configuration information to trans-mit assisting DMRS. A WTRU may receive configuration information, which may include, for example, one or more of the following.

A WTRU may (e.g., decide/determine to) transmit a subset of symbols in a preceding/previous slot. For example, a WTRU may receive configuration information to transmit DMRS (e.g., transmit DMRS alone/only) or in combination with/plus one or more other symbols (e.g., PUCCH trans-mission symbols). A WTRU may receive resource configu-ration information, for example, during transmission.

A WTRU may determine a different DMRS configuration in a preceding/previous slot. For example, a density of DMRS in the time or frequency domain may be different from a density of DMRS in the time or frequency domain in a following slot.

A WTRU may (e.g., decide/determine to) change a PUCCH format/resource, for example, based on whether an assisting transmission is performed. A WTRU may be pro-vided a first PUCCH resource to use if an assisting trans-mission is performed and a second PUCCH resource to use if an assisting transmission is not performed, for example, for a configuration including a PUCCH resource, such as a scheduling request (SR) resource configuration, a channel state information (CSI) reporting configuration, or a PUCCH resource mapped to a value of a PUCCH resource indicator (PRI).

A WTRU may determine a location/placement of DMRS, for example, depending on the number of PUSCH transmis-sion symbols in a following slot.

A WTRU may determine (e.g., or receive an indication of) the number of DMRS, for example, depending on the number of uplink slots to follow. In examples (e.g., with reference to the example shown in FIG. 3A), a WTRU may receive configuration information that indicates to transmit two DMRS in the mixed slot #7, for example, based on the presence of two uplink slots (slot #8 and #9) that follow mixed slot #7.

In examples (e.g., with reference to the example shown in FIG. 3A), uplink DMRS in slot #3 and uplink DMRS in slot #4 may be bundled together. For example, DMRS may be placed at symbol #13 of each mixed slot (e.g., slot #3 and slot #7 in the example) and at symbol #0 in uplink slot #4, slot #8 and slot #9. Bundling uplink symbols in slot #3 and slot #4 may allow a network (e.g., a gNB) to perform channel estimation using DMRS at symbol #13 in slot #3 and DMRS at symbol #0 in slot #4, for example, to demodulate symbols carrying data in slot #4 and slot #3, e.g., if there are any PUSCH transmissions. For example, slot #7, slot #8, and slot #9 may be bundled together.

In examples (e.g., with reference to the example shown in FIG. 3A), DMRS in uplink slot #4, slot #8, and slot #9 may be located at symbol #8 in the slots (e.g., or other position close to the middle of the slots), which may allow wider separation in the time domain between the DMRS located at symbol #13 in the mixed slot and the DMRS in uplink slots. In examples, slot #7, slot #8, and slot #9 may be bundled together.

A WTRU may receive configuration information to determine a location of an assisting DMRS. Configuration information may include, for example, one or more of the following: a symbol number; a slot number; a frame number; and/or a relative symbol number (e.g., a location of the symbols starting, for example, from the first symbol in the current slot). For example, the assisting DMRS may be placed at symbol #13 in slot #3. The location of the DMRS in the mixed slot #3 may be represented as "−1" relative to the first symbol (e.g., symbol #0) in uplink slot #4. The location of the assisting DMRS in the mixed slot #3 may be represented as "+1" relative to the first symbol in uplink slot #4, e.g., with an additional indication that the assisting DMRS is located in the preceding slot. A WTRU may receive configuration information, for example, by DCI, signaling via MAC-CE, or signaling via a higher layer (e.g., such as via RRC signaling).

There may be variations for RS used in an assisting transmission. A WTRU may use RS other than DMRS, for example, in an assisting transmission (e.g., the WTRU is not limited to using DMRS). The WTRU determining an assisting transmission as described herein (e.g., including by way of examples), may be performed with a (e.g., any) downlink or uplink reference signals. For example, DMRS may be used interchangeably with an SRS or DMRS in a PUCCH transmission. Actions described herein in relation to uplink operations may be applied to downlink operations. For example, the assisting transmissions (e.g., described with respect to DMRS) may be applicable to CSI-RS or variants of CSI-RS, such as a zero powered (ZP)-CSI-RS, a non-zero powered (NZP)-CSI-RS, or a tracking reference signal (IRS), DMRS (e.g., associated with a PDSCH transmission or a PDCCH transmission), a phase tracking reference signal (PTRS) or positioning reference signals (PRS). An assisting transmission may occur in a mixed slot (e.g., following a downlink slot), for example, if applied to downlink.

A WTRU may determine an assisting DMRS transmission for repetition (e.g., type A and/or type B). There may be variations for repetition (e.g., type A and/or type B). Examples described herein for uplink may be not limited to slot-based transmission: For example, there may be non-slot or other categories that may be used in repetition. In examples (e.g., in PUSCH transmission repetition type B), a non-slot or a unit of repetition may be shorter than 14 symbols. PUSCH transmission repetition type B may include nominal and actual repetitions: A nominal repetition may be divided into actual repetitions, for example, if repetition is performed across a slot boundary (e.g., in PUSCH transmission repetition type B). A WTRU may receive configuration information for DMRS across nominal repetitions and/or actual repetitions. The configuration information may be applied, for example, to special or uplink slots.

Figure 4:
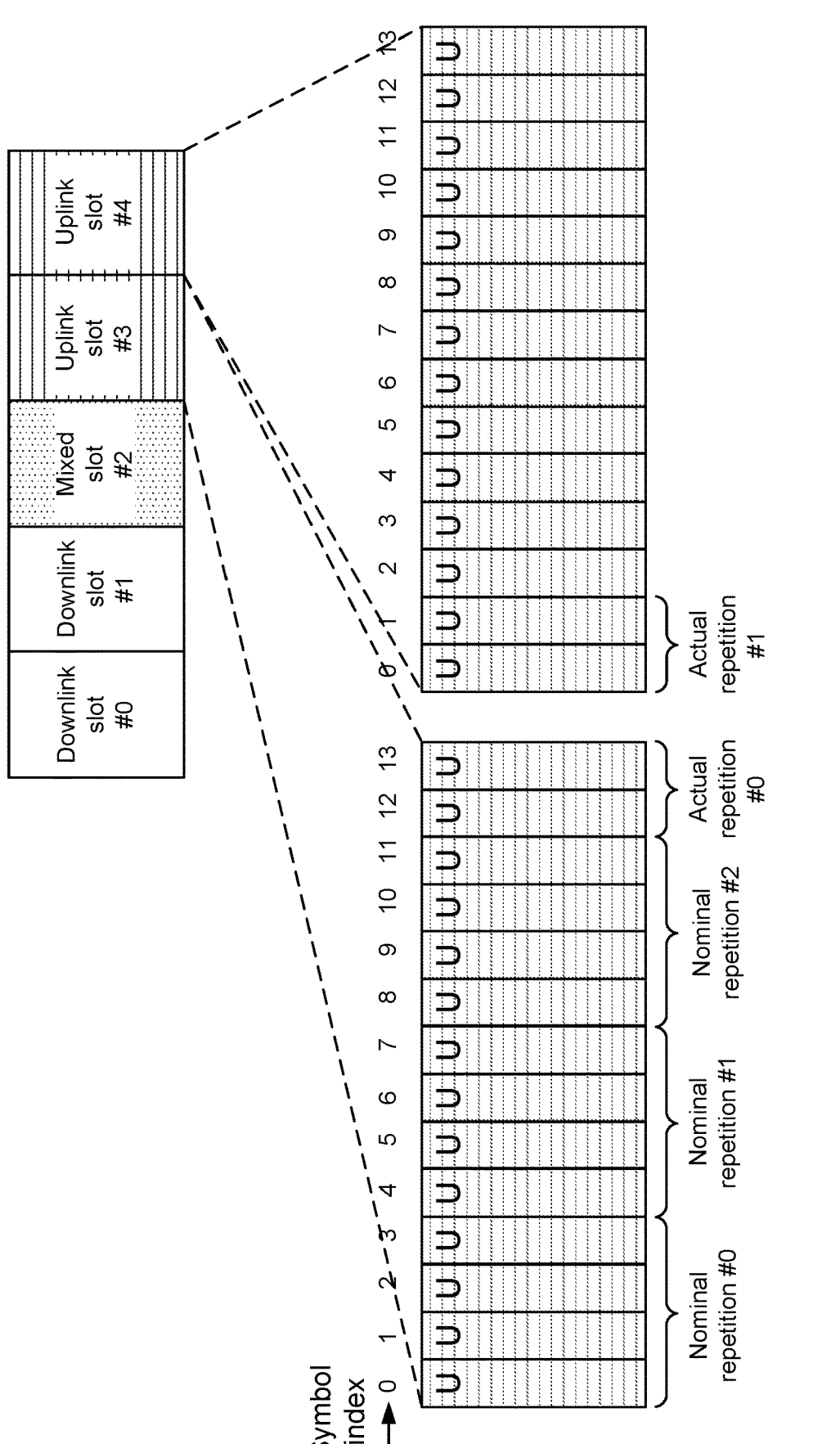
FIG. 4 illustrates an example of nominal and actual repetition.

FIG. 4 illustrates an example of nominal and actual repetition (e.g., in Repetition Type B). In examples (e.g., as illustrated in FIG. 4), nominal repetition #3 may be spilt into multiple (e.g., two) actual repetitions (e.g., actual repetition #0 and actual repetition #1). A WTRU may receive configuration information indicating, for example, that a bundle includes nominal repetition #0, nominal repetition #1, nominal repetition #2, actual repetition #0 and actual repetition #1. In examples, a WTRU may receive DMRS configuration information (e.g., separately) for nominal and actual repetition or a WTRU may receive configuration information for DMRS that may be applicable to (e.g., all) nominal and actual repetitions in a bundle. In examples (e.g., as shown in FIG. 4), a bundle may include nominal repetition #0, nominal repetition #1, nominal repetition #2, actual repetition #0 and actual repetition #1, A WTRU may determine the location of DMRS based on received configuration information.

Configuration information (e.g., bundled DMRS configuration information, such as for type B) may include, for example, one or more of the following: a size of a bundle, a location of a DMRS, a starting time of a bundle, a placement pattern (e.g., across slots or repetitions); and/or the like.

A size of a bundle may include or indicate, for example, a number of actual repetitions and/or nominal repetitions (e.g., numbers of actual and nominal repetitions in a combination).

A location of DMRS may be provided/indicated, for example, in terms of a symbol number (e.g., in an actual or nominal repetition). For example, a symbol number may start from 0. A maximum value may be a number of symbols in an actual or nominal repetition or a smaller number between the size of the nominal and actual repetition.

A starting time of a bundle may indicate if/when a WTRU may start a bundle transmission. For example, a starting time may be indicated by a slot number, a slot format indicator (SFI), a symbol number, a number assigned to actual or nominal repetitions; and/or the like. In examples, a WTRU may receive an indication that includes an offset value, which may be indicated, for example, in terms of symbols or slots from a time (e.g., a time the WTRU receives the indication). An offset may indicate the timing if/when a WTRU may start transmission.

A placement pattern across slots or repetitions may indicate (e.g., or may support a determination of) locations of DMRS in indicated slots in a bundle. A WTRU may transmit a configured DMRS in indicated slots in a bundle (e.g., only in indicated slots in the bundle). A configured DMRS may include, for example, a predefined DMRS pattern or a configured DMRS pattern. In examples (e.g., with reference to the example illustrated in FIG. 4), a WTRU may receive configuration information to transmit DMRS in nominal repetition #0, #1 and #2. A WTRU may receive configuration information to transmit DMRS in nominal repetitions (e.g., rather than at actual repetitions), for example, if the actual repetitions are located in-between nominal repetitions. A configuration may be indicated, for example, using a bitmap pattern. A WTRU may receive an indication (e.g., a bitmap pattern), for example, in DCI, a MAC-CE, or a by higher layer signaling (e.g., such as via RRC signaling). A configured DMRS may include, for example, a location of an assisting DMRS, an additional DMRS and/or a number of frontloaded, additional and/or assisting DMRS.

In examples of an indication in configuration information (e.g., with reference to the example shown in FIG. 4), a bitmap pattern [1 1 0 1] may indicate, for example, that a (e.g., preset) DMRS pattern may be placed in the nominal repetitions #0, #1, and #3.

A bitmap pattern may be applied to actual repetition or to a mix of nominal and actual repetition. In examples (e.g., with reference to the example illustrated in FIG. 4), a bitmap pattern [1 1 0 1 0] may indicate, for example, that (e.g., preset) DMRS configuration information may be placed at nominal repetition #0, #1, and actual repetition #0. A WTRU may receive configuration information to place a DMRS pattern in a predefined actual repetition. For example, the bitmap pattern [1 1 0 1] may indicate that a WTRU places/transmits the DMRS configuration information at nominal repetition #0, #1, and actual repetition #0. A predefined location for an actual repetition may be, for example, the first actual repetition. The bitmap pattern [1 1 0 1] may (e.g., alternatively) indicate that a WTRU may place/transmit the DMRS configuration at nominal repetition #0, #1 and actual repetition #0 and #1 (e.g., where the bitmap pattern may represent a DMRS on/off pattern for nominal repetitions and a nominal repetition #3 may consist of acutal repetition #0 and #1. Predefined locations for actual repetitions may be, for example, (e.g., all) actual repetitions that may be (e.g., may have been) split from a nominal repetition.

A bitmap pattern may be applied to a slot number. For example, the bitmap pattern [1 1 0 1] may indicate that a (e.g., preset) DMRS pattern is placed in the slot #0, #1, and #3. A length of a bitmap pattern may indicate a length of a bundle.

In examples of repetition (e.g., for repetition type A), repetition may occur in a (e.g., every) slot and repetition may not go over a slot boundary. A WTRU may receive DMRS configuration information for multiple repetitions, Bundled DMRS configuration information (e.g., for type A repetition) may include, for example, one or more of the following: a size of a bundle; a location of DMRS; an indication/indicator of which slots include DMRS; a starting time of a bundle; a placement pattern across slots or repetitions; and/or the like. For example, the bitmap pattern [1 1 0 1] may indicate that a (e.g., preset) DMRS pattern may be placed in slot #0, #1, and #3. A length of a bitmap pattern may indicate a length of a bundle.

A size of a bundle may include, for example, a number of nominal repetitions, or number of slots in a bundle, and/or the like. The type of slots in a bundle may include uplink and mixed slot, for example, for DMRS for a PUSCH transmission.

A location of DMRS may be indicated, for example, in terms of symbol number in a slot.

An indication/indicator may show which slot(s) within a bundle include DMRS. For example, an indication may include a bitmap to indicate whether respective slots include DMRS, In examples, the bitmap pattern "1101" may indicate that (e.g., only) a third slot does not contain DMRS.

A starting time of a bundle may be indicated, for example, by one or more of a slot number, symbol number, and/or the like.

A placement pattern across slots or repetitions may include configuration information to determine locations of DMRS in indicated slots in a bundle. A WTRU may place/transmit the configured DMRS in indicated slots in the bundle (e.g., in only the indicated slots in the bundle). The configured DMRS may include a predefined DMRS pattern or a configured DMRS pattern. Configuration information may be indicated, for example, using bitmap pattern. The bitmap pattern [1 1 0 1] may indicate, for example, that a (e.g., preset) DMRS pattern can be placed in slots #0, #1, and #3, or in nominal repetitions #0, #1 and #3. A length of a bitmap pattern may indicate a length of a bundle. A WTRU may receive a bitmap pattern, for example, in DCI, a MAC-CE, or via higher layer signaling (e.g., such as via RRC signaling). A WTRU may receive configuration information, for example, through DCI, a MAC-CE, or RRC signaling.

DMRS bundles may be determined with PUSCH transmission repetition. A WTRU may be configured to transmit one or more PUSCH transmission repetitions. DMRS bundling may apply to DMRS of at least one set of the repetitions. Actual and/or nominal repetitions may be defined. The WTRU may determine that a DMRS bundle includes one or more of the following. The WTRU may determine that a DMRS bundle includes a DMRS, for example a DMRS of all repetitions (e.g., there may be a single DMRS bundle for all repetitions). The WTRU may determine that a DMRS bundle includes a DMRS of one or more actual repetitions. The WTRU may determine that a DMRS bundle includes a DMRS of actual repetitions corresponding to one or more nominal repetitions. The WTRU may determine that a DMRS bundle includes a DMRS within a (e.g., certain) bundling period or bundling window, and a bundling period or bundling window may include one or more slots and/or a set of symbols. The WTRU may determine that a DMRS bundle includes a DMRS within a period defined by a contiguous set of uplink symbols over one or more slots. The WTRU may determine that a DMRS bundle includes a DMRS of an assisting transmission (e.g., as described herein) and DMRS of a subsequent uplink slot may be part of a DMRS bundle. A DMRS bundle may include DMRS associated to a transmission and DMRS associated to an assisting transmission in same or different slots. The WTRU may determine that a DMRS bundle includes DMRS transmitted in a mixed slot (e.g., a slot with at least one uplink symbol and at least one downlink or flexible symbol) and DMRS in following uplink slot may be (e.g., implicitly) part of a DMRS bundle. A DMRS bundle may implicitly include a DMRS in a first position and a DMRS in a second position, where the first position may be within a mixed slot and the second position may be within a following uplink slot. A mixed slot may be defined as a slot including at least one uplink symbol and at least one downlink or flexible symbol. A DMRS bundle may implicitly include a DMRS in a first position and a DMRS in a second position (e.g., for downlink transmission), where the first position may be within a downlink slot and the second position may be within a following mixed slot.

A WTRU may determine a set of DMRS bundles based on one or more of the following. A WTRU may determine a set of DMRS bundles based on whether DMRS bundling is enabled: A WTRU may determine a set of DMRS bundles based on a method of defining each DMRS bundle (e.g., such as, for example; based on nominal repetitions, actual repetitions, by period, etc.). A WTRU may determine a set of DMRS bundles based on a number of DMRS bundles (e.g., B DMRS bundles), or a maximum number of nominal or actual repetitions (e.g., R nominal or actual repetitions) per DMRS bundle. In case there are (e.g., K) nominal or actual repetitions, the WTRU may determine that a first bundle includes DMRS of first R nominal or actual repetitions, the second bundle includes DMRS of a second (e.g., following) R nominal or actual repetitions, and so on, where R may be the smallest integer larger than K/B. A bundle (e.g. a last bundle) may include fewer than R repetitions. A number of DMRS bundles B set to may indicate that some (e.g., all) DMRS of the set of repetitions may be part of the same DMRS bundle. A number of DMRS bundles B set to 0 may indicate that DMRS bundling is disabled. A WTRU may determine a set of DMRS bundles based on start and end of a (e.g., each) period or window. A period may be defined by a number of slots. A period may be defined by a sub-slot including a number of symbols, for example, such as 7 symbols. For example, if a period is one slot, the WTRU may determine a DMRS bundle for a (e.g., each) slot, including DMRS (e.g., all DMRS) transmitted within the slot. A set of periods may be aligned with slot boundaries. A set of periods may start from the initial repetition. In examples, configuration of DMRS bundling may be within a period. If a period is equal to one slot, configuration of DMRS bundling may be within the slot. DMRS bundling configuration may change for every slot or for selected slots.

A WTRU may determine one or more of the parameters described herein by one or more of the following. A WTRU may determine one or more of the parameters described herein (e.g., via RRC signaling); for example, whether bundling is enabled and/or whether the number of repetitions per bundle is configured as part of a configured grant configuration or a dynamic PUSCH configuration. A PUSCH transmission repetition with DMRS bundling may be configured as a different (e.g., new) type of PUSCH transmission repetition, e.g. PUSCH transmission repetition type C. Such repetition scheme may operate in the same way as PUSCH transmission repetition type B, for example, with functionality of DMRS bundling. A WTRU may determine one or more of the parameters described herein by MAC signaling. For example, the duration of a bundling period may be indicated in a MAC CE (e.g., potentially for a certain configured grant configuration). A WTRU may determine one or more of the parameters described herein by a property of a grant. A WTRU may determine one or more of the parameters described herein by a property of a PDCCH (such as, for example, a CORESET, search space, DCI format or RNTI). For example, repetition with DMRS bundling may be applicable for certain DCI format(s) (e.g., only for certain DCI format(s)). A WTRU may determine one or more of the parameters described herein by a field in a DCI. For example, each possible value of a time domain resource assignment field (TDRA) may be associated to at least one DMRS bundling parameter. A field may be defined to indicate at least one DMRS bundling parameter. In examples, an association between each value of a field and the at least one DMRS bundling parameter may be configured (e.g., by RRC signaling).

A WTRU may receive a PUSCH configuration information indicating that repetition with DMRS bundling is enabled. The configuration information may include parameters associated to a (e.g., each) value for a time domain resource allocation field. For example, a first value may indicate that a start symbol=10, a length=7, a number of nominal repetitions=2, and DMRS bundling is enabled with 1 nominal repetition per bundle. For example, a second value may indicate a start symbol=10, a length=7, a number of nominal repetitions=2, and DMRS bundling is enabled with 2 nominal repetitions per bundle. Based on receiving DCI with time domain resource allocation (TDRA) field indicating the first value or the second value, the WTRU may split the first nominal repetition in two actual repetitions. The first actual repetition may start at symbol 10 of the first slot and end at symbol 13 of the first slot. The second actual repetition may start at the symbol 0 of the second slot and end at symbol 2 of the second slot. The second nominal repetition may correspond to a third actual repetition that may start at symbol 3 of the second slot and end at symbol 9 of the second slot. If the TDRA field indicates the first value, the WTRU may apply DMRS bundling for the two first actual repetitions (e.g., because they correspond to 1 nominal repetition). If the TDRA field indicates the second value, the WTRU may apply DMRS bundling for the actual repetitions (e.g., the three actual repetitions).

Inter-slot frequency hopping behavior may be implemented for assisting DMRS and/or bundled DMRS. In inter-slot frequency hopping behavior for an assisting DMRS transmission, a WTRU may be configured for an inter-slot frequency hopping pattern for the slots that contain the bundled DMRS. For example, a hop (e.g., each hop) in the pattern (e.g., hopping pattern) may include multiple slots or multiple units of repetitions. The hopping pattern may include a slot number from which the slot associated with the DMRS bundle starts and/or the number of slots associated with the DMRS bundle. If the WTRU is configured with assisting DMRS, the WTRU may determine that a hop in a frequency hopping pattern includes a reference transmission and an assisting transmission (e.g., which includes the assisting DMRS). If a portion of the mixed slot contains uplink symbols and the uplink symbols include the assisting DMRS or are associated with a PUSCH transmission in the following uplink slots, the WTRU may determine that the frequency hopping pattern is applicable to the associated uplink symbols.

For example, with reference to FIG. 3A, symbol #12 and #13 in the mixed slot #3 may be reserved for uplink symbols and they may be associated with uplink slot #4 (e.g., an uplink slot for a PUSCH transmission). A frequency hopping pattern applied to the uplink slot #4 may be applied to symbol #12 and #13 in the mixed slot #3. A location of resources in the frequency domain for symbol #12 and #13 may be the same as the location of the resources of the uplink symbols in the uplink slot #4 in a frequency hop.

An association between uplink symbols in different slots may include one or more of the following configurations. Uplink symbols in different slots may be bundled. DMRS in the reference transmission and assisting DMRS in assisting transmission may be bundled. Uplink symbols in different slots may be included in a single PUSCH transmission. Uplink symbols in different slots may be included in an actual repetition or a nominal repetition.

A WTRU may apply DMRS bundling (e.g., apply power or phase control to maintain phase or power coherence between PUSCH transmission(s) or PUCCH transmission(s)) to a set of PUCCH transmission repetitions or PUSCH transmission repetitions (e.g., actual PUCCH transmission repetitions or PUSCH transmission repetitions) for inter-slot frequency hopping. The WTRU may bundle DMRS in PUSCH transmission(s) or PUCCH transmission(s) in inter-frequency hopping, for example, if PUSCH transmission(s) or PUCCH transmission(s) in different slots are scheduled in the same resources in the frequency domain (e.g., so that the gNB may perform joint channel estimation for the set of subcarriers across slots in the frequency domain). The WTRU may be scheduled with PUSCH transmission(s) or PUCCH transmission(s) that contain the same time domain configurations (e.g., the same DMRS patterns, the same number of symbols, and/or the same number of PRBs or resource elements).

Intra-frequency hopping behavior may be implemented for bundled DMRS.

One or more bundling granularity and/or pattern may be implemented.

A WTRU may apply DMRS bundling (e.g., apply power or phase control to maintain phase or power coherence, for example, between PUSCH transmissions or PUCCH transmissions) to a set of PUCCH transmission repetitions or PUSCH transmission repetitions (e.g., actual PUCCH transmission repetitions or PUSCH transmission repetitions). Actual repetitions may be contained within a (e.g. one) slot or they may be located in different slots.

DMRS bundling may be applied to a subset of PUCCH transmission repetitions or PUSCH transmission repetitions (e.g., actual PUCCH transmission repetitions or PUSCH transmission repetitions). For example, if there are 4 actual PUCCH transmission repetitions, the following patterns for bundling may be determined and/or used: batch bundling (e.g., DMRS bundling may be performed on the first actual repetition and the second actual PUCCH transmission repetition, and another DMRS bundling may be performed on the third actual PUCCH transmission repetition and the fourth actual PUCCH transmission repetition); or bundling following a pattern in the time domain (e.g., DMRS bundling may be performed on the first actual PUCCH transmission repetition and the third actual PUCCH transmission repetition. Another DMRS bundling may performed on the second actual PUCCH transmission repetition and the fourth actual PUCCH transmission repetition).

Figure 5:
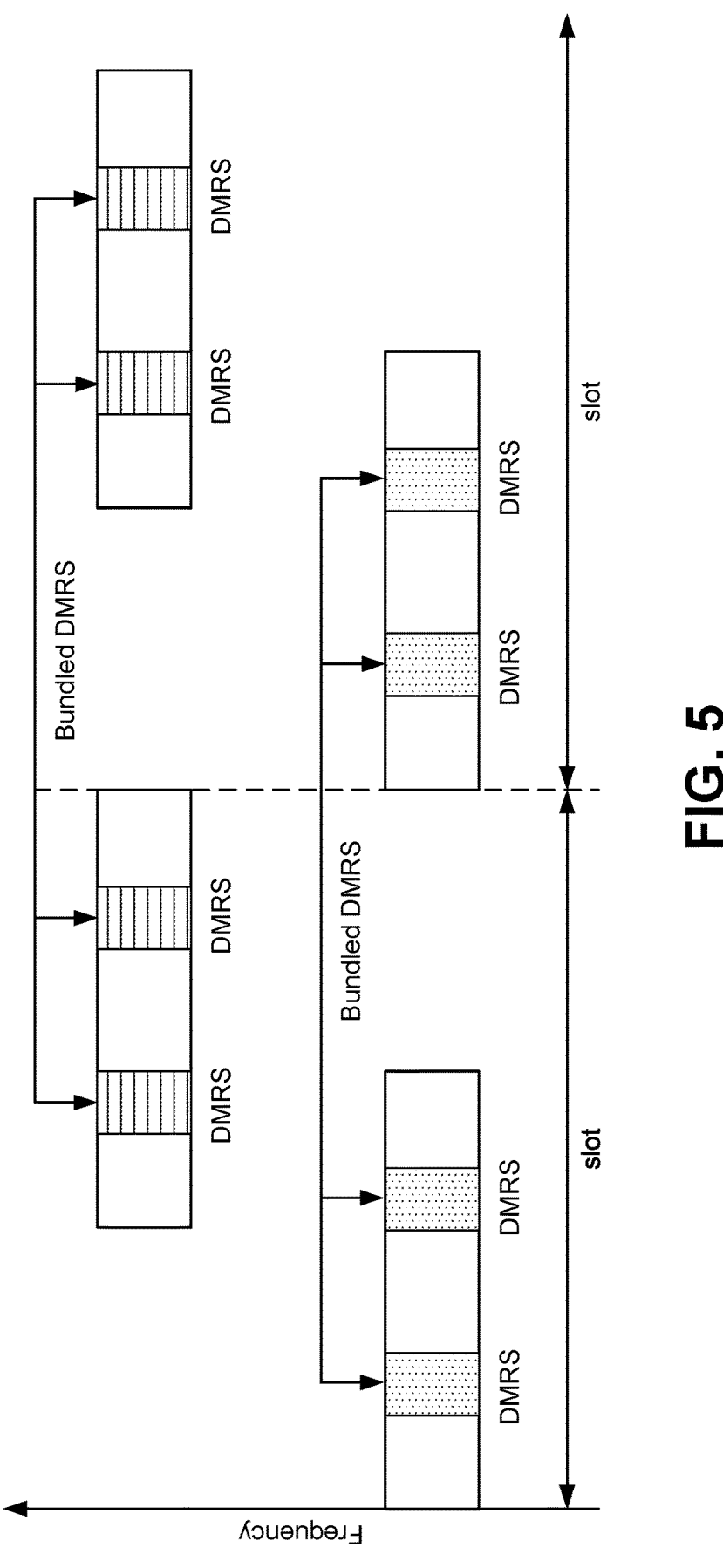
FIG. 5 illustrates an example of bundled DMRS in intra-frequency hopping.

The bundling as described herein may be applied to intra-slot hops. FIG. 5 illustrates an example of bundled DMRS in intra-frequency hopping. There may be one hop in each slot and the PUCCH transmission may be repeated over two slots, as shown in the example of bundled DMRS in intra-frequency hopping of FIG. 5. As shown in FIG. 5, DMRS symbols in the first hop in each slot may be bundled together. DMRS symbols in the second hop in each slot may be bundled together.

The DMRS bundling (e.g., as described herein) may be applicable to DMRS in PUSCH transmission(s) or PUCCH transmission(s).

A WTRU may determine an assisting DMRS transmission in downlink. In examples (e.g., for bundled DMRS), a WTRU may receive configuration information to determine a location(s) of a downlink assisting DMRS. A WTRU may receive configuration information, for example, via (e.g., or included in) DCI, a MAC-CE, and/or RRC signaling. An assisting transmission may be applied to downlink transmission, e.g., as shown in FIG. 6.

Figure 6:
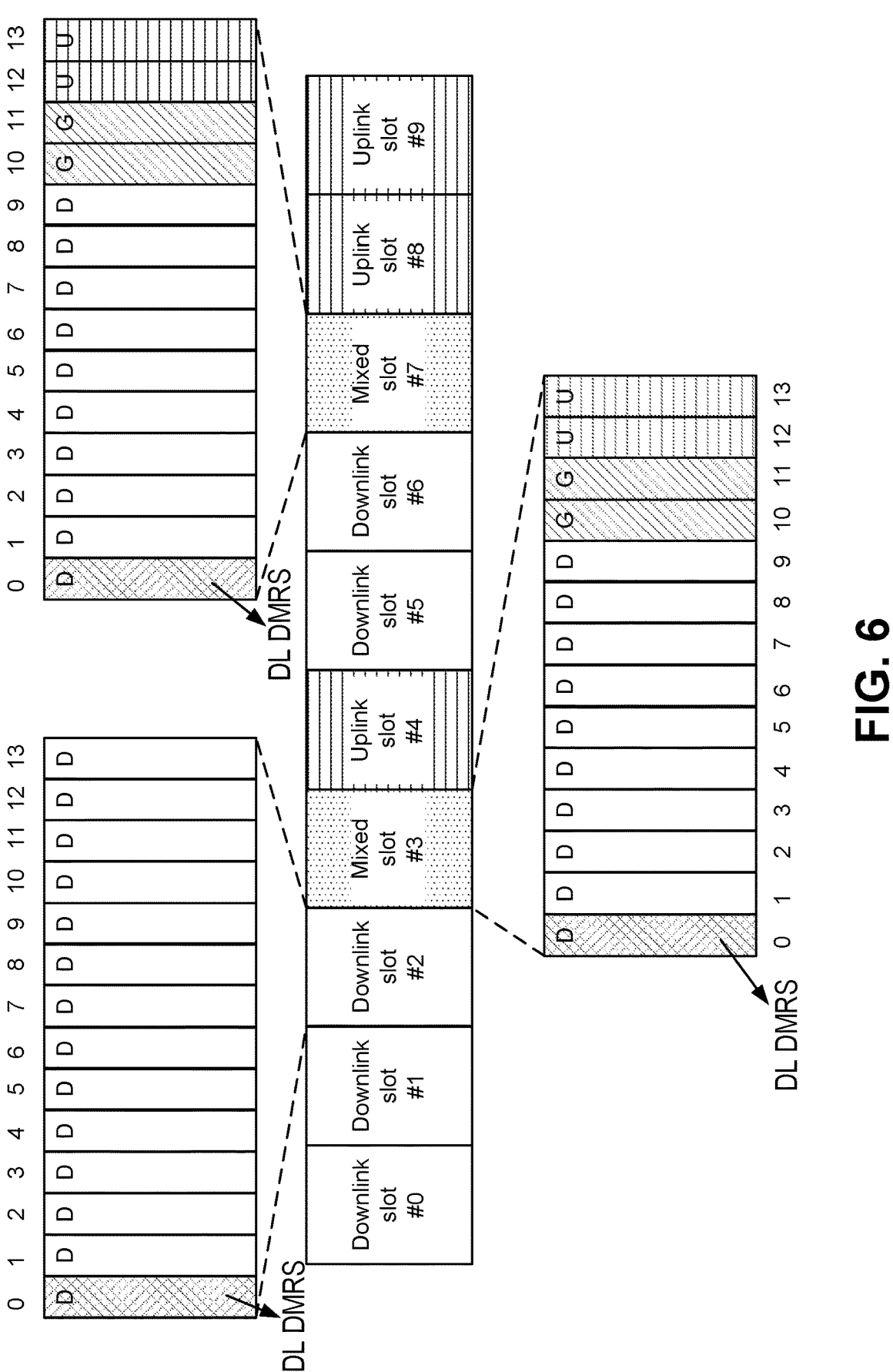
FIG. 6 illustrates an example of an assisting transmission applied to a downlink transmission.

FIG. 6 illustrates an example of an assisting transmission applied to a downlink transmission. As shown by example in FIG. 6, downlink (DL) DMRS may be placed in mixed slot #3 and #7 at symbol #0. DL DMRS in downlink slot #2 may be placed at symbol #0. A WTRU may receive configuration information indicating assisting DL DMRS in mixed slots #3 and #7. Application of an assisting transmission may not be limited by location of DL DMRS. For brevity, DMRS placement for downlink slot #0, #1, #5 and #6 is not shown.

An assistance transmission (e.g., an assisting DMRS transmission) may support a reduction in the number of DMRS symbols in uplink slots, allowing more power to be dedicated to symbols carrying data, which may increase coverage. An assistance transmission may support (e.g., allow) placement/distribution of DMRS over a wider range in the time domain. A network (e.g., gNB) may (e.g., be able to) estimate channels more accurately (e.g., in fast fading channels), for example, if DMRS is spread across time.

Network performance may be adjusted, for example, depending on the condition of wireless communication, e.g., by allowing a network to (e.g., dynamically) configure assistance information and/or bundling. For example, a network may detect high mobility of a WTRU. The network may (re)configure to assign extra DMRS, for example, as an assisting transmission or by allowing bundling, which may support maintaining (e.g., avoid degrading) the quality of channel estimation that may otherwise degrade due to mobility of the WTRU.

A WTRU may (e.g., in an extended DMRS transmission) receive configuration information to transmit an extended slot, for example, which may allow a faster start of channel estimation and demodulation at a gNB and/or may reduce the number of DMRS.

An extended DMRS transmission may include an extended slot (e.g., where an extended slot may be a slot that is extended to include symbol(s) of a preceding slot, such as a preceding consecutive slot, where the use of the symbols of the preceding slot may be an assisting, combined, or inclusive transmission as discussed herein). A WTRU may, for example (e.g., in an extended DMRS transmission), receive configuration information to transmit a frontloaded DMRS (e.g., the first DMRS in a PUSCH transmission) in a preceding/previous slot, which may extend a slot duration of a subsequent slot (e.g., a consecutive subsequent slot).

(Re)configuration information may be sent/received for variations in behavior. A WTRU may receive configuration information to transmit extended DMRS. A WTRU may receive configuration information for one or more of the following. Configuration information may be may be received to enable a determination by a WTRU to transmit a subset of symbols in a preceding/previous slot. For example, a WTRU may receive configuration information to transmit, in the preceding/previous slot, DMRS (e.g., transmit DMRS only) or transmit DMRS plus one or more PUSCH transmission symbols. A WTRU may receive resource configuration information, for example, during transmission. Configuration information may be received to enable a determination by a WTRU about a different DMRS configuration in a preceding slot. For example, a WTRU may determine that a density of DMRS in the time or frequency domain may be different from the density of DMRS in the time or frequency domain in the following slot. A configuration may be received to enable a determination by a WTRU to change a PUCCH format/resource, for example, based on whether an extended transmission is performed. A configuration may be received to enable a determination by a WTRU about a location of DMRS, for example, depending on the number of PUSCH symbols in the following slot.

FIG. 7 illustrates an example of an extended transmission (e.g., transmission using an extended slot). FIG. 7 shows an example with five (5) slots. As shown in FIG. 7, the UL DMRS may be placed in mixed slot #3 at symbol #12 and DMRS is not placed in uplink slot #4. A slot duration for slot #4 may be extended into mixed slot #3, for example, claiming symbol #12 and #13 of mixed slot #3 as part of uplink slot #4, extending the duration of uplink slot #4 from 14 symbols to 16 symbols. The UL DMRS in mixed slot #3 at symbol #12 may (e.g., as a result) be used as part of the extended uplink slot #4 (e.g., as shown in FIG. 7). The UL DMRS may be treated as a frontloaded DMRS, which may allow faster processing of channel estimation for demodulation for the extended uplink slot #4. In examples, UL DMRS may be placed in uplink slot #4. The UL DMRS placed in mixed slot #3 may (e.g., as a result) be treated as an additional DMRS or a frontloaded DMRS.

Inter-slot frequency hopping behavior may be implemented for extended DMRS transmission. A WTRU may be configured with the inter-slot frequency hopping pattern for the slots containing the PUSCH transmission with DMRS in the extended slot. The extended slot may contain the PUSCH transmission extended over multiple slots and the extended slot may occupy a portion of the mixed slot and uplink slots. For example, referring to FIG. 7, uplink symbol #12 and #13 in slot #3 and uplink symbols in slot #4 may belong to a single PUSCH transmission in the extended slot configuration. The extended slot may be (e.g., may be defined) as multiple PUSCH transmissions which may contain bundled DMRS. DMRS in different slots may be bundled. A WTRU may be configured to use the bundled DMRS to perform channel estimation. A WTRU may determine that the extended slot may be configured, for example, if the WTRU receives an indication (e.g., via DCI, a MAC-CE, or RRC signaling) with one or more of the following parameters: a starting slot number; a number of slots in the extended slot; a starting symbol number; a number of symbols in the extended slot; a DMRS configuration number; a DMRS configuration pattern per slot, (e.g., using PUSCH mapping type B for DMRS); an indication that DMRS may be bundled across time symbols in the same slot or different slots; and/or a location of DMRS in the extended slot (e.g., a symbol number with respect to the first symbol in the extended slot).

A hop (e.g., each hop) in frequency hopping may include uplink symbols placed across multiple slots. The hopping pattern (e.g., or an equation that determines the position of each symbol in the extended slot in the frequency domain for each hop) may include the slot number from which the extended slot starts and/or the number of symbols in the extended slots (e.g., at least the slot number from which the extended slot starts and the number of symbols in the extended slots). If part of the mixed slot contains uplink symbols and the uplink symbols are included in the extended slot, the frequency hopping pattern may be applicable to some (e.g., all) uplink symbols in the extended slot.

Referring to FIG. 7, for example, symbol #12 and #13 in the mixed slot #3 may be reserved for uplink symbols and symbol #12 and #13 may be included in the extended slot along with the uplink symbols in the uplink slot #4. The same frequency hopping pattern applied to the uplink slot #4 may be applied to symbol #12 and #13 in the mixed slot #3. In a (e.g., each) frequency hop, the location of resources in the frequency domain for symbol #12 and #13 may be the same as a location of the resources in the uplink slot #4.

An extension containing no DMRS (e.g., zero DMRS) may be implemented. In examples, in extended DMRS transmission, a WTRU may determine that no DMRS (e.g., zero DMRS) may be transmitted in the preceding/previous slot (e.g., only data transmissions are included). The WTRU may determine that DMRS may not be scheduled in the preceding/previous slot by an indication of the extended transmission from the network. The WTRU may receive the indication (e.g., from DCI, a MAC-CE, or RRC signaling), indicating one or more of the following parameters: a starting symbol number of the extended slot; a starting slot number of the extended slot; a length of the extended slot in terms of symbols or slots; and/or a DMRS position in the extended slot where locations (e.g., only locations) of DMRS in the current slot may be indicated.

An effective DMRS density in the extended slot may be reduced, for example, by allocating (e.g., only) data transmission in the preceding/previous slot. For example, referring to FIG. 7, symbol #12 and #13 in slot #3 and uplink symbols in #0 through #13 in slot #4 may be configured as an extended slot, while uplink symbol #12 and #13 in slot #3 may contain data (e.g., only data) and no DMRS.

In examples, the WTRU may receive configuration information (e.g., via DCI, a MAC-CE, or RRC signaling)

containing the number of PUSCH transmission symbols in the extended slot transmission (e.g., as shown in FIG. 7). The WTRU may receive the indication, for example, by DCI associated with the extended slot transmission or dynamic grant, by signaling by a MAC CE, or by RRC signaling for a configured grant configuration corresponding to the extended slot transmission.

The WTRU may receive the length of the extended slot in terms of symbols (e.g., as shown in FIG. 7). The WTRU may receive an uplink grant (e.g., dynamic or configured grant) for the second slot of two consecutive slots (e.g., the uplink slot, such as the uplink slot in FIG. 7, a subsequent slot as described herein, etc.), e.g., as shown in FIG. 7. The WTRU may receive DCI which includes the number of PUSCH transmission symbols to use in the second slot (e.g., the uplink slot) and DMRS pattern in the second slot (e.g., the uplink slot), and/or an indication to use the extended slot (e.g., as shown in FIG. 7). The WTRU may determine the number and location of DMRS symbols in the first slot of the two consecutive slots (e.g., the previous slot) based on a configured number of symbols for PUSCH transmission in the second slot (e.g., the uplink slot) or DMRS pattern in the second slot of the two consecutive slots (e.g., the uplink slot), e.g., as shown in FIG. 7. The WTRU may determine the number an location of DMRS symbols in the first slot of the two consecutive slots (e.g., the previous slot) based on the configuration information associated with the extended slot (e.g., extended slot PUSCH transmission).

For example, if the WTRU receives configuration information that indicates there are no DMRS symbols (e.g., zero DMRS symbols) scheduled in the second slot of the two consecutive slots (e.g., the uplink slot), the WTRU may determine to include one DMRS symbol in the first slot of the two consecutive slots (e.g., the previous slot). In examples, the WTRU may receive an indication that one DMRS symbol is placed at the third symbol in the second slot of the two consecutive slots (e.g., the uplink slot) and the WTRU may determine to include one DMRS symbol in the first slot of the two consecutive slots (e.g., the previous slot), for example, because a PUSCH transmission symbol in the first or second symbol in the second slot (e.g., uplink slot) may benefit from the channel estimate obtained from the DMRS symbol in the first slot (e.g., the previous slot) and interpolation from a joint channel estimation using the DMRS symbols in both first and second slots in the two consecutive slots (e.g., the extended slot). In examples, the WTRU may determine that there are no DMRS symbols (e.g., zero DMRS symbols) scheduled in the first slot (e.g., previous slot), for example, based on the DMRS pattern in the second slot (e.g., the uplink slot). The WTRU may determine, in examples, that there are no DMRS symbols (e.g., zero DMRS symbols) scheduled in the first slot (e.g., the previous slot) based on an indication received by the network (e.g., the gNB), for example, via DCI, a MAC-CE, or RRC signaling.

DMRS symbol placement may depend on PUSCH mapping type(s) or window(s) of time from the first DMRS symbol in the second slot (e.g., the uplink slot).

The placement and number of DMRS symbols in the first slot of two consecutive slots (e.g., the previous slot) may depend on the PUSCH mapping type in the second slot of the two consecutive slots (e.g., the uplink slot). For example, in PUSCH mapping type B, the first DMRS symbol may be placed at the beginning of the slot (e.g., the first slot or the second slot). In such a case, the DMRS symbol(s) in the first slot (e.g., the previous slot) may be placed X symbols away from the first DMRS symbol in the second slot (e.g., the uplink slot) where X may be an integer configured by the network (e.g., via DCI, a MAC-CE, or RRC signaling by the gNB).

The WTRU may determine to place the DMRS symbol(s) within X-symbols from the first DMRS symbol in the second slot (e.g., the uplink slot). The WTRU may place the DMRS symbol(s), for example, at the earliest symbols within the X-symbol window from the first DMRS symbol in the second slot (e.g., the uplink slot). The WTRU may determine how to place the DMRS symbol based on the configuration information/conditions received from the network (e.g., the gNB).

For PUSCH mapping type A (e.g., because the first DMRS symbol may be placed away from the beginning of a slot), the DMRS symbol(s) in a slot (e.g., the first/previous slot) may be placed at configured locations. The WTRU may obtain the configurated locations from the network.

Assumptions (e.g., by a WTRU) of the preceding/previous slot configuration may be based on the configuration of a current configuration. A WTRU may determine a DMRS configuration of a preceding/previous slot based on the DMRS configuration of the current slot. For example, a WTRU may be configured with the DMRS pattern for the current slot (e.g., which may not contain the location of the frontloaded DMRS). The WTRU may determine that the frontloaded DMRS may be contained in the preceding/previous slot. The WTRU may determine the location of the DMRS in the preceding/previous slot by the number of DMRS symbols in the current slot. A location of the DMRS in the preceding/previous slot may be determined by a specified lookup table. The WTRU may determine the location of DMRS based on an association of the current slot and preceding slot, or whether the extended slot may be configured or not.

Fallback behavior may be implemented. A WTRU may determine that the uplink symbols in a preceding/previous slot may not be associated with the uplink symbols in the current slot (e.g., if channels or reference signals other than the PUSCH transmission are allocated in the uplink symbols that contain at least the last symbol in the preceding/previous slot). For example, referring to FIG. 7, if an SRS is scheduled in symbol #13 in the mixed slot #3, the WTRU may determine that the mixed slot #3 does not contain any PUSCH transmissions associated with PUSCH transmission in the uplink slot #4. The WTRU may determine that extended transmission may not be configured and may use DMRS in slot #4 to perform channel estimation for PUSCH transmission in uplink slot #4.

A WTRU may determine that the extended transmission is not configured when a PUCCH transmission, an SRS, a PRACH transmission, a channel, or a reference signal with higher priority than a PUSCH transmission, is configured in uplink symbols that contain at least the last symbol in the preceding/previous slot. A WTRU may receive an explicit indication (e.g., from DCI, a MAC-CE, or RRC signaling) that the extended transmission may not be configured.

A WTRU may receive an explicit indication (e.g., via DCI, a MAC-CE, or RRC signaling) that the extended transmission is cancelled, for example, due to a dynamically allocated SRS or PUCCH transmission in the preceding/previous slot. If the extended slot is already configured and the WTRU receives an indication from the network that reference signals (e.g., or channels other than PUSCH transmissions) are configured in the preceding/previous slot, the WTRU may determine that the extended slot configuration is canceled and may send a PUSCH transmission in the current slot.

A WTRU may receive an explicit indication (e.g., via DCI, a MAC-CE, or RRC signaling) that the extended slot is configured. A WTRU (e.g., after receiving the indication) may determine that the configuration of the extended slot is canceled after the WTRU receives indication from the network (e.g., via DCI, a MAC-CE, or RRC signaling) that a PUCCH transmission, a SRS, or a PRACH transmission is configured in the preceding/previous slot or any slot within the extended slot.

A WTRU may receive a DCI scheduling a PUSCH transmission overlapping in time with the extended slot. The WTRU may determine that the extended slot transmission is canceled and the WTRU may transmit default DMRS configuration information or an extended slot transmission may be omitted (e.g., an extended slot transmission may not be postponed).

The terms extended slot and bundled slots for PUSCH transmission may be used interchangeably.

An extended DMRS transmission may permit a gNB to start processing an extended slot earlier than a normal slot. An extended transmission may reduce processing time, which may improve the quality of communication.

One or more conditions may be placed on assisting transmission and/or extended transmission. A WTRU may transmit an assisting DMRS based on one or more conditions. A WTRU scheduled for a reference transmission may determine an assisting transmission (e.g., an uplink assisting transmission) based on one or more (e.g., certain applicable) conditions for assisting or extended transmission. Conditions for an assisting transmission and/or an extended transmission may include or be based on, for example, one or more of the following: an assisting transmission is indicated by DCI (e.g., including position and number of DMRS in a mixed slot); no SRS or PUCCH transmission scheduled in the uplink symbols in a mixed slot; at least one uplink slot follows a mixed slot; repetition type A or type B; repetition type B (e.g., scheduled over a slot boundary) may not overlap with downlink or flexible symbols; whether a repetition (e.g., type A or type B) overlaps with a resource of a mixed slot or of an uplink slot (e.g., a WTRU may determine to transmit an assisting transmission for a repetition overlapping with a mixed slot and a reference transmission otherwise); a location of DMRS (e.g., DMRS may be placed in a mixed slot if the first symbol in the following uplink slot is DMRS); channel conditions or content of measurement reports; an order of modulation used in PUSCH transmission; and/or the like.

Conditions for an assisting transmission and/or an extended transmission may include or be based on, for example, channel conditions or content of measurement reports. A WTRU may select an assisting DMRS configuration or a number of assisting DMRS symbols in an uplink slot, for example, as a function of measured and/or reported channel conditions (e.g., measured or reported channel quality indicator (CQI), measured or reported L1/L3 RSRP, number of multipath, average delay, delay spread, doppler spread, doppler shift, and/or measured power headroom). In examples, a WTRU may be configured (e.g. by upper layer signaling, such as via RRC signaling) with mapping between measured/reported CQI and a number of (e.g., zero or more) assisting DMRS symbols per slot and/or a DMRS PUSCH transmission configuration. The WTRU may select the number of assisting DMRS symbols, for example, as a function of the reported CQI value to the network. In examples, a WTRU may be configured (e.g., via upper layer signaling, such as via RRC signaling) with mapping between measured/reported L1/L3 RSRP and a number of (e.g., zero or more) DMRS symbols per slot and/or a DMRS PUSCH transmission configuration. The WTRU may select the number of DMRS symbols and/or the DMRS configuration, for example, as a function of the measured or reported L1/L3 RSPR value to the network. The WTRU may be configured, for example, with a mapping between power headroom (PH) values and a number of DMRS symbols or a DMRS configuration. In examples, a WTRU may change the active DMRS configuration (e.g., select a different DMRS configuration), for example, if the WTRU received an acknowledgment or an indication from a network for a reported measurement. The WTRU may change the assisting DMRS configuration or select a different number of DMRS symbols per slot, for example, after including a power headroom report (PHR) MAC CE, and/or determining ACK as a HARQ-ACK value for a PDU containing the MAC CE.

Conditions for an assisting transmission and/or an extended transmission may include or be based on, for example, the order of modulation used in a PUSCH transmission. For example, a WTRU may (e.g., for high-order modulation such as 64QAM) receive configuration information with an assisting DMRS in a mixed slot, for example, to improve the quality of channel estimation for high order modulation. In examples, a WTRU may receive configuration information to assign no DMRS symbols (e.g., zero DMRS symbols) in a preceding/previous slot for low order modulation. The WTRU may receive a look-up table in the configuration information, which may be used to determine the location and number of assisting DMRS to be placed in the preceding/previous slot. The number of DMRS in a bundle may relate to the order of modulation. A WTRU may (e.g., according to a look-up table), determine the location and number of assisting DMRS to be placed in the bundle. The number of DMRS shared by multiple actual or nominal repetitions may vary, for example, depending on the order of modulation.

In examples, a WTRU may receive a dynamic indication (e.g., from DCI) or configuration information (e.g., via higher layer signaling, such as via RRC signaling) for transmission of PUSCH transmission using repetition type A or type B. A WTRU may determine (e.g., for each repetition, actual repetition or nominal repetition indicated by DCI or via higher layer signaling (e.g., via RRC signaling)) whether to perform an assisting transmission or a reference transmission in corresponding resources, for example, based on the symbol direction (e.g., uplink, downlink, or flexible) and/or slot format of the resource. In examples (e.g., for a PUSCH transmission repetition type A), a first repetition may overlap with a mixed slot and a second repetition may overlap with an uplink slot. A WTRU may, for example, transmit an assisting transmission for the first repetition and a reference transmission for the second repetition. The number and placement of DMRS and/or PUSCH transmission symbols (e.g., for the assisting transmission) may be set, for example, based on the number of uplink symbols of the mixed slot.

Conditions for an assisting transmission (e.g., for a downlink assisting transmission) may include, for example, one or more of the following: a mixed slot with downlink symbols starting from the beginning of the slot following a downlink slot; repetition schemes used in downlink; a number of slots that precede the mixed slot; and/or the like.

A WTRU may receive configuration information to receive DMRS placed/located in a special downlink slot, for example, if the first symbol in the preceding/previous down slot is DMRS.

DMRS bundling may be determined in relation to retransmission(s).

DMRS bundling may be disabled or enabled for retransmission(s). In examples, DMRS bundling may be enabled for retransmission(s) of a PUSCH/PUCCH transmission based on at least one of the following (e.g., one of the following conditions): a retransmission is scheduled within a bundling window (e.g., in time) where the bundling window contains the PUSCH/PUCCH transmission associated with the retransmission; the number of samples between a retransmission and the PUSCH/PUCCH transmission(s) associated with the DMRS bundle is equal to or above a value (e.g., a threshold configured by a base station (e.g., the gNB)). DMRS bundling may be disabled for retransmission(s) of PUSCH/PUCCH based on one of the following (e.g., one of the following conditions): a retransmission is scheduled outside of a bundling window (e.g., in time) where the bundling window contains the PUSCH/PUCCH transmission associated with the retransmission; the number of samples/symbols/slots between a retransmission and the PUSCH/PUCCH transmission(s) associated with the DMRS bundle is below the value (e.g., the threshold configured by a base station (e.g., the gNB)). The length of a bundling window may be defined, for example, by the number of symbols, slots, or frames. The parameters for a bunding window may include at least one of the following parameters: parameters indicating a duration/length of the window (e.g., the number of symbols, slots or frames); a starting position/location or ending position/location of the window (e.g., symbol/slot/frame number or system frame number (SFN) where the window starts, symbol/slot/frame number where the window ends); a starting position/location of DMRS bundling process within a window (e.g., symbol/slot/frame number or SFN where the DMRS bundling process starts, symbol/slot/frame number where the window ends); an offset of the window in symbols/slots/frames with respect to a reference location indicated by SFN, a symbol number or slot number; a type of the window (e.g., aperiodic, semi-persistent or periodic); or an index associated with a bundling window. A WTRU may receive configuration information related to a bundling window in a configured/dynamic grant configuration. Bundling window, window, time window, or DMRS bundling window may be used interchangeably. The parameters of the aforementioned window may be determined based on the WTRU capability.

In examples, DMRS bundling may be disabled for retransmission(s) of a PUSCH/PUCCH transmission based on at least one of the following (e.g., one of the following conditions): a retransmission is scheduled outside of a bundling window (e.g., in time) where the bundling window contains the PUSCH/PUCCH transmission associated with the retransmission; the number of samples between a retransmission and the PUSCH/PUCCH transmission(s) associated with the DMRS bundle is equal to or above a value (e.g., a threshold configured by a base station (e.g., the gNB)). DMRS bundling may be enabled for retransmission(s) of a PUSCH/PUCCH transmission based on one of the following (e.g., one of the following conditions): a retransmission is scheduled within of a bundling window (e.g., in time) where the bundling window contains the PUSCH/PUCCH transmission associated with the retransmission; the number of samples between a retransmission and the PUSCH/PUCCH transmission(s) associated with the DMRS bundle is below the value (e.g., the threshold configured by a base station (e.g., the gNB)).

In examples, the WTRU may determine that the DMRS(s) associated with the retransmission is not included in the DMSR(s) bundled for the PUSCH transmission(s) associated with the retransmission.

There may be different types of DMRS bundling windows.

The WTRU may receive configuration information and determine, based on the configuration information that the bundling window is configured as periodic, semi-persistent or aperiodic. The WTRU may receive an indication of type(s) of the bundling window, for example, from a base station (e.g., from the gNB). The WTRU may receive the indication, for example, via/in one or more of the following: RRC signaling, DCI, a medium access control (MAC)-control element (CE), configuration information related to a configured/dynamic grant, or configuration information related to a dynamic grant.

The bundling window may be associated with a periodicity of a PUSCH/PUCCH transmission repetition (e.g., a PUSCH/PUCCH transmission repetition bundle). In examples, the WTRU may determine (e.g., implicitly determine) that if a PUSCH/PUCCH transmission repetition type is periodic, the associated bundling window may be configured as periodic. In examples, the WTRU may determine (e.g., implicitly determine) that if a PUSCH/PUCCH transmission repetition type is semi-persistent, the associated bundling window may be configured as semi-persistent and the MAC-CE may be used to activate or deactivate semi-persistent PUSCH repetition and bundling.

In examples, the WTRU may determine whether a bundling window is implicitly or explicitly configured by the base station (e.g., the gNB). For example, if a bundling window is explicitly configured, the WTRU may receive an indication for a configuration of a bundling window, for example, via DCI, a MAC-CE, or RRC signaling. Such indication may be signaled, for example, by MAC signaling, configured by RRC signaling, or indicated in the DCI associated with the PUSCH transmission. In examples, the WTRU may receive configuration information from the base station and determine (e.g., implicitly determine) an association of a bundling window with PUSCH/PUCCH transmission repetition(s).

The WTRU may activate or deactivate a bundling window (e.g., deactivate DMRS bundling), for example, via a MAC-CE. The WTRU may activate or deactivate bundling window based on one or more of the following conditions: a doppler shift or spread is equal or above (e.g., or below) a threshold configured by a network (e.g., gNB); a standard deviation or variance of CSI is equal or above (e.g., or below) a threshold configured by network (e.g., a gNB); or a detected phase shift or carrier frequency offset is equal or above (e.g., or below) a threshold configured by network (e.g., gNB).

The WTRU may be configured with a time (e.g., via a timer) during which a bundling window is active. The WTRU may disable DMRS bundling based on the expiration of the time (e.g., once the timer expires). A bundling window (e.g., the time for a bundling window) may start at at least one of the following instants: the WTRU receives an activation/trigger command of a bundling window via DCI/MAC-CE; the WTRU transmits a first PUSCH/PUCCH transmission/repetition that is within the bundling window.

The bundling window (e.g., the timer for the bundling window) may expire based on at least one of the following conditions: the configured time (e.g., associated with the timer elapses); the WTRU deactivates the bundling window, for example, via a MAC-CE.

The WTRU may receive a DCI which includes an indication to trigger a bundling window. The WTRU may be configured to trigger a bundling window, for example, N symbols/slots/frames after the WTRU receives the indication to trigger the bundling window, where N may be configured by the network (e.g., gNB).

The threshold(s) (e.g., N in the example above) may be signaled (e.g., by MAC signaling, by RRC signaling) or indicated in the DCI associated with the PUSCH transmission.

Herein, DMRS bundling window and bundling window may be used interchangeably.

In examples, the WTRU may receive a bundling window that may contain uplink symbols which do not contain channel transmissions (e.g., PUSCH transmission, PUCCH transmission). In examples, a bundling window may contain a portion of a slot which includes DMRS symbols (e.g., DMRS symbols only) or contain DMRS symbol(s) and symbols which do not have channels scheduled (e.g., gap symbols). For example, as shown in FIG. 7, the WTRU may receive configuration information in which the $12^{th}$ symbol in mixed slot #3 contains a DMRS symbol and the $13^{th}$ symbol in mixed slot #3 may not contain scheduled channel transmissions (e.g., PUSCH transmission, PUCCH transmission) and, for example, used as a gap symbol. As shown in FIG. 7, the WTRU may receive configuration information associated with a bundling window which starts at the $12^{th}$ symbol in mixed slot #3 and ends in the $13^{th}$ symbol in uplink slot #4.

An interference measurement resource may be provided for an assisting DMRS. One or more uplink slot types may be used or defined, for example, where a first uplink slot type may be an uplink slot associated with a first type of DMRS-interference measurement resource (D-IMR) and a second uplink slot type that may be an uplink slot associated with a second type of D-IMR.

One or more physical resources (e.g., resource element, symbol, RB, and/or slot) may be used for an interference measurement for demodulation. A physical resource may be located within the scheduled resources (e.g., PUSCH transmission or PDSCH transmission). A physical resource for interference measurement for demodulation may be referred to as an interference measurement resource for demodulation (D-IMR). A D-IMR may be, for example, one or more of following: a DMRS; a zero-power RE (ZP-RE) (e.g., an RE with zero transmission power); a measurement reference signal (e.g., SRS, CSI-RS, TRS, SSB); and/or the like. D-IMR may be used interchangeably with DMRS, zero-power IMR (ZP-IMR), non-zero-power IMR (NZP-IMR), ZP-RE, and/or muted RE.

One or more uplink slot types may be used or defined. A first uplink slot type may be an uplink slot associated with a first type of D-IMR. A second uplink slot type may be an uplink slot associated with a second type of D-IMR. A first type of D-IMR may be used for a PUSCH transmission, for example, if the PUSCH transmission is in the first uplink slot type. A second type of D-IMR may be used for a PUSCH transmission, for example, if the PUSCH transmission is in the second uplink slot type. In examples, one or more of following may apply.

An uplink slot type may be determined, for example, based on one or more of following: a slot offset value of a slot from the closest mixed slot (e.g., earlier than the slot); a time gap value between a slot and the closest mixed slot (e.g., earlier than the slot); a slot number within a frame; a number of uplink symbols for a PUSCH transmission; and/or the like.

An uplink slot type may be determined, for example, based on a slot offset value of a slot from the closest mixed slot (e.g., earlier than the slot). A slot may be determined as a first uplink slot type, for example, if the slot offset for an uplink slot from the mixed slot is less than a threshold; and otherwise, the slot may be determined as a second uplink slot type. A mixed slot may be the closest slot in which switching from downlink to uplink occurs. A mixed slot may be the closest slot in which one or more downlink symbols, one or more guard symbols, and one or more uplink symbols may be included. A mixed slot may be a slot where an associated DMRS is transmitted for a PUSCH transmission in a later slot. A mixed slot may be a flexible slot of where direction (e.g., DL or UL) may be dynamically determined (e.g., via DCI and/or a MAC-CE). A mixed slot may be a slot where at least one symbol may be configured as a flexible symbol. The direction of a flexible symbol may be dynamically determined (e.g., via DCI and/or a MAC-CE). A threshold to determine an uplink slot type based on the slot offset may be determined, for example, based on one or more of the following: a higher layer configuration (e.g., via RRC signaling); a WTRU speed (e.g., channel coherent time); a slot aggregation level or number; and/or the like.

An uplink slot type may be determined, for example, based on a time gap value between a slot and the closest mixed slot (e.g., earlier than the slot). A slot may be determined to be a first uplink slot type, for example, if the slot is next to the closest mixed slot (e.g., gap=1) and, otherwise, the slot may be determined as a second uplink slot type. Time gap may be used interchangeably with a slot offset.

Figure 8:
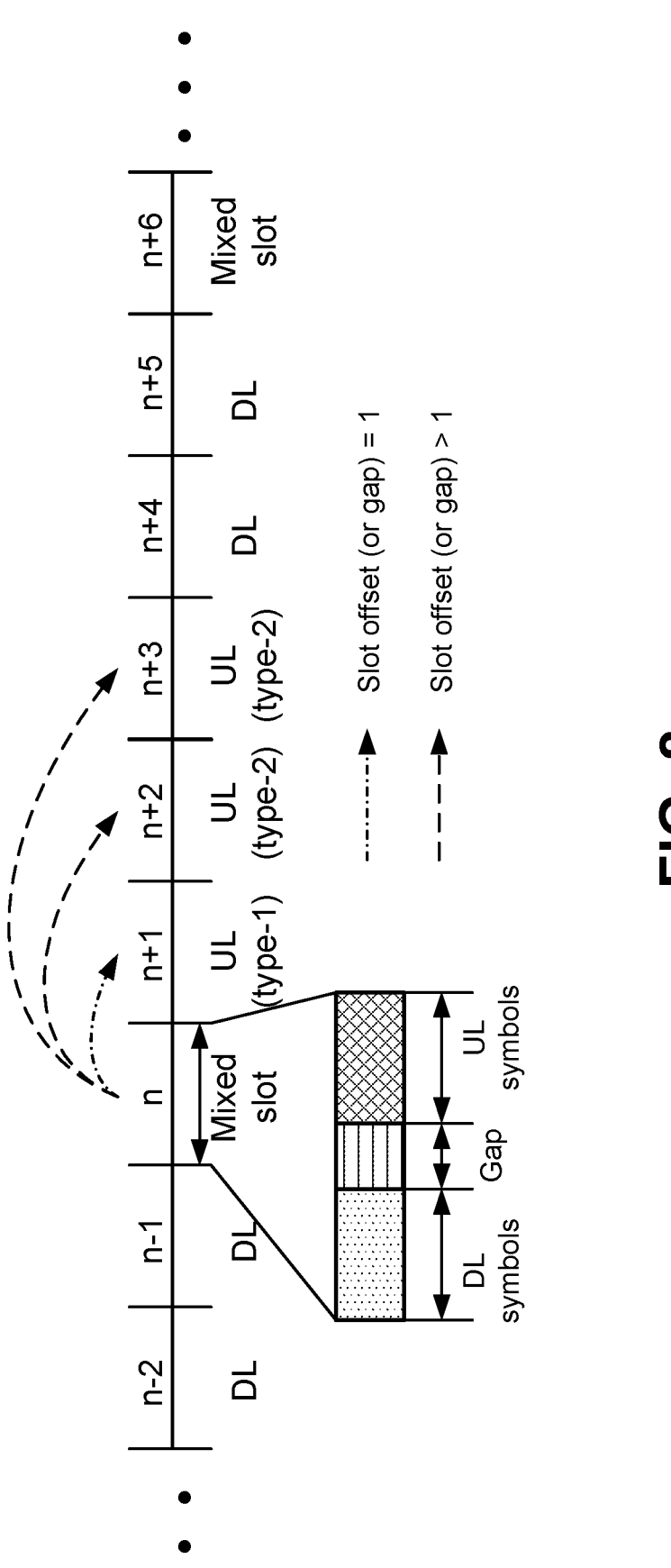
FIG. 8 illustrates an example of UL slot type determination based on a slot offset from mixed slot.

FIG. 8 illustrates an example of UL slot type determination based on a slot offset value from a mixed slot.

An uplink slot type may be determined, for example, based on a slot number within a frame. For example, a (e.g., each) slot number that may be used for uplink transmission may be associated with an uplink slot type. An uplink slot type for an uplink slot may be configured, for example, via a higher layer signaling (e.g., RRC signaling and/or a MAC-CE).

An uplink slot type may be determined, for example, based on a number of uplink symbols for a PUSCH transmission. For example (e.g., in an uplink slot), a subset of symbols may not be used (e.g., a WTRU may refrain from using the subset of symbols) for a PUSCH transmission (e.g., resources for rate-matching). The number of symbols available for a PUSCH transmission in a slot may determine the uplink slot type.

A D-IMR type may be, for example, one or more of following: a physical resource type, a DMRS pattern; a ZP-RE pattern; and/or the like. A D-IMR type may be a physical resource type. For example, a first D-IMR type may be a DMRS and a second D-IMR type may be ZP-RE. A D-IMR type may be a DMRS pattern. For example, a first D-IMR type may be a first DMRS pattern (e.g., lower density) and a second D-IMR type may be a second DMRS pattern (e.g., higher density). A DMRS pattern may be determined, for example, based on one or more of a time/frequency density, a time/frequency location, and/or whether the DMRS is front-loaded or not. A DMRS pattern may be used interchangeably used with a DMRS density. Density may be referred to as the number of REs for DMRS in an RB (e.g., a PRB). A D-IMR type may be a ZP-RE pattern. For example, a set of ZP-REs may be used as D-IMR. A ZP-RE pattern may be determined, for example, based on a time/frequency density of ZP-REs and/or a time/frequency location of ZP-REs.

In examples, a WTRU may be configured with one or more DMRS patterns. The WTRU may use a first DMRS pattern for a PUSCH transmission scheduled in a first uplink slot type. The WTRU may use a second DMRS pattern for a PUSCH transmission scheduled in a second uplink slot type. The first DMRS pattern may have a lower density (e.g., smaller number of DMRS symbols in a slot) than the second DMRS pattern.

In examples, a WTRU may determine a first D-IMR type for a PUSCH transmission scheduled in a first uplink slot type. The WTRU may determine a second D-IMR type for a PUSCH transmission scheduled in a second uplink slot type. The first D-IMR type may be one or more ZP-REs and the second D-IMR type may be DMRS. The one or more ZP-REs may be located within the scheduled resources (e.g., RBs). The time/frequency location of ZP-REs within the scheduled resources and/or the number of ZP-REs per RB, PRB, or scheduled resources may be determined, for example, based on one or more of following: system parameters (e.g., cell identity, slot number, frame number, bandwidth part (BWP)-id, etc.); WTRU-specific parameters (e.g., WTRU identity including cell RNTI (C-RNTI), international mobile subscriber identifier (IMSI), and serving temporary subscriber identity (s-TMSI), PDCCH search space id, CORESET identity, etc.); a scheduled parameter for the associated PUSCH transmission (e.g., MCS, rank, HARQ process id, number of symbols for PUSCH transmission, etc.); and/or the like. A WTRU may puncture or rate match around a PUSCH transmission on the REs used as ZP-REs.

Examples described herein for uplink may not be limited to uplink. For example, an uplink slot referenced in examples may be used interchangeably with a sidelink slot and a downlink slot. D-IMR types described herein may be used for PDSCH transmission.

Power control may be provided for assisting DMRS. Phase continuity between slots may be a concern, for example, if a DMRS is placed in the last symbols of a slot n serving as channel estimation of the slot n+1 data demodulation. Power and phase distortion that may occur between slots may be maintained and minimized, for example, for gNB receiver coherence and performance. One or more rules may manage one or more situations to support assumptions that may be followed by WTRUs and gNBs.

A WTRU may determine TPC commands application. A WTRU may receive TPC commands over PDCCH transmission (e.g., in a DCI format 0_0 or 0_1), for example, that may schedule a PUSCH transmission on occasion n+1, e.g., scrambled by TPC-PUSCH_RNTI. A WTRU may include the DMRS symbols in the last symbols of the slot n. The WTRU may apply the TPC command pertaining to slot n+1, e.g., starting with DMRS symbols in slot n that may serve for the slot n+1 demodulation.

A WTRU may determine a panel change/activation/deactivation. A WTRU may be equipped with an antenna panel (e.g., multiple antenna panels). Panels may have different calibrations. Effective isotropic radiated power (EIRP) power differences may be expected and/or may occur, for example, if tolerances are (e.g., quite) large. A panel change that may occur, for example, if specific absorption rate (SAR)/maximum permissible exposure (MPE) (e.g., RF exposure) are sensed by proximity sensors causing beam transmission/reception degradation. Large EIRP level jumps may be expected and/or may occur, e.g., in the context of a panel change. Changes may (e.g., sometimes) be transparent to a gNB, or a scheduled change of panel may occur. Changes may lead to an interruption at the edge of a slot, which may lead to a loss of a symbol, for example.

A WTRU may follow one or rules under one or more conditions, such as, if the WTRU inserts or is supposed to insert a DMRS in the last symbols in slot n serving demodulation of slot n+1, and where a panel change is supposed to take place at the end of slot n. A WTRU may follow one or more (e.g., any combination) of the following rules. A WTRU may switch the panel(s) in the last guard period (GP) pertaining to slot n, after which the DMRS symbols may be placed with the same power level, for example, on the new panel(s) as slot n+1 PUSCH transmission symbols. DMRS symbols in slot n may be transmitted with the same spatial filter as for slot n+1. A WTRU may avoid inserting the DMRS in the last symbols that may support transmission on single panel and may fall back to a standalone transmission of PUSCH in slot n+1, for example, if the WTRU has multi-panel simultaneous UL transmissions in slot n, and slot n+1 is scheduled for a single panel transmission. A WTRU may perform rate matching with a fallback DMRS configuration. A fallback configuration may be (e.g., implicit), for example, by a fall back in the modulation and coding table index with a lower spectrum efficiency. A fallback index may be signaled as a delta value (e.g., via RRC signaling) for the negative distance in the modulation and coding index table, for example, to provide an appropriate mutual understanding between a WTRU and a gNB scheduler.

A WTRU may determine bandwidth part activation/deactivation. A WTRU may be configured with multiple bandwidth parts (BWPs). A WTRU may follow one or more rules, for example, if a second BWP is activated or deactivated at the border of slot n, and if the WTRU is supposed to place DMRS in slot n in the last symbols in support of channel estimation for PUSCH in slot n+1. A WTRU may refrain from receiving or transmitting for a subframe/slot in FR1 or a half slot in FR2, for example, if a BWP activation/deactivation occurs (e.g., due to the RF front end and other RF retuning). A BWP activation may occur. The free subframe (e.g., in FR1) and half slot (e.g., in FR2) retuning time may take place. The last symbols of the slot n may be used after the retuning time to send the front DMRS supporting the slot n+1 PUSCH demodulation at the same power with slot n+1 for phase continuity, e.g., if BWP activation happens and the free subframe (e.g., in FR1) and half slot (e.g., in FR2) take place. A WTRU may be configured to fall back to a modulation and coding index at a delta index (e.g., for a smaller spectrum efficiency) and use (e.g., only) a standalone PUSCH transmission with a (e.g., classic) DMRS configuration, for example, if the retuning procedure takes too long and if the insertion of the DMRS at the end of slot n is not possible.

A WTRU may determine cell activation/deactivation at the slot n, with the n+1 slot scheduled for PUSCH transmission. Cell activation/deactivation may lead to phase discontinuity between the slots, for example, if a WTRU is configured with carrier aggregation (CA) and the cells in the same cell group or different groups are served by the same panel(s). A WTRU may fall back to normal PUSCH standalone transmissions, for example, if the WTRU is scheduled for PUSCH transmission in a slot where the activation/deactivation takes place or is in vicinity of operation of the activation/deactivation. A WTRU may fall back to a configured delta index in a modulation and coding index table, for example, if a UL grant is based on a previous front slot DMRS demodulation and decoding performance.

A WTRU coming out of a discontinuous reception (DRX), UL discontinuous transmission (DTX), or a measurement gap may apply one or more rules. A WTRU may apply one or more rules, for example, if the WTRU is allowed/configured to use front slot DMRS insertion in support of following slot scheduled PUSCH transmission, and if the WTRU is coming out of a DRX, UL DTX or a measurement gap. A WTRU may apply one or more (e.g., a combination) of the following rules. For example, a WTRU may have a (e.g., limited) number of inter-frequency measurement layers for gap measurements configuration that may allow an (e.g., early enough) time intra-frequency retuning, for example, to allow for front slot DMRS transmission in slot n. A limited number of inter-frequency layers, or inter-RAT measurements, may be signaled as a WTRU capability. A WTRU may use legacy (e.g., 4G) PUSCH transmissions, for example, if the number of the frequency layers to measure exceed WTRU capability. A front slot DMRS technique may be assumed by a base station (e.g., a gNB) and a WTRU, for example, if the number of measurement layers to measure configured by a gNB is below the number declared in WTRU capabilities. In examples, a WTRU may be coming out of a DRX cycle or UL DTX and may be scheduled in slot n+1 with PUSCH transmission. The WTRU may wake up earlier, tune in, and start transmission of the front slot n+1 DMRS support symbols at the end of slot n, for example, if the WTRU comes out of a DRX cycle or UL DTX and is scheduled in slot n+1 with PUSCH transmission. Power control parameters pertaining to slot n+1 may be applied to the DMRS symbols in slot n (e.g., as well as for phase continuity).

RS configuration(s) may be used in relation to bundling. One or more examples herein may enable the use of efficient RS configuration(s), for example, if bundling is applied for a set of transmissions. A WTRU may transmit using such RS configuration(s) if bundling is applied, for example, to facilitate a channel estimation at the receiver while keeping a low overhead due to RS(s).

A phase-tracking reference signal (PTRS) may be inserted, for example, into RS configuration(s).

Figure 9:
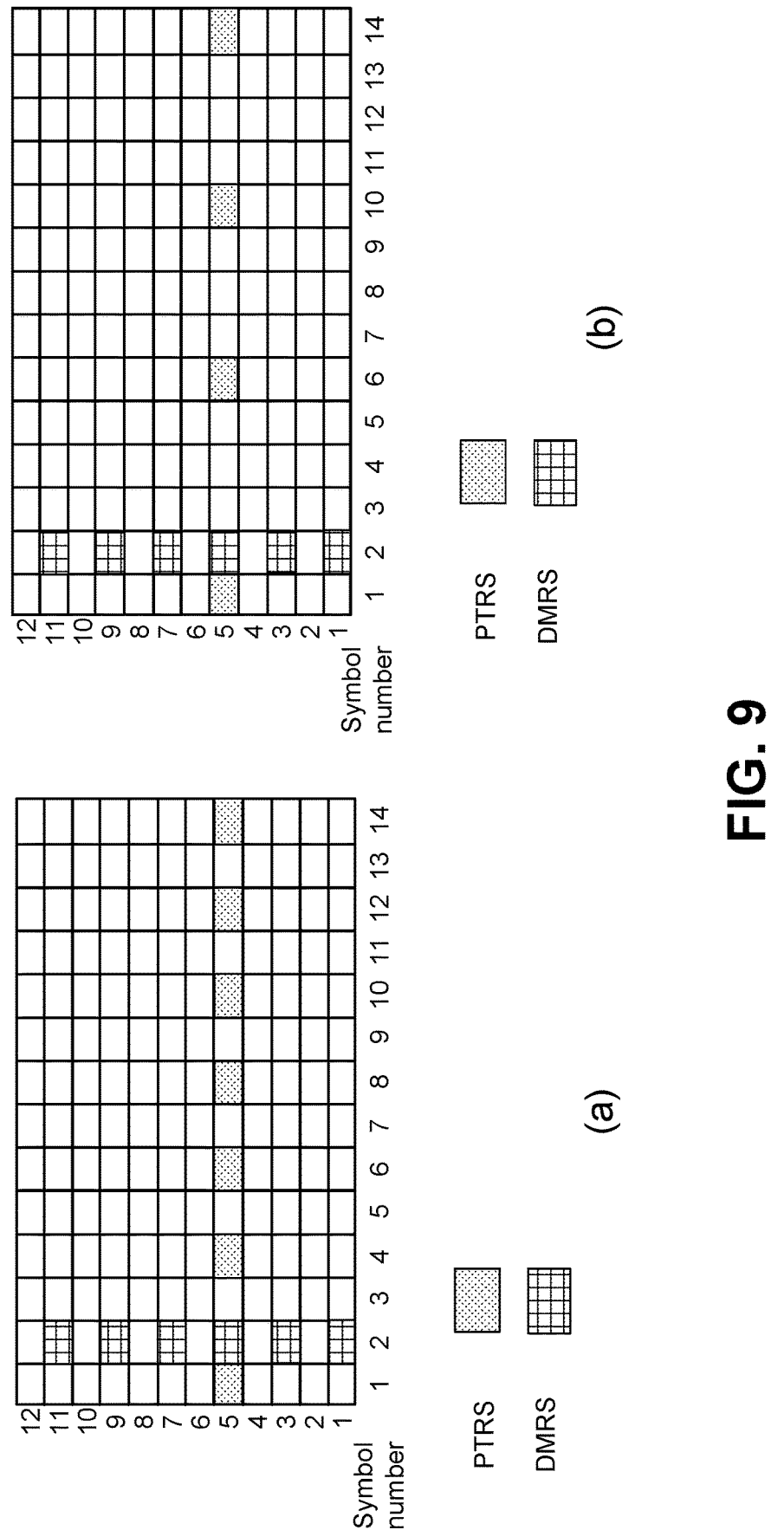
FIG. 9 illustrates an example of the DMRS and PTRS allocations for 2- and 4-time symbols in CP-OFDM.

An RS configuration applicable to bundling may include a phase-tracking reference signal (PTRS), or enhancement thereof. As illustrated in the FIG. 9, PTRS may be characterized by a relatively low density in the frequency domain (e.g., 1 RE every 24 or 48 subcarriers if transform precoding is not enabled) and relatively high density in the time domain (e.g. every 1, 2 or 4 time symbols). The receiver may estimate phase variations due to the channel or due to transceiver implementation if transmissions are not contiguous in the time domain, for example, based on the inclusion of PTRS by the WTRU in case of bundling. FIG. 9 illustrates an example of the DMRS and PTRS allocations for 2- and 4-time symbols in cyclic prefix (CP)-OFDM case.

A PTRS (or enhanced PTRS) (e.g., that are inserted into a set of transmissions over which bundling is applicable) may be mapped to a subset of the REs of a set of REs (e.g., shown in the time-frequency of grid in FIG. 9(a) and FIG. 9(b)). PTRS (or enhanced PTRS) samples inserted into a set of transmissions over which bundling is applicable may be mapped to a subset of samples in OFDM symbol(s) prior to transform precoding, for example, if transform precoding is enabled. Such mapping may be referred to as an enhanced PTRS mapping configuration. At least one of the following quantities may characterize such mapping: the number of resource blocks or subcarriers between resource elements (e.g., or groups thereof) on which PTRS is mapped (e.g., such quantity may be referred to as frequency density); the number of resource elements per group of contiguous resource elements on which PTRS is mapped, for example, in case transform precoding is enabled (e.g., such quantity may be referred to as group size); the number of time symbols between resource elements on which PTRS is mapped (e.g., such parameter may be referred to as time density); the number of samples between groups, for example, prior to transform preceding, where a group may include at least one PTRS sample (e.g., if transform preceding is enabled, the parameters herein may be referred to as a density within an OFDM symbol); the first and/or the last time symbol on which PTRS is mapped; the lowest and/or the highest subcarrier on which PTRS is mapped; the locations of a (e.g., each) group of PTRS samples in an OFDM symbol, for example, if transform precoding is enabled (e.g., the first and/or the last group of samples on which PTRS samples are mapped and/or the number of samples between each group of PTRS samples).

The WTRU may apply an enhanced PTRS mapping configuration in at least one transmission from a bundle, for example, as a function of at least one of the following properties of a set of transmissions over which bundling applies: any of the parameters mentioned herein for the conditions for transmitting assisting or extended transmission(s); the number of transmissions of the bundle; the duration of any transmission of the bundle or the duration of a subset of transmissions of the bundle, for example, including a (e.g., any) gap between transmissions; a modulation order, a modulation and coding scheme (MCS) index, or a size of resource block (RB) allocation of at least one transmission of the bundle; whether a transmission gap is present between successive transmissions of the bundle; whether a transmission is before (e.g., immediately before) a transmission gap, after (e.g., immediately after) a transmission gap; or both; whether frequency hopping is applied within the bundle; or whether a change of frequency allocation occurs between successive transmissions of the bundle.

A DMRS configuration may be associated to PTRS insertion.

A WTRU may apply a DMRS configuration (e.g., optimized for phase estimation in at least one transmission), for example, if the WTRU applies an enhanced PTRS mapping configuration. For example, DMRS(s) may be mapped to resource elements that are located in the Nth time symbol of a transmission (e.g., the first transmission following a gap within the bundle).

The mapping for the CP-OFDM waveform may be shown herein. The DFT-precoded OFDM may use a similar principle as the CP-OFDM (e.g., in examples for the DFT-precoded OFDM; the PTRS may be inserted before precoding). Examples herein may show a single DMRS occurrence, but the principle may be extended to multiple DMRS symbols per slot. The examples herein may apply to a bundling window that uses the same frequency resources, and, for example, no intra-slot hopping may be configured.

Figure 10:
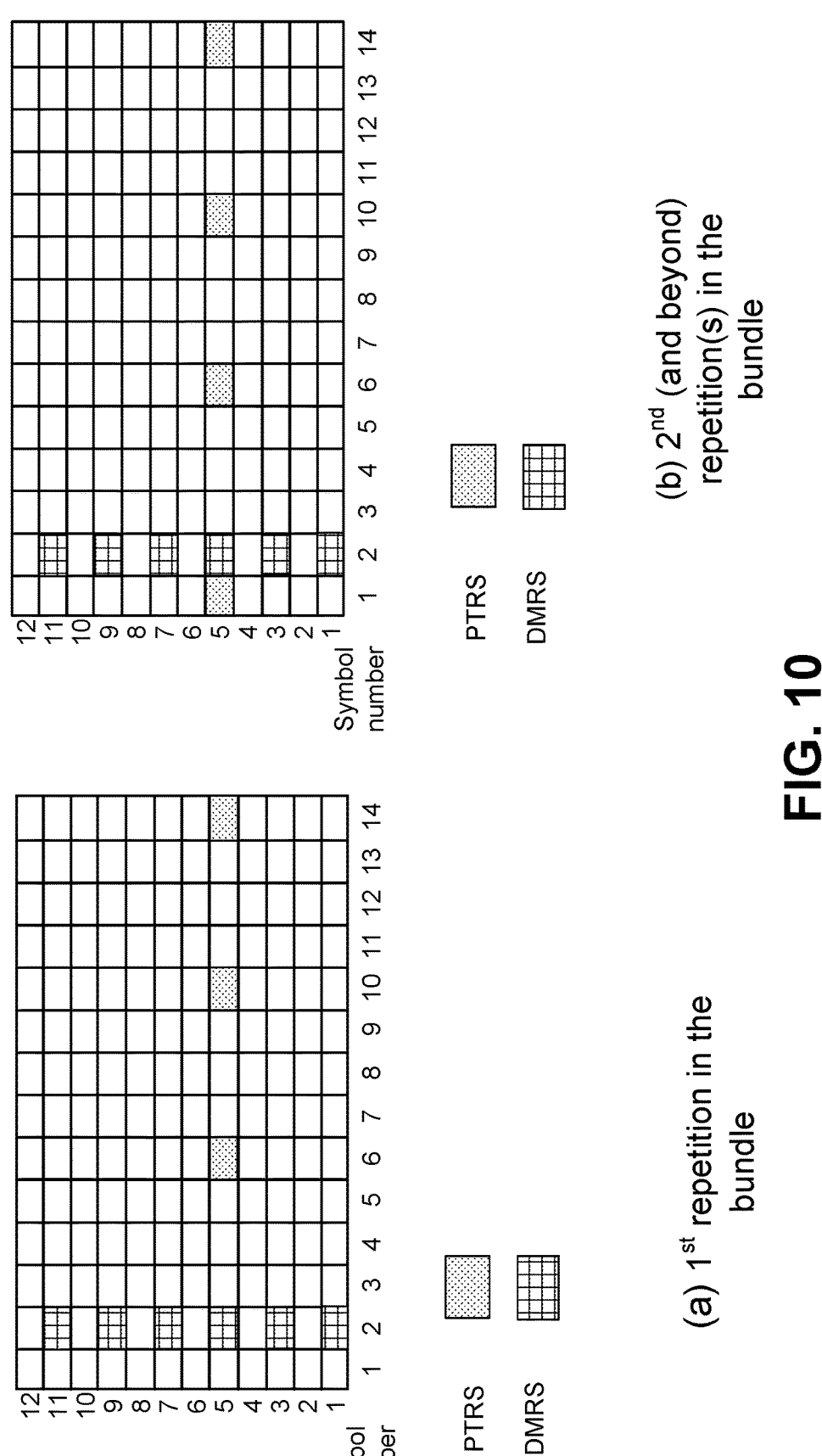
FIG. 10 illustrates an example of PTRS insertion in a repetition bundle.

In examples, if the WTRU has non-contiguous uplink transmissions; the first transmission in the bundle may have the PTRS inserted after (e.g., only after) the first DMRS symbol, for example, while the following repetitions may have the PTRS inserted at least one symbol before the first DMRS occurrence as shown in FIG. 10. FIG. 10 illustrates an example of the PTRS insertion in a repetition bundle. The first repetition in the bundle may set the phase reference for the following repetitions. In the second and possibly following repetition(s), the first PTRS occurrence may be before (e.g., just before) the first DMRS occurrence in time domain and in the same frequency domain location. A phase estimation and/or correction may be possible for the DMRS coherence with the first DMRS from the first repetition in the bundle.

Figure 11:
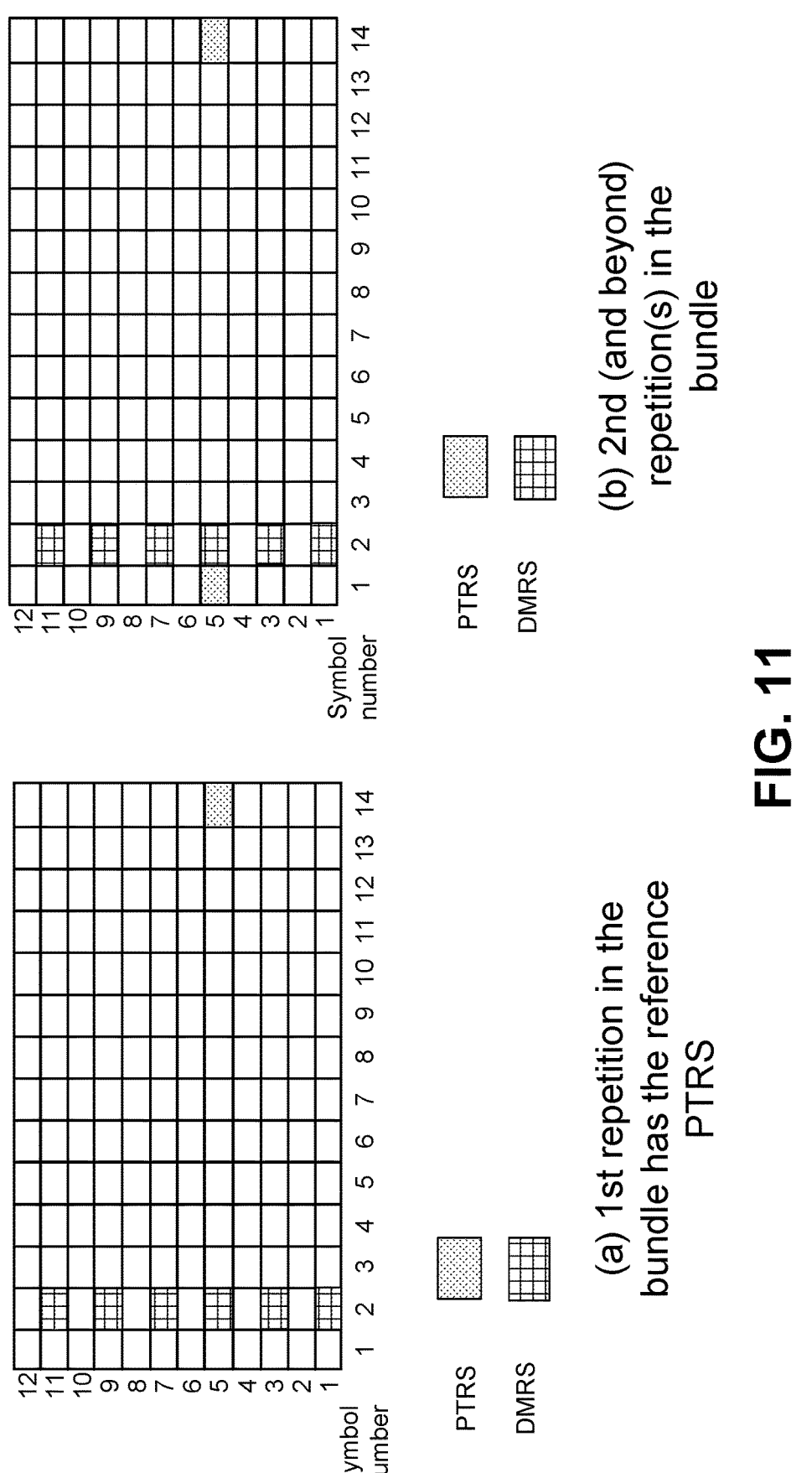
FIG. 11 illustrates an example of PTRS overhead reduction in a repetition bundle.

The number PTRS time domain density may be reduced with a factor of n, for example, to reduce the overhead. For example, the WTRU may transmit the first PTRS and the last PTRS (e.g., only the first and the last PTRS) in the slot. FIG. 11 illustrates an example of the PTRS overhead reduction in a repetition bundle.

Figure 12:
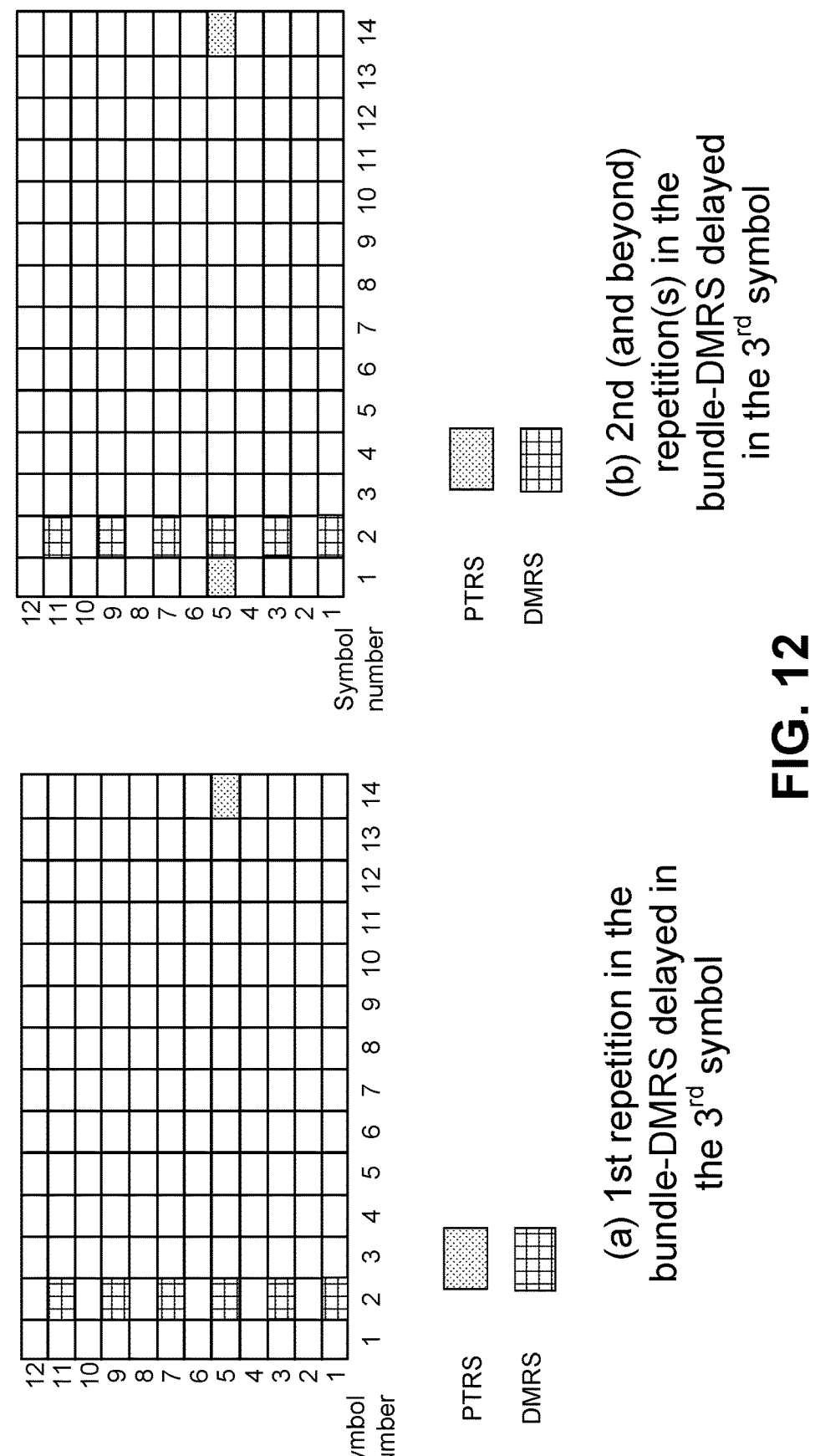
FIG. 12 illustrates an example of PTRS position and DMRS symbol delayed in a second and beyond repetition bundle.

For the DMRS bundling with PTRS insertion for phase reference and/or correction, the WTRU may apply a second configuration of the DMRS in the second repetition and beyond repetitions that may be delayed in time domain, for example, to allow for enough processing time for phase change estimation and/or correction. For example, the DMRS location may be placed after one symbol after the PTRS occurrences in time domain as in the FIG. 12. FIG. 12 illustrates an example of the PTRS position and DMRS symbol delayed in a second repetition and beyond repetition(s) bundle.

The network may be assisted in configuration or indication of bundling operation. A WTRU may send an indication (e.g., based on speed) that DMRS bundling may be be used (e.g., that DMRS bundling may be beneficial). The WTRU may determine (e.g., determine autonomously) if bundling is to be applied or not. The WTRU may send UCI to indicate (e.g., to the network) a bundling configuration. The WTRU may send an enhanced sounding signal (e.g., containing PTRS and/or with discontinuous transmission), for example, to help the network determine required RS configuration/bundling. A WTRU may indicate to the network (e.g., gNB) if the phase has changed (e.g., during a preconfigured time window).

A WTRU may indicate phase changes.

Under certain conditions, the WTRU may be able to maintain the power and/or phase continuity (e.g., even for non-contiguous transmission), for example, while assuming that there are no TPC commands (e.g., new TPC commands) or there is no different pathloss value to be applied. Under these conditions, the DMRS repetition bundling may be possible.

In examples, there may be WTRU internal processes that are invisible to the base station (e.g., the gNB), which may impact the phase continuity. WTRU internal processes may include, for example, the automatic frequency control (AFC) actions that may track the base station (e.g., the gNB) central frequency (e.g., into 0.1 ppm relative to the base station). If this happens in the WTRU while the WTRU is performing a repetition bundling, the frequency correction may translate into a phase discontinuity.

The thermal effects and the stability loop may impact the phase continuity, which may be an invisible process to the base station.

If WTRU-based corrections occur, the WTRU may indicate (e.g., be required to indicate) to the base station that the phase continuity is impacted, for example, in order to preserve the demodulation coherence of the DMRS. This information may be reported by the WTRU, for example, using a flag in one or more of the following: DCI, MAC signaling, or an RRC signaling report triggered by the WTRU. This reporting may be configured by the base station (e.g., gNB), for example, at the repetition bundling configuration time.

In examples, the base station may stop DMRS bundling and/or use slot based DMRS estimation for the rest of the repetition bundle. The base station may stop DMRS bundling and/or use slot based DMRS estimation for a specified amount of time. The base station may stop DMRS bundling and/or use slot based DMRS estimation for a number of slots. The base station may stop DMRS bundling and/or use slot based DMRS estimation for a number of bundles.

In examples, after signaling the phase discontinuity to the base station (e.g., the gNB), the WTRU may apply (e.g., autonomously) a secondary slot configuration for the stand-alone slot based DMRS channel estimation that may have, for example, a higher time domain density. In examples, the gNB may indicate in DCI (e.g., the next UL grant) the secondary DMRS configuration to the WTRU.

In examples, after signaling the phase discontinuity to the base station (e.g., gNB), the WTRU may apply, for example, in the next bundle, a DMRS and PTRS configuration for phase continuity tracking as a secondary possible uplink configuration.

In examples, while the WTRU is using a configuration (e.g., primary configuration) for DMRS bundling, under a non-contiguous repetition bundling for which the WTRU capabilities indicated that the phase continuity can be maintained, the WTRU may signal this situation to the network and/or may switch to a secondary DMRS and/or DMRS and PTRS configuration if its initial phase continuity capability is exceeded.

Figure 13:
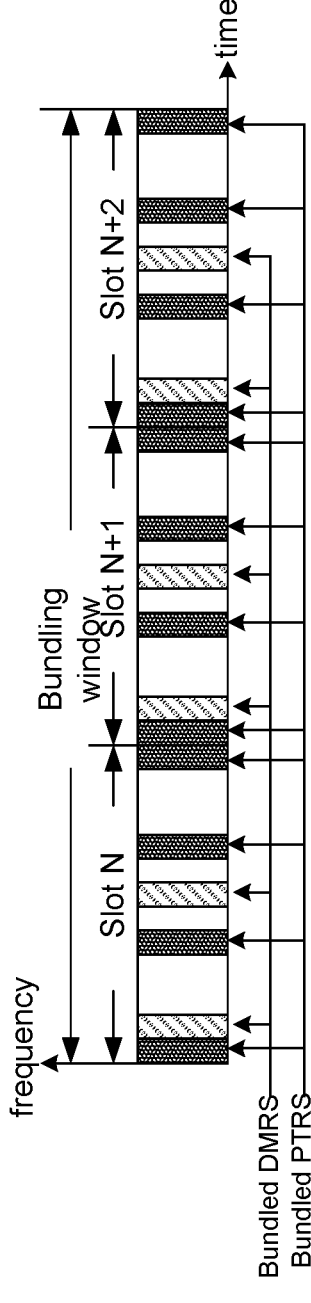
FIG. 13 illustrates an example of bundled DMRS and PTRS within a bundling window.

FIG. 13 illustrates an example of bundled DMRS and PTRS within a bundling window.

DMRS and PTRS may be bundled together. For example, during a bundling window, the WTRU may transmit DMRS and PTRS at configured subcarriers and/or symbols. If transform precoding is enabled, the WTRU may transmit DMRS and PTRS at configured samples, for example, prior to transform precoding and/or symbols.

FIG. 13 illustrates an example of DMRS and PTRS bundled jointly within a bundling window.

During the bundling window, the WTRU may determine to bundle DMRS and PTRS during the bundling window based on one or more of the following conditions: a doppler shift or spread is equal or above (e.g., or below) a threshold configured by the network (e.g, gNB); a standard deviation or variance of CSI is equal or above (e.g., or below) a threshold configured by the network (e.g, gNB); and/or detected phase shift or carrier frequency offset is equal or above (e.g., or below) a threshold configured by the network (e.g, gNB). Such threshold(s) may be signaled (e.g., by a MAC-CE, by RRC signaling), or indicated in the DCI associated with the PUSCH transmission.

In examples, the WTRU may receive an indication from the network (e.g., gNB) to bundle DMRS and PTRS jointly. The WTRU may receive such indication (e.g., by a MAC-CE, DCI, or via RRC signaling).

Figure 14:
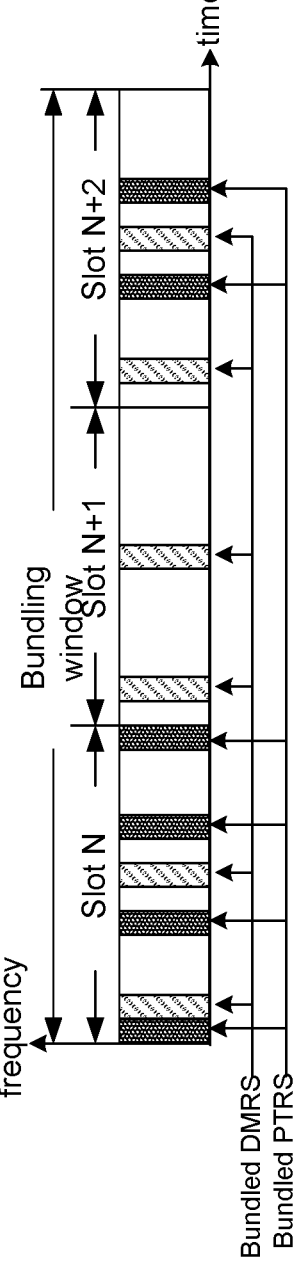
FIG. 14 illustrates an example of bundled DMRS and PTRS within a bundling window with different densities of PTRS.

In examples, as shown in FIG. 13, the (e.g., all) transmissions in the bundling window may maintain the same density across the (e.g., all) transmissions (e.g., across 3 slots in the example shown in FIG. 13). In examples, the WTRU may receive configuration information to transmit different densities of DMRS or PTRS in a respective (e.g., each) transmission in the bundling window. An example of such transmission is shown in FIG. 14, where no PTRS is configured in the transmission in slot #(N+1) and less density of PTRS, compared to the density of PTRS in slot #N, is configured in slot #(N+2). FIG. 14 illustrates an example of bundled DMRS and PTRS within a bundling window with different densities of PTRS in each slot.

The WTRU may determine to transmit variable densities of PTRS in a respective (e.g., each) transmission, for example, based on one or more of the following conditions or parameters: a doppler shift or spread is equal or above (e.g., or below) a threshold configured by the network (e.g., gNB); a standard deviation or variance of CSI is equal or above (e.g., or below) a threshold configured by the network (e.g, gNB); a detected phase shift or carrier frequency offset is equal or above (e.g., or below) a threshold configured by the network (e.g., gNB); the number of symbols allocated for PUSCH transmission/repetitions; and/or the type of repetitions (e.g., type A or type B repetitions).

A time window may be configured, for example, with PTRS. PTRS may be determined. In examples, the WTRU may determine to include the PTRS, for example, based on configuration information for a PUSCH transmission (e.g., MCS, bandwidth, mobility, speed, SCS, number of symbols, number of slots, the number of repetitions in repetition type A, number of repetitions for repetition type B). For example, the WTRU may determine to include/not include PTRS in PUSCH transmission, for example, based on configured (e.g., preconfigured) conditions by the base station (e.g., gNB). For example, the WTRU may determine to refrain from including (e.g., determine to not include) PTRS, for example, if the MCS is QPSK (e.g., because phase disruption may not degrade performance of QPSK significantly. The WTRU may include PTRS in the PUSCH transmission, for example, if the number of repetitions for type A repetition is above the configured (e.g., preconfigured threshold), e.g., the base station (e.g., gNB) uses (e.g., needs) PTRS to track phase noise/drift during a long duration of repetitions.

Based on receiving a grant for PUSCH transmission repetitions, the WTRU may determine the PTRS pattern which may associated with PUSCH transmission parameters (e.g., SCS, MCS, number of symbols in PUSCH transmission, number of repetitions for type A repetition, number of actual/nominal repetition for type B, TDD configuration information). The WTRU may receive such association or condition (e.g., thresholds) to insert PTRS in PUSCH transmission from the base station (e.g., gNB), for example, via DCI/MAC-CE signaling/RRC signaling. If the PTRS is determined, the WTRU may insert the PTRS in the PUSCH transmission. The WTRU may refrain from including (e.g., not include) the PTRS if none of the conditions are satisfied (e.g., MCS is QPSK).

The WTRU may perform capability signaling. The WTRU may receive a request from the base station (e.g., gNB) to indicate capability for maintaining phase and power continuity. The WTRU may send the duration (e.g., maximum duration) during which the WTRU can maintain power and phase continuity. The WTRU may signal an MCS related threshold for phase maintenance (e.g., which may be related to a transmission phase tolerance determined level). This capability may indicate from which MCS the PTRS insertion may be used (e.g., required) for joint channel estimation coherence maintenance. The WTRU may signal a time-window duration related threshold for phase maintenance, for example, which may be related to a transmission phase tolerance determined level. This capability may indicate an association between the time window duration and the PTRS insertion/density for joint channel estimation coherence maintenance.

In examples, the WTRU may be configured with the number of PUSCH transmission repetitions with a duration longer than the maximum duration (e.g., during which the WTRU can maintain power and phase continuity). In such a case, the WTRU may maintain phase and power continuity up to the duration (e.g., maximum duration), for example, such that the base station (e.g., gNB) may perform joint channel estimation up to the duration (e.g., maximum duration).

The WTRU may indicate to the base station (e.g., gNB) that the WTRU may refrain from performing (e.g., does not perform) joint channel estimation (e.g., does not maintain phase and power continuity for a specific duration), for example, by returning the configured (e.g., preconfigured) value for capability, e.g., zero for the maximum duration to maintain phase and power continuity. The WTRU may include the capability information via signaling (e.g., capability signaling or MAC-CE signaling, UCI, or RRC messages/signaling.

Based on sending the capability information to the base station (e.g., gNB), the WTRU may receive configuration information from the base station (e.g., gNB) for the number of PUSCH transmission repetitions over which the WTRU may maintain power and phase continuity, e.g., the WTRU may refrain from receiving (e.g., may not receive) configuration information for the number of PUSCH transmission repetitions with a duration longer than the maximum duration, for example, indicated in the WTRU capability.

Time window configuration information may be provided, for example, for a single/multiple time windows. The WTRU may receive parameters for a time window from the base station (e.g., gNB) during which the WTRU may be expected to maintain phase and power continuity. The window may be defined by a start time and an end time, or a starting position in the PUSCH transmission repetition (e.g., the first PUSCH transmission), length of the time window in terms of frames, slots or symbols, and/or number of time windows. For uplink transmission, the WTRU may maintain phase and power continuity for PUSCH transmission within the time window. The time window may overlap with uplink symbols, downlink symbols, or symbols which are neither downlink or uplink symbols. The WTRU may receive the parameters (e.g., as described herein), for example, via DCI, MAC-CE signaling, or RRC messages/ signaling from the base station (e.g., gNB). The parameter(s) may be included in signaling/configuration information related to a dynamic or configured grant.

In examples, the WTRU may determine to split the time window into multiple windows, for example, based on a TDD configuration. For example, the TDD configuration may include symbols (e.g., contiguous unscheduled symbols) which do not contain uplink or downlink symbols. In such a case, the WTRU may maintain phase and power continuity up to the first symbol in the unscheduled symbols. The WTRU may start maintenance of phase and power continuity after the last symbol in the unscheduled symbols.

For example, the WTRU may be configured with a slot structure uuuuunnnnuuuuu (e.g., where u and n indicate uplink and unscheduled symbols respectively). In such a case, the WTRU may determine to maintain power and phase continuity for the first 5 uplink symbols and pause maintenance during the next 4 unscheduled symbols. The WTRU may restart power and phase continuity maintenance for the last 5 uplink symbols. The WTRU may maintain phase and power continuity between the last uplink symbol in the first 5 uplink symbols and the first uplink symbol in the last 5 uplink symbols, for example, by storing the phase and power information of the last uplink symbol in the first 5 uplink symbols and transmitting the first uplink symbol in the last 5 uplink symbols by applying phase and power from the storage. The time window may be split into two windows. The WTRU may receive an indication (e.g., explicit indication) from the base station (e.g., gNB) to configure a time window (e.g., multiple time windows). The WTRU may determine (e.g., implicitly determine) to have multiple time windows. Splitting a time window may be performed (e.g., limited to) with the symbols in a slot (e.g., one slot). Splitting a time window may be generalized to slot-based transmission, e.g., UNU where U is a slot consisting of uplink symbols and N is a slot consisting of unscheduled symbols.

Signaling (e.g., static/dynamic signaling) may be performed to pause/start power and phase continuity. The WTRU may send an indication to the base station (e.g., gNB) if phase or power continuity cannot be maintained (e.g., via UCI or MAC-CE signaling). For example, the WTRU may detect a timing advanced error or timing adjustment error, mobility, doppler shift, or spread over the configured (e.g., preconfigured) threshold which may prevent the WTRU from accurately maintaining phase and power continuity.

The WTRU may receive an indication (e.g., dynamic or static indication) from the base station (e.g., gNB) to pause power and phase maintenance, for example, if the base station (e.g., gNB) detects a timing advanced error, mobility, doppler shift, or spread over the configured (e.g., preconfigured threshold). The WTRU may receive an indication from the base station (e.g., gNB) to start maintenance of power and phase continuity. The WTRU may receive such an indication from the base station (e.g., gNB), for example, via DCI or MAC-CE signaling. The WTRU may receive such a message with N symbols or slots before receiving the PUSCH transmission scheduling grant where N may depend on a WTRU processing speed and N is the configured (e.g., preconfigured) parameter by the base station (e.g., gNB), for example, via RRC signaling. The WTRU may receive an explicit indicator (e.g., in an RRC message/signaling, MAC-CE signaling, DCI, or dynamic/configured grant configuration information) to perform phase and power continuity maintenance or joint channel estimation. The WTRU may receive such a message after/before receiving the grant for PUSCH transmission repetitions.

The base station (e.g., gNB) may schedule repetitions, for example, if the WTRU cannot maintain power and phase In examples, based on sending the configured (e.g., preconfigured) value in the capability to the base station (e.g., gNB), indicating that the WTRU may refrain from maintaining (e.g., does not maintain) phase and power continuity for a specific duration, the WTRU may receive configuration information from the base station (e.g., gNB) for the number of repetitions and the grant scheduling PUSCH transmission repetitions. In that case, the WTRU may not be expected to maintain power or phase continuity during the PUSCH transmissions repetitions.

In examples, repetitions for TDD with configuration information associated with a time window and PTRS may be performed.

Based on the request from the base station (e.g., gNB), the WTRU may return a duration (e.g., maximum duration) to maintain phase and power continuity. If the WTRU is not capable of maintaining phase and power continuity, the WTRU may return the preconfigured value (e.g., zero for the maximum duration).

The WTRU may receive a grant from the base station (e.g., gNB) for PUSCH transmission repetitions (e.g., in dynamic or configured grant), where the number of repetitions may be configured based on the maximum duration (e.g., if the maximum duration is not zero) returned by the WTRU. The WTRU may receive a MCS, SCS and/or bandwidth. The WTRU may receive TDD configuration information from the base station (e.g., gNB). The WTRU may receive an indication (e.g., explicit indication) to perform joint channel estimation (e.g., via an RRC message/ signaling) and number of time windows (e.g., one time window).

Based on the indication from the network, the WTRU may determine that a time window (e.g., one time window) is configured during the repetitions during which the WTRU maintains power and phase continuity. Based on the MCS, SCS, bandwidth and/or duration of the repetitions and TDD configuration information, the WTRU may determine to include a configured (e.g., preconfigured) PTRS pattern, for example, associated with the MCS, SCS, and/or duration of the repetitions in the PUSCH transmission.

The WTRU may transmit PUSCH transmission repetitions with PTRS.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
a memory; and
a processor in communication with the memory, the processor configured to:
  receive downlink control information (DCI), wherein the DCI indicates an uplink grant for a physical uplink shared channel (PUSCH) transmission, a first number of symbols, a pattern of reference signals in an uplink slot, and an indication to use an extended slot associated with the PUSCH transmission, wherein the uplink grant for the PUSCH transmission is associated with the uplink slot, wherein the extended slot comprises symbols of the uplink slot and one or more symbols at an end of a previous slot, wherein the previous slot is contiguous with the uplink slot, and wherein the first number of symbols is a number of symbols to use in the uplink slot;
  determine, based on one or more of a duration of the extended slot, the first number of symbols, or the pattern of reference signals in the uplink slot, a second number of symbols, wherein the second number of symbols comprises at least one of a reference signal symbol or a PUSCH transmission symbol, and wherein the second number of symbols is a number of symbols to use in a portion of the extended slot associated with the previous slot;
  determine a first part of a transmission and a second part of the transmission, wherein the first part of the transmission is determined based at least on the second number of symbols, and wherein the second part of the transmission is determined based on the first number of symbols and the pattern of reference signals in the uplink slot;
  transmit, in one or more symbols at the end of the previous slot, the first part of the transmission; and
  transmit, in the uplink slot, the second part of the transmission;
  wherein a power and phase continuity is maintained for the first part of the transmission and the second part of the transmission, if the WTRU receives an indication to control power and phase to maintain the power and phase continuity.

2. The WTRU of claim 1, wherein the processor is further configured to determine respective locations of respective symbols of the second number of symbols in the portion of the extended slot associated with the previous slot, and wherein determining the first part of the transmission is further based on the respective locations of respective symbols of the second number of symbols in the portion of the extended slot associated with the previous slot.

3. The WTRU of claim 2, wherein determining the respective locations of respective symbols of the second number of symbols in the portion of the extended slot associated with the previous slot is further based on one or more of the duration of the extended slot, the first number of symbols, or the pattern of reference signals in the uplink slot.

4. The WTRU of claim 1, wherein the second number of symbols comprises a number of reference signal symbols and a number of PUSCH transmission symbols.

5. The WTRU of claim 1, wherein the second number of symbols is zero reference signal symbols or more than zero reference signal symbols.

6. The WTRU of claim 1, wherein the pattern of reference signals in the uplink slot indicates zero reference signal symbols or more than zero reference signal symbols are in the uplink slot.

7. The WTRU of claim 1, wherein determining the second number of symbols is further based on the duration of the extended slot, the first number of symbols, and the pattern of reference signals in the uplink slot.

8. The WTRU of claim 1, wherein the DCI is received with an explicit or implicit bundling indication.

9. The WTRU of claim 1, wherein the processor is further configured to stop maintaining the phase or power continuity if one or more conditions are satisfied.

10. The WTRU of claim 9, wherein the one or more conditions include at least one of:
  the WTRU receives the DCI without a bundle indication;
  the WTRU receives a termination indication in the DCI;
  the WTRU does not receive a bundle indication over a time;
  the WTRU receives a stop indication; or
  the WTRU observes a channel variation.

11. A method implemented by a wireless transmit/receive unit (WTRU), the method comprising:
  receiving downlink control information (DCI), wherein the DCI indicates an uplink grant for a physical uplink shared channel (PUSCH) transmission, a first number of symbols, a pattern of reference signals in an uplink slot, and an indication to use an extended slot associated with the PUSCH transmission, wherein the uplink grant for the PUSCH transmission is associated with the uplink slot, wherein the extended slot comprises symbols of the uplink slot and one or more symbols at an end of a previous slot, wherein the previous slot is contiguous with the uplink slot, and wherein the first number of symbols is a number of symbols to use in the uplink slot;

determining, based on one or more of a duration of the extended slot, the first number of symbols, or the pattern of reference signals in the uplink slot, a second number of symbols, wherein the second number of symbols comprises at least one of a reference signal symbol or a PUSCH transmission symbol, and wherein the second number of symbols is a number of symbols to use in a portion of the extended slot associated with the previous slot;

determining a first part of a transmission and a second part of the transmission, wherein the first part of the transmission is determined based at least on the second number of symbols, and wherein the second part of the transmission is determined based on the first number of symbols and the pattern of reference signals in the uplink slot;

transmitting, in one or more symbols at the end of the previous slot, the first part of the transmission; and transmitting, in the uplink slot, the second part of the transmission;

wherein a power and phase continuity is maintained for the first part of the transmission and the second part of the transmission, if the WTRU receives an indication to control power and phase to maintain the power and phase continuity.

12. The method of claim 11, further comprising:

determining respective locations of respective symbols of the second number of symbols in the portion of the extended slot associated with the previous slot, and wherein determining the first part of the transmission is further based on the respective locations of respective symbols of the second number of symbols in the portion of the extended slot associated with the previous slot.

13. The method of claim 12, wherein determining the respective locations of respective symbols of the second number of symbols in the portion of the extended slot associated with the previous slot is further based on one or more of the duration of the extended slot, the first number of symbols, or the pattern of reference signals in the uplink slot.

14. The method of claim 11, wherein the second number of symbols comprises a number of reference signal symbols and a number of PUSCH transmission symbols.

15. The method of claim 11, wherein the second number of symbols is zero reference signal symbols or more than zero reference signal symbols.

16. The method of claim 11, wherein the pattern of reference signals in the uplink slot indicates zero reference signal symbols or more than zero reference signal symbols are in the uplink slot.

17. The method of claim 11, wherein determining the second number of symbols is further based on the duration of the extended slot, the first number of symbols, and the pattern of reference signals in the uplink slot.

18. The method of claim 11, wherein the DCI is received with an explicit or implicit bundling indication.

19. The method of claim 11, further comprising stopping maintaining the phase or power continuity if one or more conditions is satisfied.

20. The method of claim 19, wherein the one or more conditions include at least one of:

the WTRU receives the DCI without a bundle indication;

the WTRU receives a termination indication in the DCI;

the WTRU does not receive a bundle indication over a time;

the WTRU receives a stop indication; or the WTRU observes a channel variation.

\* \* \* \* \*